(12) United States Patent
Phillips

(10) Patent No.: US 12,042,820 B2
(45) Date of Patent: *Jul. 23, 2024

(54) NON-ABLATIVE MULTI-LAYER COATINGS FOR BOAT AND MARINA STRUCTURES THAT PREVENT WATER-DERIVED DAMAGE, CORROSION, AND DETERIORATION FROM BIOLOGICAL CHEMICAL PROCESSES

(71) Applicant: Redjak, LLC, Glen Cove, NY (US)

(72) Inventor: Reed E. Phillips, Glen Cove, NY (US)

(73) Assignee: REDJAK, LLC, Glen Cove, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/297,987

(22) Filed: Apr. 10, 2023

(65) Prior Publication Data

US 2023/0294131 A1 Sep. 21, 2023

Related U.S. Application Data

(63) Continuation-in-part of application No. 18/112,872, filed on Feb. 22, 2023, which is a continuation-in-part
(Continued)

(51) Int. Cl.
*B05D 7/00* (2006.01)
*B05D 7/02* (2006.01)

(52) U.S. Cl.
CPC .............. *B05D 7/58* (2013.01); *B05D 7/02* (2013.01); *B05D 2320/00* (2013.01); *B05D 2518/10* (2013.01); *B05D 2601/28* (2013.01)

(58) Field of Classification Search
CPC ........ B05D 7/58; B05D 7/02; B05D 2320/00; B05D 2518/10; B05D 2601/28
See application file for complete search history.

(56) References Cited

U.S. PATENT DOCUMENTS

| 3,214,280 A | 10/1965 | Taylor |
| 4,375,199 A | 3/1983 | Graeme-Barber et al. |

(Continued)

FOREIGN PATENT DOCUMENTS

| EP | 1699885 B1 | 9/2008 |
| GB | 225452 A | 12/1924 |

(Continued)

OTHER PUBLICATIONS

Floerl, Oliver, et al. "Review of biosecurity and contaminant risks associated with in-water cleaning", Australian Department of Agriculture, Fisheries and Forestry. Sep. 2010, pp. 1-136.

*Primary Examiner* — Robert S Walters, Jr.
(74) *Attorney, Agent, or Firm* — Tutunjian & Bitetto, P.C.

(57) ABSTRACT

Methods of protecting a submerged surface include applying an adhesion-promoting layer onto a surface. An inner polymer layer is applied onto the adhesion-promoting layer. The inner polymer layer is impregnated with a biologically active chemical substance that inhibits biofouling-induced chemical, biological, and bio-proliferative damage. An outer polymer layer is applied onto the inner polymer layer. The outer polymer layer is impregnated with a biologically active chemical substance that inhibits biofouling-induced chemical, biological, and bio-proliferative damage and that repels biofouling organisms to prevent invasion of the inner polymer layer.

15 Claims, 3 Drawing Sheets

Related U.S. Application Data of application No. 17/988,296, filed on Nov. 16, 2022, which is a continuation-in-part of application No. 17/545,628, filed on Dec. 8, 2021, now Pat. No. 11,661,520.

(56) References Cited

U.S. PATENT DOCUMENTS

| | | | |
|---|---|---|---|
| 4,455,304 | A | 6/1984 | Yaralian |
| 4,751,113 | A | 6/1988 | Riccio et al. |
| 5,226,380 | A | 7/1993 | Fischer |
| 5,397,385 | A | 3/1995 | Watts |
| 8,679,583 | B2 | 3/2014 | Kerechanin, II et al. |
| 8,840,910 | B2 | 9/2014 | Masuda et al. |
| 2011/0174207 | A1 | 7/2011 | Harrick et al. |
| 2014/0170016 | A1* | 6/2014 | Kaeufler .................. C22C 9/04 420/472 |
| 2020/0283644 | A1* | 9/2020 | Phillips ................ C09D 5/1625 |

FOREIGN PATENT DOCUMENTS

| | | | |
|---|---|---|---|
| WO | 2016082397 | A1 | 6/2015 |
| WO | 2016182491 | A1 | 11/2016 |

* cited by examiner

NON-ABLATIVE MULTI-LAYER COATINGS FOR BOAT AND MARINA STRUCTURES THAT PREVENT WATER-DERIVED DAMAGE, CORROSION, AND DETERIORATION FROM BIOLOGICAL CHEMICAL PROCESSES

BACKGROUND OF THE INVENTION

The present invention relates to protective coatings for surfaces submerged in water, and, more particularly, to multi-layer coatings having layers that include chemicals to nullify deterioration from chemical and biological factors in the water.

Structures that are submerged within water, whether saltwater or freshwater, are subject to attack by chemical, galvanic, corrosive, ultraviolet, mechanical, and bio-proliferative processes that cause deterioration, damage, and eventual destruction of the surface of the submerged object. If that submerged object is coated with a protective coating to prevent such damage to the structure, such deterioration can be delayed. However, the coating itself is subject to the same attack of these processes, and thus the protection provided by the coating is only temporary. Eventually, both the coating and the submerged structure fail and are destroyed. To prevent this, the damaged coating may be periodically removed and replaced before structural damage has occurred. In almost all cases, materials related to the coating are released into the aquatic environment, which may have an undesirable effect on the water and life forms in the surrounding water.

BRIEF SUMMARY OF THE INVENTION

A method of protecting a submerged surface includes applying an adhesion-promoting layer onto a surface. An inner polymer layer is applied onto the adhesion-promoting layer. The inner polymer layer is impregnated with a biologically active chemical substance that inhibits biofouling-induced chemical, biological, and bio-proliferative damage. An outer polymer layer is applied onto the inner polymer layer. The outer polymer layer is impregnated with a biologically active chemical substance that inhibits biofouling-induced chemical, biological, and bio-proliferative damage and that repels biofouling organisms to prevent invasion of the inner polymer layer.

A method of protecting a submerged surface includes forming an object from a polymer material that is impregnated with a biologically active chemical substance that inhibits biofouling-induced chemical, biological, and bio-proliferative damage. An adhesion-promoting layer is applied onto a surface of the object surface. An outer polymer layer is applied onto the inner polymer layer. The outer polymer layer is impregnated with a biologically active chemical substance that inhibits biofouling-induced chemical, biological, and bio-proliferative damage and that repels biofouling organisms to prevent invasion of the inner polymer layer.

A method of protecting a submerged surface includes applying an adhesion-promoting layer onto a surface. The adhesion-promoting layer is impregnated with a biologically active chemical substance that inhibits biofouling-induced chemical, biological, and bio-proliferative damage. An outer polymer layer is applied onto the adhesion-promoting layer. The outer polymer layer is impregnated with a biologically active chemical substance that inhibits biofouling-induced chemical, biological, and bio-proliferative damage and that repels biofouling organisms to prevent invasion of the adhesion-promoting layer.

These and other features and advantages will become apparent from the following detailed description of illustrative embodiments thereof, which is to be read in connection with the accompanying drawings.

BRIEF DESCRIPTION OF THE DRAWINGS

The disclosure will provide details in the following description of preferred embodiments with reference to the following figures wherein.

DETAILED DESCRIPTION

Coatings may be provided for submerged structures that protect the structure for a significant length of time, without shedding of material into the environment. Two or more layers of polymers may be used, each impregnated with different chemical compounds that performs different respective purposes, preventing the attachment of biofouling animal and plant organisms and related bio-proliferative processes, such as scale and shell formation.

For example, an outer polymer layer may prevent the settlement of larval biofouling animal organisms, repelling them from the surface of the coating. For the very small minority of remaining biofouling animal organisms that manage to attach to and penetrate the outer polymer layer, these organisms may contact an inner polymer layer. The inner polymer layer may include chemical substances that eliminate the organisms. Because the inner polymer layer is enclosed within the outer polymer layer, no chemicals from the inner layer leech into the surrounding water. The layers may not be ablative in nature, so that neither the chemical components of the polymers comprising the layers, nor the chemical substances impregnated into the layers, are released into the environment.

Figure 1:
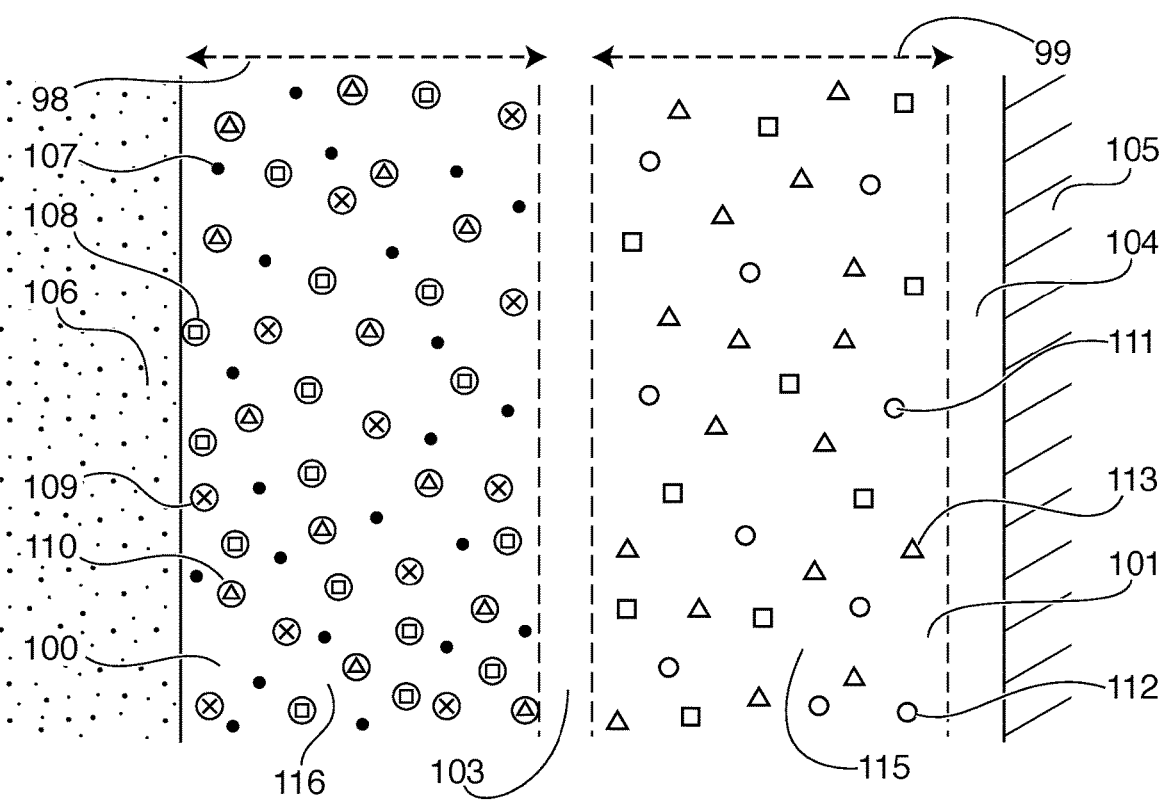
FIG. 1 is a diagram illustrating a cross-sectional view of a multi-layer coating that inhibits the attachment and growth of bio-proliferative organisms, thereby protecting an underlying surface from damage, in accordance with an embodiment of the present invention.

Referring to FIG. 1, a multi-layer coating for a structure is shown. An outer polymer layer 98 covers an inner polymer layer 99. The outer polymer layer 98 prevents deterioration, corrosion, and damage to the inner polymer layer 99 by preventing physical interactions, such as diffusion, solution, or any chemical interaction between the surrounding water and any of the inner polymer layer's constituents. For example, a surrounding medium, such as water 106, may include Cl– ions, $CO_3^{-3}$ ions, H+ ions, or $SO_4^{-2}$ ions.

Because of the shielding effect of the outer polymer layer 98 over the inner polymer layer 99, the aquatic environment and water 106 surrounding the coating and protected surface 105 is prevented from contacting the inner polymer layer 99. As a result, no chemical species, including ions or complete molecules, that are related to any of the structural or chemical components of the inner polymer layer 99 would be found at any measurable distance away from the submerged surface 105 being protected. As a further result, even water soluble substances, such as cupro-metallic salts, will not dissolve into or leach or diffuse away from the protected surface coating for any significant distance. For example, such substances may include $CuSO_4$, $CuNO_3$, copper thiosulfate, or any water soluble salt that contains cuprous Cu+1 or cupric Cu+2 ions, cupric acetate, any other water soluble salt containing metallic cations and non-metallic anions.

Preventing contact between water 106 and the inner polymer layer 99 helps to preserve the integrity of the surrounding aquatic environment. An optional outer primer 103 between the inner polymer layer 99 and outer polymer layer 98 increases the containment of chemical materials within the inner polymer layer 99, and may itself be impregnated with chemical materials that will slow the proliferation of the juvenile animal organisms that have developed from larvae that have successfully managed to settle on the outside polymer layer 98. An optional inner primer layer 104 can also be used to increase adhesion of the coating to the protective surface structure and to prevent galvanic activity between a metal surface structure and the chemical substances in the inner polymer layer 99.

Various processes can attack coatings and their protected surfaces. Such processes may include chemical processes; galvanic corrosive processes; radiant processes of ultraviolet light transmission from the atmosphere through the water to ultraviolet-sensitive coatings; mechanical processes such as friction with moving objects in the water or the abrasive friction of the water itself, collision with fish and other animals, or hard docking into a pier; and bio-proliferative processes involving the growth of animal and plant organisms on the protected surfaces and their coatings. Any of these processes can act predominantly alone, or in combination, to first damage and destroy a protective coating, and then sequentially the protective surface structure itself. Of note, bio-proliferative processes have special significance if they are uncontrolled, as they will lead to secondary chemical, galvanic, and corrosive processes, independent of what originates from the properties of the water surrounding the protected surface structure.

Chemical processes may include chloride ion attack on stainless steel, scale precipitation of calcium and magnesium carbonate and sulfate on both the coatings and exposed structural surfaces, hydrogen and sulfide ion attack on metal surfaces, and oxygen attack on ferric surfaces resulting in rust.

Galvanic corrosive processes may include electron transfer between dissimilar metals on a boat and electrical leakage currents in the water surrounding the surface.

Bio-proliferative processes may involve the proliferation of biological substances, with or without the involvement of discrete biological organisms, such as biofouling observed with barnacles, invasive mussels, tubeworms, ship worms, tunicates, algae, bacteria, fungi, and other organisms. Bio-proliferative processes may also include scale formation without the actual presence of living organisms.

Bio-proliferative processes can be inhibited by the inclusion of various compounds in the coating. At one time, a group of similarly structurally related chemical compounds, known as tri-butyl-tins (TBT), was used to eradicate bio-proliferative processes that included biofouling. However, TBT was found to be highly toxic, because, to eradicate the various types of biofouling that can occur, TBT had to be released into the surrounding water by the reaction and dissolution of the paint coating that was impregnated by the compound. As a result significant numbers of aquatic organisms suffered harm. In 2003, however, the International Maritime Organization (IMO) issued a permanent ban which forbade the use of TBT.

With this ban, TBT was largely supplanted by copper salts in ablative paints that reacted with the surrounding salt water to produce copper compounds, such as copper hydroxychloride that also eradicated bio-proliferation in the same manner as TBT. Now, many jurisdictions are considering banning copper ablative paints for the same reason that TBT was banned.

To prevent exposure of the aquatic environment to potentially harmful chemicals, the present coatings make use of a multi-layer structure, whereby potentially toxic materials are safely enclosed within the outer polymer layer 98. The outer polymer layer 98 uses safer inhibitory chemicals to prevent bio-proliferative organisms from attaching, while the inner polymer layer 99 selectively exposes organisms to more toxic chemicals when those organisms manage to penetrate the outer polymer layer 98.

Not only does the coated structure need to be protected from water-derived destructive processes, but the coating itself needs to be protected. Each layer of the coating protects the layer underneath it. Because the multi-layer structure makes it possible to segregate chemicals from exposure to the water 106, a wide array of chemicals can be used, including those which are water soluble or which would be harmful to the environment if exposed to the water directly. To effectively provide protection for the surface 105, the layers of the coating are themselves designed to ensure their durability.

Thus, the outer polymer layer 98 may include environmentally friendly substances that repel biofouling animal organisms, thus protecting the underlying inner polymer layer 99 and the structure's surface 105. At the same time, the outer polymer layer 98 shields the aquatic environment from being in contact with the inner polymer layer 99, which may include substances that would kill biofouling animal organisms and could potentially be harmful to the surrounding aquatic environment. Exemplary substances that could safely be used in the inner polymer layer 99 include copper and its cupro-metallic salts, such as cuprous oxide, cupric oxide, copper sulfate, copper thiocyanate (both cuprous and cupric forms), and others.

Thus, the chemical materials described herein function to protect the coating itself and the underlying submerged surface structure. In achieving this objective, the present embodiments provide superior structural protection, and also eliminate the destructive, damaging, and deteriorating effects of the chemical, galvanic, corrosive, radiant (ultraviolet) and mechanical processes emanating from and within the surrounding water that damage the submerged surface structure subsequently.

In an illustrative embodiment, the outer polymer layer 98 may include a polymer 116 selected from the group of polyurethanes (PUR), fluorourethanes (FUR), polyurea polymers, polyester, and polyaspartate polymers as representative examples from the chemical class of compounds known as polymers. These polymers have mechanical, UV light-resistant optical, and curing qualities that make them well suited to provide initial protection for the coating and the inner polymer layer underneath from environmental damage. By protecting the inner polymer layer 99 from the radiant (UV), chemical, corrosive, and mechanical processes originating within and from the surrounding water, they are the first means of protecting the integrity of the entire coating and the submerged protected surface structure underneath.

Referring to PUR and FUR, but applicable as well to polyester polyurea and polyaspartate polymers, these polymers have excellent optical and radiant resistance to ultraviolet light transmitted from the surrounding water. Thus, they can protect inner polymer layers that are UV sensitive and that would be prone to deterioration, such as epoxies, which can discolor and crack with time under UV exposure, a process known as caulking. PUR and FUR are mechanically ductile, very durable, and resistant to scratching and abrasion, and can handle a high degree of flexing forces. These features provide mechanical resistance against the mechanical processes of friction and impact. These properties also allow for self-sealing of microscopic defects that can occur with time in the coating. PUR and FUR are highly resistant to pitting because they resist the mechanical process of water vapor diffusion under the polymer, which can lead to condensation and bubble formation. PUR and FUR are highly adhesive to the underlying layer polymers such as epoxies. PUR and FUR are chemically inert to most acids, alkalis, the chloride ion, and all chemical species found in both saltwater and freshwater. The chloride ion is a major cause of chemical deterioration of surfaces and structures in seawater, and the hydrogen ion is the major problem in freshwater.

These chemical properties make PUR and FUR resistant to corrosive and galvanic processes that would damage the coating. Their extremely low coefficient of friction gives PUR and FUR resistance against the bio-proliferative processes of scaling attachment of calcium and magnesium carbonates and hydroxides attachment, both from the presence of scaling calcium forming biological organisms and from simple precipitation of salts from water saturated in these chemical species. However, those same extremely low coefficients of friction also increase the resistance of PUR and FUR to bio-proliferative processes such as biofouling, where organisms may attach and proliferate on the outer surface of the coating. The resistances provided by these polymers by itself are not sufficient to protect the coating against bio-proliferative processes associated with biofouling animal and plant organisms. While low friction can help to prevent attachment of organisms, for this characteristic to provide a significant benefit against such organisms, the boat should be moving at least 10 mph relative to the water to prevent settlement of biofouling animal and plant organisms.

To improve the bio-proliferative resistance of these polymers and to keep the integrity of the outer polymer layer 98 intact, the outer polymer layer 98 may be impregnated with certain chemical substances that inhibit attachment by organisms. Keeping the outer polymer layer 98 intact from damaging physical, bio-proliferative, and chemical processes from the surrounding water secondarily preserves the integrity of the inner polymer layer 99 from attack by these same damaging physical, bio-proliferative, and chemical processes, and the inner polymer layer 99 in turn protects the integrity of the submerged protected surface structure 105. Hence the polymer 116 of the outer polymer layer 98 is responsible for the initial step in the cascade of serial protections provided by the coating.

At the current time, because of cost and other considerations, FUR and PUR and especially FUR have not been widely adopted into immersive water applications of coatings, but have only been used primarily in surfaces subject to intermittent immersion and splashing, such as on shore coastal buildings or pylons of bridges. While PUR coatings can last 8 to 12 years if protected from bio-proliferative processes attacking such coatings, FUR coatings can last 25 to 60 years and perhaps as long as a century. FUR especially exhibits outstanding gloss and pigmentation color preservation after over 10 years of saltwater spray exposure.

To give the outer polymer layer 98 additional protection against bio-proliferative processes, such as biofouling animals and organisms, additional components may be added to that outer polymer layer 98 to prevent compromise of that layer's integrity. Without such additives, if a boat hull sits for a period of time in stagnant water, the lack of motion of the boat neutralizes the benefit of the low coefficient of friction property of the outer polymer layer that, in moving water, could prevent attachment of biofouling animal and plant organisms, and these entities will attach rapidly in great numbers to destroy the integrity of the outer polymer coating. Destroying the integrity of the outer polymer layer 98 rapidly will result in not only rapid demolishing of the integrity of the inner polymer layer 99 by not only bio-proliferative processes, but now the corrosive and chemical processes of the surrounding water will have access to the inner polymer layer 99, destroying its integrity as well. Then the integrity of the submerged surface structure will also then be compromised shortly afterwards. Thus, improving the resistance of the outer polymer layer 98 improves the durability of the entire coating.

A substance that may be added to the outer polymer layer 98 is a powdered alloy of copper, which may include copper, zinc, and tin particles 107, a family of alloys known commonly as the admiralty brasses. The polymer 116 may be impregnated with a water-insoluble and water-non-reactive brass powder 107, for example having particle size of 44 micron or smaller, modified with a doping of tin, to produce an admiralty brass alloy with a copper weight percentage of at least 85%, zinc with a weight percentage of at least 8%, and tin with a weight percentage of at least 1% and no more than 5%. One specific illustrative embodiment may have percentages that are about 90% copper, 9% zinc, and 1% tin.

The addition of tin, as compared to common brasses (e.g., 90% Cu, 10% Zn) gives the powder enhanced properties that make it suitable for inclusion in the outer polymer layer 98. This cupro-metallic alloy containing only small percentages of tin is classified as a type of admiralty brass known as a tin brass powder. The powder prevents corrosion of the outer layer 98 and, in consequence, the inner polymer layer 99 as well. This cupro-metallic alloy does this with the tin in the cupro-metal alloy powder preventing leaching of the zinc out of the alloy, a process known as dezincification. By preventing dezincification, the powder copper alloy particles 107 are prevented from breaking down into porous Cu particles, which disintegrate and release copper and copper ions into the surrounding water. Thus zinc prevents the environmental impact of including copper by preventing the copper from reaching the water. The tin doping further gives the cupro-metallic alloy a non-ablative property and allows it to remain intact chemically and mechanically upon exposure to seawater. With the inclusion of tin, this cupro-metallic alloy diminishes the presence of any galvanic action and corrosion initiated by the presence of the seawater. Additionally, if a compound such as zinc pyrithione is used in the outer layer 98, the presence of zinc in the alloy also helps keep the zinc pyrithione in the outer polymer layer 98 intact and prevents it from leaching out into the water if it were to dissolve into its constituent zinc and pyrithione ions.

Unlike the copper in pure copper metal or in copper salts widely used in ablative copper antifouling paints, the copper atoms in the tin-brass powder 107 is not released into the aquatic environment, because it is entrapped within the alloy complex as a solid metallic solution with metallic zinc by the action of the tin. The copper atoms are kept in their metallic state and are not changed into cupric or cuprous ions, which would otherwise leach into the surrounding water. The entrapment feature of the solid state alloy solution of the copper and zinc keeps the copper composition by weight constant over the extended life of the coating. The copper in the tin-brass alloy behaves differently from the copper in the cupro-metallic salts, or even pure copper powder or flakes that are found in ablative copper paints, whose copper atoms and cupric and cuprous ions leak profusely into the water on a continuous basis as the mechanism of their antifouling function. Finally, the inclusion of small amounts of metallic tin in the alloy improves the ability of the alloy powder and the outer polymer layer to repel biofouling animal larvae from the surface of the outer polymer layer. This alloy functions in this regard significantly better than cupro-nickel alloys, cupro-zinc brass alloys, and cupro-tin bronze alloys. However, if too much metallic tin is used, the retardation of bio-proliferative processes on the surface of the coating may actually be reduced.

The percentage of tin used by weight of the alloy mixture should not exceed 5%, with an optimal percentage being between 1% to 2%. The alloy employed in the outer polymer coating 98 by this invention may include 90% Cu, 9% Zn, and 1% Sn.

The alloy particles, which may be smaller than 44 microns and which may actually have a mean diameter of about 9 to about 14 microns, have a very large surface area to weight ratio, which improves its effectiveness. A composition of the alloy by weight of about 5% of the outer polymer layer is preferred, though a useable by weight concentration ranges from 1% to 20%. Note that if only 30% of the surface of outer layer 98 has tin brass particles exposed at the surface, because the anti-fouling influence of the alloy extends out a slight distance on the surface of the coating, the alloy powder will protect the entire surface. In contrast to the use of copper and other types of ablative paints, which shed the copper and other biocides into the water the biofouling inhibiting compounds may be used for protecting the coating and the protected surface from damage, disintegration, and discoloring. The elimination of biofouling organisms and the protection rendered to the coating and the surface below it is accomplished on the surface and upper portion of the multi-layered coating, with no chemically active substances being released into the surrounding water.

The alloy of copper, zinc, and tin is introduced as an exemplary embodiment of a metal alloy powder that can be appropriate to protect the outer polymer layer from deterioration and damage from biofouling organisms. Any metal alloy powder that comprises copper of at least 70% by weight of the composition of the alloy, with an exemplary percentage by weight of 90%, may be used. The non-copper metal components of the metal alloy powder, which may include various brasses, bronzes, and other alloys, may be one or more metal elements that are representatives of the group known as transition metals and post-transition metals, for example rows 4 and 5 on the Periodic Table. These metals may, for example, include yttrium, titanium, vanadium, chromium, manganese, iron, cobalt, nickel, zinc, zirconium, niobium, molybdenum, silver, indium, and tin as well as the heavy metal bismuth. Toxic transitional and post-transitional metals, such as cadmium, the radioactive metal technetium, and prohibitively expensive and rare elements in these element groups, such as gold, rhodium, and palladium, may be excluded.

Figure 2:
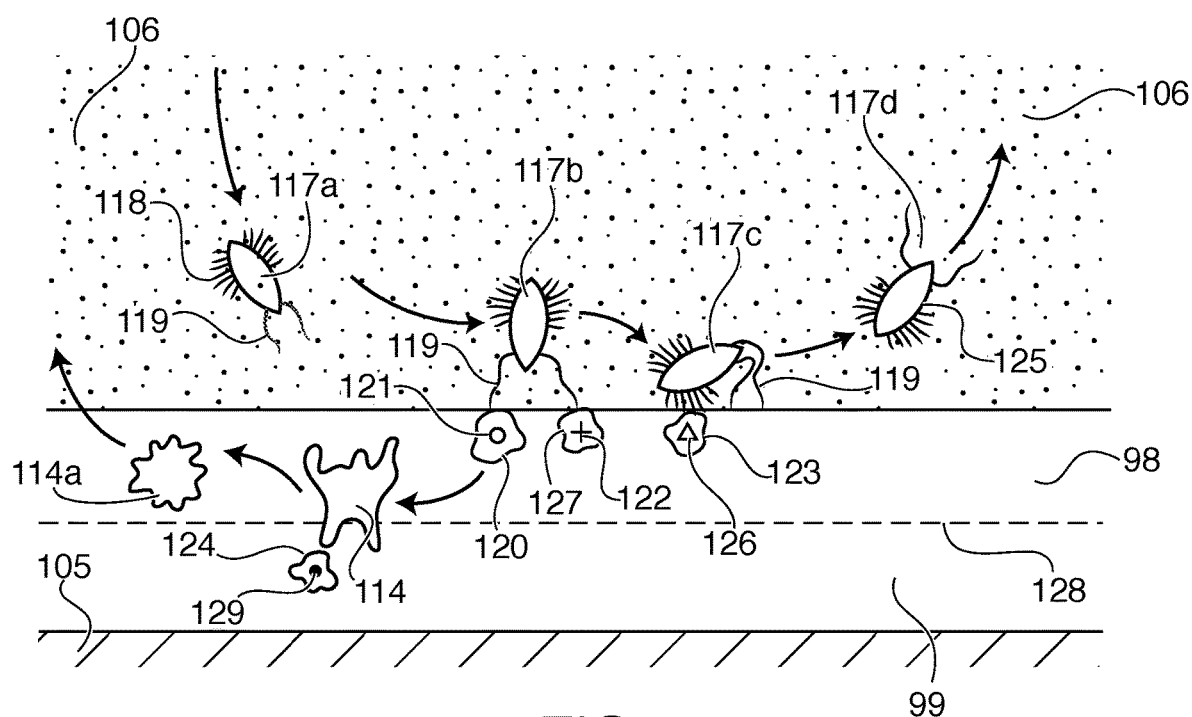
FIG. 2 is a diagram illustrating a life cycle of bio-proliferative organisms, including illustration of how such organisms may be inhibited from attaching to a surface, in accordance with an embodiment of the present invention.

Referring now to FIG. 2, an attachment process by cyprid larval forms of barnacles is shown. The tin brass alloy prevents bio-proliferative processes from being initiated by larval forms of biofouling animal organisms, such as the cyprid forms of barnacles and veliger forms of invasive mussels that touch the outer polymer surface. Cyprids and veligers may be about 2 mm in length. Using cyprids as examples, they manifest movement and behavior shown by four stages of attraction and repulsion: 117A—temporary attachment; 117B—using two "walking legs" head antennae 119, exploration; 117C—with exploration of the service for a suitable settlement spot, and if no such spot is found, 117D—repulsion from the surface. Cyprids move through the water using thoracic muscle structures 118.

The impregnated materials prevent the cyprids from finding a spot on the outer polymer coating that is suitable for settling and permanent attachment. First, the presence of copper atoms adjacent to the cell membrane area 125 of the larvae, being part of alloy particle 107, is disruptive to their cell membranes 125, thereby preventing settlement by this mechanism. Second, cyprids and veligers maneuver over the coating for some distance with their bodies and a pair of walking "legs" 119 in an attempt to settle on the coating, but they are repelled off the surface when these "legs" touch either an alloy particle itself 107 or a region of the coating close to the particle; the chemical influence of each copper zinc tin alloy particle extends outward from the particle's actual location on the surface of the coating. Cell membrane 125 that covers the cyprid body also covers the walking appendages 119, but is not shown as a separate layer on the walking appendages 119. The thoracic swimming muscle structures 118 and caudal walking antennae ("walking legs" on head) 119 muscle structures of the larval form is thrown into spasm because of inhibition (blocking) of gamma aminobutyric acid (GABA) receptors represented by structures 126 on cell membrane area 123 on these walking appendages caused by the copper in these alloy particles. Furthermore, such inhibition of the GABA receptors on the cell membranes of the larval forms sensitizes another receptor, the TRPV1 receptor, so that the larval forms become more sensitive to the presence of capsaicinoid compounds that may be impregnated into outer layer 98 along with the CuZnSn alloy and other chemically active substances as will be explained later in producing noxious "pain" signals. The muscular spasms caused the cyprid to be repelled off the surface of the coating to settle somewhere else.

In the case of veliger larvae of invasive mussels, it is the veliger "foot" (not shown) that performs this surface exploring and attachment function. It has been shown that the surface of the outer polymer layer exposed to the surrounding water needs to have only 30% of its area impregnated with exposed alloy particle powders to have total larval repulsion ability across the entire outer polymer layer surface because of the extent of the alloy particle's chemical influence beyond the actual location of the particle itself within the polymer matrix of outer layer 98. The tin prevents the dezincification exit of zinc atoms out of the alloy, as described above, which would otherwise weaken the alloy and allow release of copper atoms into the water. Additionally, the local presence of zinc atoms in the alloy may be in equilibrium with chelated zinc atoms contained within another chemical substance in the outer polymer layer, such as zinc pyrithione 108, thereby preventing the zinc pyrithione from dissociating into Zn+2 ions and pyrithione-1 ions with subsequent leaching into the surrounding water. Thus the presence of the alloy powder in effect makes the zinc pyrithione (ZPT) even more water insoluble than it already is. Copper pyrithione, also used in some ablative paints with and without copper, can be impregnated into the outer polymer layer as an alternative, and the copper in the tin brass alloy powder will prevent that compound from dissociating into copper ions and pyrithione ions which will then leach undesirably into the water.

The presence of the alloy will retard chemical and galvanic corrosion against the coating and the underlying structural surface being protected, especially by seawater. Furthermore, not only does blocking the GABA receptors of the larval forms by the copper in the tin brass alloy powder prevent proper settlement and body movement, but the copper also interferes with the developing larvae so that those larvae that were not repelled off the surface cannot develop further by inhibition of chemical processes in their cellular membranes. Thus cyprid and veliger development and progression to the next stage of development, the juvenile mussel or barnacle 114, is prevented thereby preventing the penetration of the outer polymer layer 98 and the subsequent attack on the inner polymer layer 99 as shown in FIG. 2.

In addition, touching of the copper atoms in the alloy powder by the antennae "walking legs" of the larvae causes disruptions in the integrity of their cell membranes causing them to drop away from the surface of the coating. This occurs because wherever the larvae touch the surface of the outer polymer layer with their cellular membranes, the copper atoms in the alloy is converted to copper ions in the vicinity of that cellular membrane making for an unfavorable environment for attachment, settlement, and progression to the juvenile stage. It is a very similar phenomenon to the manner in which a brass door knob inhibits bacterial growth on its surface.

The inclusion of tin in the alloy is totally safe for the environment with no known toxicity of significance. The use of tin in this application to repel animal biofouling organisms has no relationship to the organotin compounds (TBT). Whereas organic tin compounds can be toxic to the aquatic environment, the inorganic tin described herein is not. Like the copper and zinc of this alloy, the tin also does not leach into the surrounding water because of the interatomic forces holding together metal alloy atoms together. The alloy 107 is insoluble in water and totally non-reactive with either saltwater or freshwater. Furthermore, not only is the alloy 107 non-ablative, but also the polymer 116 in the outer polymer layer 98 is non-ablative. Though all of the tin remains in the alloy, the doping of the alloy with small amounts of tin enhances the antifouling effect over that of plain non-tin brass alloys. Thus, because all component atoms of this alloy remains in the alloy, and the manner in which the alloy is used in this outer polymer layer of the polymer coating where it remains entrapped in the polymer matrix, this cupro-metallic alloy is safe for the environment and remains unchanged physically and chemically from exposure to the surrounding water for extremely long periods of time.

A further component of the outer polymer layer 98 is a chemical component 109, which may include a capsaicin or capsaicin-like material, such as nonivamide. Nonivamide is a synthetic capsaicin-like material, similar to capsaicin and capsaicinoids that occur naturally in chilis and other plants. Nonivamide has a Scoville heat unit (SHU) pungency rating of 9.5 million when in 100% purity. Nonivamide is over half as potent as the strongest natural capsaicinoid. Nonivamide is non-volatile and water insoluble. Nonivamide may be substituted by any of the capsaicinoid compounds known to naturally occur in species of chili pepper, crushed extract powder or oil of the chili pepper itself, or it may be substituted by any synthetic compound with capsaicinoid properties that act as an agonist to the capsaicinoid receptor (TRPV1) receptor.

When the outer polymer layer 98 is impregnated with a chemical 109, such as nonivamide, it protects the coating from bio-proliferative processes that would destroy the coating and the protected submerged surface structure beneath it. The capsaicin-like chemical 109 stimulates a receptor on the biofouling animal organism, the TRPV1 receptor, also known as the capsaicin or vanilloid-1 receptor, structure 121 on FIG. 2, located in "walking leg" cell membrane area 120. The stimulation of this receptor causes a noxious stimulus, analogous to pain in higher evolutionary organisms such as mammals, to be felt by the settling larval forms of barnacles (cyprids) and invasive tiger and quagga mussels (veligers), as well as other biofouling animal organisms, including both calcium and non-calcium forming animal organisms. The reaction to the chemical 109 causes an instant recoiling of the organism off the surface, thus repelling them from the coating to settle elsewhere.

The TRPV1 receptors 121 can be made more sensitive to capsaicinoid compounds when GABA receptors on the cell membrane (area 126 on FIG. 2) close by are inhibited by copper atoms or ions provided by the interaction of the larval cell membrane with the copper in the tin brass alloy powder. The TRPV1 receptors are located in the "walking legs" 119 of the cyprids. The TRPV1 is represented by structure 121, located in "walking leg" cell membrane area 120. Tunicates, such as the problematically invasive tunicate, Morula Manhattensis (also known as Sea Grapes or Sea Squirts), also possess these receptors. In that, the activation of this TRPV1 receptor by nonivamide is similar in action to that of the blockage of the GABA receptor by entrapped copper atoms in the alloy 107, with both operating together in a synergistic manner to cause repulsion of the larval forms off the surface of the coating and its outer polymer layer, preserving the integrity of that layer. The capsaicin-like chemical 109 may have a purity of 95% or greater, and its compositional weight in the outer polymer layer may be about 1% to about 10%, with a specific illustrative value of 3%.

The bilayer coating may further include a chemical substance known as medetomidine 110, as shown in FIG. 1. Medetomidine 110 may be impregnated into the outer polymer layer 98, to synergistically enhance the repulsion effect of the nonivamide 109 and alloy powder 107 on bio-proliferative processes caused by settlement of larval forms of biofouling animal organisms, as a further mechanism to protect the outer polymer layer of the coating, which, in turn, protects the inner polymer layer 99 of the coating. Like the nonivamide 109 and the powder alloy 107, the control mechanism of the medetomidine 110 for bio-proliferative processes attacking the coating will be its interaction with a cell membrane receptor on the invading larval biofouling animal organism, known as the octopamine receptor represented by structure 122 on cell membrane area 127 of the "walking legs" 119, analogous to the alpha-2 adrenergic receptor in mammals and humans responsible for blood pressure control and other functions. The d-isomer of medetomidine, dexmedetomidine, can be used as well.

Clonidine, used as a human anti-hypertensive medication will also stimulate the octopamine receptor. For the purposes of this invention, medetomidine, dexmedetomidine, or clonidine or any other compound that can stimulate the alpha-2 adrenergic receptor in mammals and humans, can be used as chemical 110 in a non-ablative coating comprised of a polymer 116 impregnated with these chemical substances. These chemical substances are effective in concentrations by weight of about 0.01% to about 10%. Sensitivity of the octopamine receptor to these agents allows for extremely small concentrations to be effective, with an illustrative range of about 0.01% to about 1% by weight composition of the outer polymer layer 98 being specifically contemplated.

The octopamine receptor was named for the human pharmacological agent, Octopamine, also known as Synephrine, a human decongestant. In addition to octopamine, medetomidine, dexmedetomidine, and clonidine, the following biologically and chemically active agents that are alpha2-adrenergic receptor agonists (stimulants) may be used as chemical 110: Fadolmidine, Guanfacine, Guanabenz, Guanoxabenz, Guanethidine, Xylazine, Tizanidine, Methyldopa, Methylnorepinephrine, Norepinephrine, Amitraz, Detomidine, and Lofexidine. Other chemical substances that may be included as the chemical 110 would be chemical substances that effect both alpha-1 and alpha-2 adrenergic receptors, such as Xylometazoline, Oxymetazoline, Apraclonidine, Cirazoline, Epinephrine, Ergotamine, Etilefrine, Indanidine, Mephentermine, Metaraminol, Methoxamine, Mivazerol, Naphazoline, Norfenefrine, Phenylpropanolamine, Propylhexedrine, Rilmenidine, Romifidine, Synephrine, and Talipexole. Any of these drugs may be used in this described manner to repel biofouling animal organisms from the outer polymer layer 98.

Like the alloy powder 107 affecting the GABA receptors to induce muscle spasm in the biofouling larval forms, resulting in repulsive behavior of the larvae from the submerged surface, and the nonivamide affecting the TRPV1 receptor, causing withdrawal of the walking appendages of the larvae from the submerged surface causing a repulsive behavior, the medetomidine, dexmedetomidine, methyldopa, oxymetazoline, or clonidine and other drugs of this class, by stimulating the octopamine larval receptors, causes the cyprid walking legs to go into severe spasm and convulsive shaking, preventing settlement. The organism then cannot settle on the coating service, and thus has to try to settle somewhere else. In accomplishing the stimulation of the octopamine receptors, it synergistically reacts with the alloy powder 107, blocking the GABA receptor, and the nonivamide 109, stimulating the TRPV1 receptor, and the action of all of these effects on the larvae membrane receptors forces the larvae to disengage from the protective outer polymer layer 98 and float away back into the water to try to settle someplace. This process of repulsion from the surface of the outer polymer layer is illustrated in FIG. 2. The synergistic combination of simultaneous activity of these three types of chemical compounds in the same outer polymer coating layer on three different receptor sites of the larval membrane provides for an efficient and effective method of repulsing the biofouling larvae before they permanently attach themselves to the coating and begin to develop into juvenile biofouling animal organisms. The effects on all three biofouling animal membrane receptors are reversible, and that effect dissipates once the animal is repelled from the surface, so that the organism is not permanently harmed. Such an arrangement of multiple receptor modulating chemical agents being placed within the same polymer layer has not been previously described. The resulting high effectiveness through synergistic pharmacologic pathways involving three different pharmacologic sites of activity and three different biological receptor sites have not been employed before in a coating system designed to protect a coating and its coated surface and structure from damage, deterioration, and discoloration from bio-proliferative processes.

A further component that may be used in the outer polymer layer 98 is zinc pyrithione (ZPT) 108. The outer polymer layer 98 may be impregnated with water-insoluble and water-non-reactive zinc pyrithione to prevent proliferative biological processes that include fungal, bacterial, and algal organisms. Combined with the other chemical substances impregnated in the outer polymer layer, ZPT will inhibit calcium formation from, e.g., barnacles, ship worms or marine borers, and invasive mussels, and will further prevent and non-calcium-forming organisms, including tunicates such as Golden Hearts and Sea Grapes, from producing an infiltration into the outer polymer layer. This prevents the discoloration, corrosion, damage, deterioration, and disruption of that outer polymer layer 98. It also has activity in preventing proliferation of the Sea Grape tunicate, Morula manhattensis, when it is combined with cupro-metallic elements such as cupro-nickel, brass and bronze powders and nonivamide. The combination of cupro-metallic alloy powder, $Zn^{+2}$ ions, Pyrithione-1 ions, TRMV1 receptor effects of nonivamide, all interfere with the settlement of ova and sperm from these tunicates onto the outer polymer layer 98, and also causes withdrawal from the surface. This combination of chemically active substances is the only known combination that has effectively inhibited the rapidly proliferating invasive species known as the tunicate, Morula manhattensis.

Furthermore, ZPT inhibits ATP synthesis and cellular breathing in biofouling animal organisms, causes severe iron starvation, and produces DNA damage. When the cupro-metallic alloy powder 107 is added, the repulsive effects of the coating are enhanced over just using the zinc pyrithione (ZPT) 108 and the nonivamide 109 with or without the medetomidine. This novel combination of alloy powder 107 with ZPT 108 is effective against all known biofouling plant and animal organisms, even when tested without the nonivamide 109. The combination of all three of the ZPT 108, nonivamide 109, and the alloy powder 107 is synergistically the most effective composition against these tunicates and this result can be further enhanced through the incorporation of medetomidine or a similar chemically active agent in the same class of chemical compounds that was enumerated above.

The manner in which the ZPT is used in the coating is unique in several other respects. ZPT is not emitted into the water, in contrast to the action of a decomposing ablative copper paint, but rather is held fixed in a water-insoluble state within the highly stable matrix of the polymer 116 of the outer polymer layer 98, with ZPT molecules being exposed but fixed in location only at the surface of the outer polymer layer 98. The presence of the powdered alloy 107 retards any tendency of the ZPT 108 to dissociate into its components and dissolve in the water. The outer polymer layer 98, which has the ZPT 108 impregnated within it, is in a different layer than that of a cupro-metallic substance, which is in the inner polymer layer 99, thereby preventing the ZPT 108 from chemically reacting with the cupro-metallic substance (such as a copper salt). Such a reaction would otherwise produce copper pyrithione, which is more harmful to the environment than ZPT.

This is a serious problem with ablative paints that have both ZPT and a cuprous salt in one paint layer. The ablative paint layer sheds the combination of the two chemical agents into the water, allowing the formation of copper pyrithione in the water environment along with the dissolution of the hydrolysable acrylic co-polymer paint matrix (e.g., self-polishing or soft ablative paint) or the chemicals are released into the water with the paint matrix remaining intact (e.g., hard ablative paint). This conversion of ZPT to copper pyrithione never occurs in the present embodiments. Not only is the ZPT entrapped within the outer polymer layer, the cuprous salt, copper, or metallic copper alloy is trapped within the inner polymer layer, so that the two never touch. In addition, because neither layer is ablative, neither chemical agent makes it into the water to allow for the production of copper pyrithione (CPT) and daughter products, copper and pyrithione ions.

Note that CPT, like ZPT, is very poorly soluble in water. Normally only a small amount of daughter products (copper and pyrithione ions) that are toxic to the environment are produced. However, in an ablative paint, CPT, like ZPT, is widely disbursed into a body of water such as an ocean, harbor, or lake over a considerable amount of time, until the entire chemical agent load (with or without the paint coating on the boat) has been discharged into the water. In such circumstances, a very large amount of chemically active substance is released and has been shown to produce highly undesirable effects on the aquatic environment for both products.

In the case of the ZPT, the zinc ions are generally non-toxic to the aquatic environment, while the pyrithione ion is, and with CPT, both the copper ions and the pyrithione ions are toxic to the environment. In fact, with an ablative paint coating, the entire ship's coating load of ZPT, and (in a few cases of paint coatings, CPT as well), as well as the entire ship's load of whatever copper salt is used in the ablative paint, would be discharged into the body of water over a one to two year period of time.

None of this occurs with the embodiments of the present invention. CPT can be used in the outer polymer layer of the present coating in the same manner, and with the same effectiveness, as ZPT, because the coating is non-ablative and CPT, like ZPT, would be entrapped in the matrix of the polymer of the outer polymer layer. However, because CPT is trapped in the polymer matrix of outer polymer layer 98, and the copper atoms in the tin brass alloy powder would stabilize the cupper atoms from going into solution as cuprous and cupric ions, like ZPT which is stabilized by the same two exact mechanisms, it may be used with safety to the environment. Because copper ions are more problematical to the environment than are zinc ions, even though the amount of zinc or copper ions that would be released into the water is miniscule, CPT would be used preferentially in the inner polymer layer as would other copper salts, because the chemically active agents in the inner layer never touch the water. However, CPT is also safely useable within the coating layer structure of this invention.

In addition to the physical separation of these compounds, the outer polymer layer 98 covers and shields the inner polymer layer 99 to prevent the interposition of seawater, which would otherwise trigger the conversion of ZPT to copper pyrithione if the two substances were to come into contact with one another.

ZPT also mitigates and eliminates the bio-proliferative processes of scum, algae, fungal, and bacterial proliferation. If these processes are left uncontrolled, aside from providing increased nourishment to larval forms of biofouling animal organisms trying to settle, a thick biofilm layer may form, such that larval forms may never reach down to touch the surface of the outer polymer layer 98 with its repulsive biological active substances. By preventing the formation of such a biofilm, the inclusion of ZPT prevents the larvae from settling and developing into juvenile forms which would be able to penetrate the outer polymer layer 98.

The outer polymer layer 98 thus forms a system comprised which may include different components, some of which may be water-insoluble chemical ingredients, and which may include cupro-metallic alloy powder 107, nonivamide 109, medetomidine 110, and zinc pyrithione (ZPT) 108 impregnated into a polymer coating 116 to form a structural coating layer that will prevent both calcium- and non-calcium-forming organisms from positioning themselves onto and within the outer polymer layer 98 of the coating, thereby preventing its discoloration, corrosion, damage, deterioration, and disruption from proliferative biological process caused by such biofouling animal organisms as well as plant organisms. These components of the outer polymer layer 98 give long-term, multi-year protection of the inner polymer layer 99, and hence the protected surface structure underneath that inner polymer layer, not only from the bio-proliferative processes, but also the chemical, galvanic, and corrosive processes that emanate from within the surrounding water that are exacerbated by the bio-proliferating processes if the latter are uncontrolled.

The synergistic activating effect of the nonivamide 109, medetomidine 110, and the alloy powder 107 on three separate biological membrane receptors of the larval forms, cyprids of barnacles, and veligers of invasive quagga and zebra mussels, and other types of biofouling animal organisms, enhances the efficacy of the outer polymer layer 98. Simultaneous activation of 3 classes of larval membrane receptors simultaneously, including octopamine receptors by medetomidine (and similar chemicals), TRPV1 receptors by nonivamide, and GABA receptors by the alloy powder, which all produce repulsive convulsive activity in the muscle or contractile organs of the larvae of these biofouling animal organisms, ensures that the great majority of the larval forms will be repelled. Thus, even if an individual larval form may have developed resistance in the form of a receptor type and is resistant to the complimentary chemical substance stimulating or blocking it because of mutational variants developing during proliferation, it is highly improbable that a larval form will be resistant simultaneously to all three of these chemical substances used in the outer polymer layer 98.

The number of larval forms that actually do settle on the outer polymer layer 98 is reduced to a miniscule amount, which means the number of larval forms that settle and develop into juvenile forms that can puncture through the outer polymer layer 98 and into the inner polymer layer 99 will also be miniscule. Thus the integrity of the inner polymer coating 99 and secondarily the submerged protected surface structure 105 is extended for a much longer period of time. This ensures the integrity of the outer polymer layer 98, which in turn is responsible for protecting and maintaining the integrity of the inner polymer layer 99 by preventing corrosion, damage, and deterioration of the inner polymer layer 99 from chemical, ultraviolet, galvanic, and proliferative biological processes initiated in and from the surrounding water. These cell membrane receptor active chemical structures, alloy powder 107, nonivamide 109, and medetomidine 110 (and similar compounds), plus the biological activity of zinc pyrithione 108, plus the extremely durable, UV and chemically resistant polymer 116 (e.g., PUR or FUR) produces an outer polymer layer 98 that is completely non-ablative and that produces a mechanism of protection for the outer surface of the polymer coating structure, and hence the rest of the polymer coating and the protected surface underneath, and at the same time prevents chemical contamination of the surrounding water.

The inner polymer layer 99 further includes measures to protect it from any agents that make it past the outer polymer layer 98. This further protection of the inner polymer layer 99, which further protects the underlying submerged surface structure, may include additional components of the coating. One such component of the inner polymer layer 99 may be an epoxy polymer 115, of which there are many varieties including single component systems, two component systems, moisture cured epoxies, and epoxies capable of curing underwater, as well as epoxy systems that can also function as metal rich (aluminum or zinc) epoxy primers. The epoxy polymer 115 may be applied to structures prior to their submergence into seawater or freshwater which is the usual case. However, there are certain advantages of employing an epoxy that can cure underwater. The nature of this epoxy polymer, which is the preferred embodiment of this invention, allows hardening and curing underwater, so that the epoxy polymer 115 can be applied to structures that cannot be removed from standing water, or it can be applied to structures that have already been placed in the water or to structures that are intermittently in water but cannot be removed from water such as bridge pylons in a tidal body of water. The epoxy polymer 115 may not be resistant to ultraviolet light, but that protection is afforded by polymer 116 of the outer polymer layer 98; PUR is UV resistant, and FUR is exceptionally UV resistant. The epoxy polymer 115 may have a high adhesion to the underlying protected surface 105, for example being able to resist a pulling pressure of up to 2500 pounds per square inch as in the case of the epoxy polymer system. The epoxy polymer 115 may be somewhat flexible, and thus may be resistant to flexing movements of the submerged surface as in the case of the epoxy polymer system. While a specially formulated epoxy material may be used to achieve these purposes, any suitable epoxy polymer having these characteristics listed above may be used, including zinc- and aluminum-rich primers. An inner primer polymer layer 104 may be used. In addition, any of the polymers described herein as being suitable for the inner polymer layer, including epoxies, polyureas, polyaspartates, polyurethanes, fluorourethanes, and polyesters such as vinyl, phthalic, and unsaturated polyesters, may be used as well for the inner primer polymer layer.

Chemical substances may be added to the inner polymer layer 99 to protect the coating and against damage caused by bio-proliferating processes of a biofouling nature. Not all biofouling larvae are stopped at the outer polymer layer 98. A certain small percentage of the larval forms that are supposed to be repelled by the outer polymer layer may not be repelled, for example because they are resistant or because they develop resistance by the chemoreceptors of their "walking legs" even to the wide array of synergistic chemical compounds in that layer designed to repel them off the surface of the outer polymer layer 98. These larval forms 117B, referring to FIG. 2, may settle and proceed to grow into juvenile barnacles 114, mussels, marine shipworms, tubeworms and so forth, leading to minute punctures of first the outer polymer layer 98 and then the inner polymer layer 99. This would be normally the first step in the compromise of the polymer coating, as these juvenile animals would mature into mature adult biofouling animal organisms.

However, when the larva, now a juvenile form 114, punctures the interface boundary 128 between the two polymer layers, and its cellular membrane, designated by cell membrane area 124, that is now attached to cupro-metallic compound particle 129, the juvenile form 114 will encounter chemically and biologically active cupro-metallic and other substances that will interfere with the biofouling animal's metabolic processes to the point of immediately stopping its growth and development, and shortly afterwards causing its demise, thus preventing further damage and loss of integrity of the inner polymer layer 99 and to the entire coating as a whole. The inactivated or deceased juvenile barnacle 114A drops away from the polymer coating.

While there are a myriad of different chemical substances in the inner polymer layer that can be used for this purpose without environmental harm, because the inner polymer layer 99 is covered by the outer polymer layer 98, chemical substances may be used that have some form of copper-containing substance without any negative environmental effect. These chemically active substances can include one or more of a group of copper materials, including cupro-metallic alloys such as cupronickel, cuprozinc (brass), cuprotin (bronze), cuprosilver, and the tin-containing copper-nickel-tin alloy described above. These alloys may be in powdered form, flakes, or cupro-metallic salts that may be either water insoluble or water soluble, but that are capable of reacting either with the chloride ion of seawater or the hydrogen ion of fresh water. The inner polymer layer protects its own integrity using these compounds, and thus protects the integrity of the submerged protected surface structure underneath it, by eradicating and killing on the spot the invading juvenile biofouling organism 114 within the protective coating structure. This is in contrast to the outer polymer layer 98, which repels organisms. Thus, no further structural damage is done to the inner polymer layer 99 or the polymer coating as a whole, or to the protected surface 105 underneath the coating, as further continued growth of the biofouling animal organism into a full adult biofouling animal, the entity which is responsible for damage, deterioration, and discoloration of the coating, is prevented.

In ascending order of effectiveness, the inner polymer layer 99 can be impregnated with any one or more of a group of cupro-metallic substances including copper powder, copper flake, cupro-nickel powder or cupro-nickel nano-powder, cupro-tin (bronze) powder, cupro-zinc (brass powder), cupro-silver alloy, and the copper-zinc-tin alloy that may be used in the outer polymer layer 98 of this invention as well. If the copper-zinc-tin alloy is used in the inner polymer layer 99 as well as the outer polymer layer 98, it may be used in a much higher concentration by weight of the inner polymer layer 99, for example up to as much as 75% by weight of the inner polymer layer 99. At this significantly higher concentration, the metallic copper, either in its native form, or as a cupro-metallic alloy will be lethal to the invading juvenile organism 114, inducing within it copper heavy metal enzyme dysfunction by the following mechanisms: cellular membrane disturbance and damage, free radical oxygen species generation, and damage to proteins, enzymes, RNA, and DNA. Copper atoms or ions in high enough concentrations are lethal to the juvenile organisms, rather than just causing repulsion and settlement prevention via blockage of the GABA receptors in the larval forms at the lower concentration of the cupro-metallic alloy powder 107 used in the outer polymer layer 98.

Mixtures of cupro-metallic salts, both water insoluble salts and water soluble salts, are even more effective in arresting bio-proliferative processes at the interface 128 of the inner polymer layer 99 and the outer polymer layer 98 than just employing metallic copper or cupro-metallic alloys. To maximize the eradicating power of the inner polymer layer 99, certain embodiments in this invention employ a mixture of copper-zinc-tin alloy with a cupro-metallic salt. The cupro-metallic salt mixture may cuprous oxide, because it is water insoluble and for its efficacy in producing cuprous Cu+1 ions and copper hydroxychloride ($Cu_2(OH)_3Cl$), also known as tribasic copper chloride, that are deleterious to bio-proliferative biofouling animal organisms. While being more water soluble than cuprous oxide, whereas cuprous oxide reacts with salt water to give copper hydroxychloride, the copper hydroxychloride does not react any further with seawater. The combination of high concentrations of cupric ions (that change to cuprous ions) from the copper hydroxychloride, with the direct copper effects from the powder alloy, is especially efficacious. The combination of impregnating both cuprous oxide and copper hydroxychloride into the inner polymer layer is also especially efficacious as a source of cupric and cuprous ions to eliminate the proliferation of the juvenile biofouling animal organisms before they destroy the coating.

In general, the Cu+1 cuprous salts such as cuprous thiocyanate, cuprous oxide, cuprous sulfide tend to be water insoluble (with some exceptions such as cuprous sulfate which is water soluble), and the Cu+2 cupric salts tend to be water soluble, with some of them coming in the form of either hydrated crystalline form or anhydrous form. The cupric salts tend to range from mildly soluble in water such as cupric hydroxide or cupric (copper) hydroxychloride to very soluble in water, such as cupric sulfate, cupric nitrate, cupric chloride, and cupric gluconate. There are exceptions to these rules as cupric oxide, cupric thiocyanate, and cupric (copper) pyrithione (CPT) are also insoluble in water. The cuprous Cu+1 are more efficacious in this purpose of protecting the coating than are the cupric Cu+2 ions, and when Cu+2 ions react with the Cl−1 and other anions of seawater or the H+ ions in freshwater, the desirable Cu+1 ions are produced. However, any of the other water insoluble cupro-metallic salts can be used, including any one from a group comprising of cuprous oxide, cuprous chloride, cuprous iodide, copper naphthenate, copper resinate (reaction product of copper carbonate hydroxide with rosin), cuprous thiocyanate, cuprous sulfide, cuprous bromide, cuprous fluoride, cuprous hydroxide and cupric oxide which are all water insoluble like the cuprous oxide salt, as representative examples of this class of cupro-metallic salts. Cupric thiocyanate is water insoluble like the cuprous thiocyanate. Also, cupric pyrithione is water insoluble and cupric (copper) hydroxychloride is only slightly soluble in seawater. Furthermore, because of the bilayer structure of this coating, in which the outer polymer layer 98 covers the inner polymer layer 99, even if the cupro-metallic salt used were water soluble, the salt would stay within the coating and does not leach out into the surrounding water. Cuprous thiosulfate has two distinct advantages in that it can be used on an aluminum or steel hull without a primer, because it will not react in a galvanic manner to the hull metal, and it has a strikingly white color which avoids the need for additional white pigment when other salts such as cuprous oxide are used that generates a pinkish color to the boat's hull, which is considered undesirable by some boat owners who demand a white color to their hulls. To cover the pink color of cuprous oxide and other salts, a pigment may also be added to outer polymer layer 99.

Water soluble cupro-metallic salts that could be used in this invention, in either their hydrate crystalline state or anhydrous form, include one of a group comprised of the following: cuprous chloride, cupric chloride, cupric sulfate, cupric nitrate, cupric acetate, and are representative salts of this class of cupro-metallic salts. Mixtures of more than one cupro-metallic salt from the same group of cupro-metallic salts or from both groups of cupro-metallic salts may be used. Mixtures of water soluble and water insoluble cupro-metallic salts may be used, with or without cupro-metallic pure metal and/or cupro-metallic alloys, to give a wide range of functional compositions using forms of copper in inner polymer layer 99, which can be chosen on the basis of the particular application required and economic factors required for the desired application. A preferred mixture is a mixture of cuprous oxide, which when exposed to seawater and the chloride ion due to a juvenile biofouling organism piercing the outer polymer layer exposing a microscopically small area of the inner polymer layer to sea water, changes to copper hydroxychloride and copper hydroxychloride itself which does not react any further with seawater giving the coating a self-sealing property. This self-sealing property will also protect the inner polymer layer and the protected surface underneath in the event of an abrasive injury to the outer polymer coating from passing debris in the water as well; the very nature of and the intrinsic flexibility of the PUR and the FUR used in the outer polymer layer contributes to the self-sealing ability of the coating.

Note that in freshwater, where there are few chloride ions to drive the chemical reactions that most cupro-metallic salts use to produce cuprous ions in as large a quantity as with seawater, one can use cuprous oxide because of the reaction of this salt with the elevated H+ ion level often found in freshwater bodies of water. All of the above copper-related chemistry, because of the unique bilayer structure of the coating and its non-ablative nature, occurs within the coating itself and not in the surrounding aquatic environment. The location of the active chemistry at the level of the inner polymer layer 99 accounts for eradication of organisms that managed to pierce the outer polymer layer 98. In the same manner that nonivamide 109, medetomidine 110, ZPT 108 and powdered cupro-metallic alloy 107 impregnated into the outer polymer layer prevent damage, deterioration and discoloration to that outer polymer layer 98 of the protective polymer coating as well as the inner polymer 99 layer below it, the cupro-metallic substances impregnated within the inner polymer membrane protect that layer, the coating itself, and the submerged protected surface structure below it from damage from seawater and freshwater processes, especially the bio-proliferative processes which would otherwise open the way for additional damage to the polymer coating from chemical, galvanic, and corrosive processes originating in and from within the surrounding water.

In addition to the inorganic salts of copper and copper alloys that may be used in the inner polymer layer to provide protection from damage and deterioration from any biofouling organism that manages to penetrate the outer polymer layer, alloys of copper with one or more metal elements may also be used in the inner polymer layer. The metal elements alloyed with copper may be representatives of the group known as transition metals and post-transition metals, rows 4 and 5 on the Periodic Table, and may include yttrium, titanium, vanadium, chromium, manganese, iron, cobalt, nickel, zinc, zirconium, niobium, molybdenum, silver, indium, and tin as well as the heavy metal bismuth. Small amounts of oxides of these metals may be used, together with the cupro-metallic alloys, cuprous oxide, and other cupro-metallic salts, to increase the chemical effect of the cupro-metallic substance on any biofouling organism, thereby increasing the protective effect of the inner polymer layer from damage to either itself or the underlying protected substrate surface. When zinc oxide is added to cuprous oxide, for example in a ratio of 1 to 20 (with exemplary ratios ranging from 1 to 5 through 1 to 100), the zinc oxide will amplify the chemical effect on the biofouling organism, thereby increasing the protection of the inner polymer layer and the protected substrate surface underneath it.

Various combinations of the above-described features can be used to form a polymer coating. In one such combination, the outer polymer layer 98 may be include a polyurethane or fluorourethane polymer that is impregnated with zinc pyrithione or another metal pyrithione, in particular, copper pyrithione; medetomidine, dexmedetomidine, clonidine, or similar substance affecting the octopamine receptor; nonivamide or another capsaicinoid substance; and a copper-zinc-tin alloy powder. The inner polymer layer 99 may include an epoxy layer incorporating any epoxy system with a high adhesiveness to the underlying substrate protected surface and a preferential ability to cure underwater and that is impregnated with a water insoluble cupro-metallic salt (e.g., cuprous oxide), a water soluble cupro-metallic salt (e.g., cupric sulfate), pure elemental copper powder or flake, and/or cupro-metallic alloys (e.g., copper-zinc-tin alloy).

By example, another such combination, the outer polymer layer 98 may include a polyurethane or fluorourethane polymer that is impregnated with zinc pyrithione; nonivamide; and a copper-zinc-tin alloy powder. The inner polymer layer 99 may include an epoxy layer that is impregnated with a water insoluble cupro-metallic salt (e.g., cuprous oxide), a water soluble cupro-metallic salt (e.g., cupric sulfate), pure elemental copper powder or flake, and/or cupro-metallic alloys (e.g., copper-zinc-tin alloy).

In another such combination, the outer polymer layer 98 may be include a polyurethane or fluorourethane polymer that is impregnated with zinc pyrithione; medetomidine, dexmedetomidine, clonidine, or similar substance; and a copper-zinc-tin alloy powder. The inner polymer layer 99 may include an epoxy layer that is impregnated with a water insoluble cupro-metallic salt (e.g., cuprous oxide), a water soluble cupro-metallic salt (e.g., cupric sulfate), pure elemental copper powder or flake, and/or cupro-metallic alloys (e.g., copper-zinc-tin alloy).

In another such combination, the outer polymer layer 98 may be include a polyurethane or fluorourethane polymer that is impregnated with medetomidine, dexmedetomidine, clonidine, or similar substance and a copper-zinc-tin alloy powder. The inner polymer layer 99 may include an epoxy layer that is impregnated with a water insoluble cupro-metallic salt (e.g., cuprous oxide), a water soluble cupro-metallic salt (e.g., cupric sulfate), pure elemental copper powder or flake, and/or cupro-metallic alloys (e.g., copper-zinc-tin alloy).

In another such combination, the outer polymer layer 98 may include any combination of components described herein. The inner polymer layer 99 may include an epoxy layer that is impregnated with cupro-metallic alloy (e.g., copper-zinc-tin alloy) powder in a high concentration by weight with either cuprous oxide or copper hydroxychloride, with a total cupro-metallic substance being up to 75% of the inner polymer layer 99 by weight.

In another such combination, the outer polymer layer 98 may include any combination of components described herein. The inner polymer layer 99 may include cuprous oxide, with or without copper hydroxychloride, with a total cupro-metallic substance being up to 75% of the inner polymer layer 99 by weight.

In another such combination, the outer polymer layer 98 may include any combination of components described herein. The inner polymer layer 99 may include a mixture of any two compounds selected from water-soluble cupro-metallic inorganic salts, water-insoluble cupro-metallic inorganic salts, copper-zinc-tin cupro-metallic alloy, or pure elemental copper metal flake or powder.

These are just a handful of different combinations that are contemplated. In each of the combinations, the polymer coating is non-ablative in both polymer layers, and remains intact during the entire operational life of the coating. Each composition of the polymer coating may include copper and related cupro-metallic substances that used in a non-ablative manner that is safe for the aquatic environment.

Thus, the coatings described herein can promote aquatic environmental safety by the use of the copper-zinc-tin powder alloy in the outer polymer layer 98, which protects the integrity of that layer, the use of a synthetic capsaicinoid (e.g., nonivamide) in the outer polymer layer 98 to protect the integrity of that layer, the separation of ZPT in the outer polymer layer 98 from cupro-metallic compounds in the inner polymer layer 99 to prevent the formation of copper pyrithione on the surface of the coating, the use of a mixture of cuprous oxide and copper hydroxychloride in the inner polymer layer 99 to protect the integrity of that layer from bio-proliferative processes, and the use of water-soluble cupro-metallic salts in the inner polymer layer 99 to protect the integrity of that layer in a manner that is safe for the aquatic environment.

The use of the element copper in two different chemical forms simultaneously, in two non-ablative layers, where the copper is in an elemental alloyed powder form in the outer polymer layer 98, and the copper is in a cupro-metallic salt in the inner polymer layer 99, with or without elemental copper either in a pure elemental powdered or flaked state, or in an alloyed elemental powdered state, protects the integrity of the inner polymer layer and the submerged surface structure beneath it. Mixing water-soluble and water-insoluble cupro-metallic salts together, with or without the presence of the copper-zinc-tin powder alloy or pure elemental copper in the inner polymer layer 99 enhances the production of copper ions within the inner polymer layer 99 to prevent damage to the inner polymer layer 99 by bio-proliferative processes that would otherwise attack that layer, and such protection of the inner polymer layer leads to protection of the coating itself and the protected submerged surface structure underneath it.

The non-ablative outer polymer layer 98 protects the integrity of the inner polymer layer 99 of the coating beneath by preventing chemical, galvanic, corrosive, mechanical abrasive and frictional, radiant (UV), and bio-proliferative processes emanating from the surrounding water from reaching and damaging the inner polymer layer. The non-ablative outer polymer layer 98 protects the integrity of the non-ablative inner polymer layer 99, which, in turn, protects the integrity of the entire non-ablative polymer coating, which in turn protects the integrity of the submerged protected surface structure.

The coating structure of one non-ablative outer polymer layer 98 covering a second non-ablative inner polymer layer 99 allows complete containment of the chemical substances impregnating the inner polymer layer 99 within that layer, thereby allowing the use of a wide variety of cupro-metallic substances to be used with complete safety to the surrounding aquatic environment in the process of protecting the submerged surface structure beneath it. Such a bilayer non-ablative structure allows, in addition to or instead of a cupro-metallic chemical substance, any chemical compound or combinations of chemical compounds that can be used to protect the inner polymer layer 99 from damage, corrosion, deterioration, and discoloration caused by bio-proliferative processes and secondary damage from chemical, galvanic, and corrosive processes resulting from such bio-proliferative processes, as long as the chemical substances impregnating the inner polymer layer are physically and chemically compatible with each other and with the polymer constituting the inner polymer layer 99.

Given that boat hulls and other structures can be painted with up to a dozen layers of coating, the number of inner polymer layers in addition to the outer polymer layer 98 comprising the complete polymer paint coating may exceed one, and as many as a dozen such inner layers, with adjacent layers containing the same assortment of biologically and chemically active substances to result in thicker inner polymer layers, or adjacent layers can contain different biologically and chemically active substances and compositions so as to create a myriad of possible embodiments and extensions to the protective polymer coating compositions comprising the principles and features of this invention.

To explain further the protective mechanisms to the coating that happens at the inner polymer layer 99, copper ablative paint is used in all bodies of water throughout the world, causing excessively high and toxic copper concentrations that are detrimental to the aquatic environment, especially in areas of high shipping density and low water velocity such as harbors and marinas. Certain legal jurisdictions, such as the State of Washington, had banned the use of copper antifouling paints, and the State of California had planned to do so, only to refrain because of a lack of any suitable alternatives that worked against biofouling contamination of ship hulls. However, the inner layer 99 of the multi-layer coating described herein can be impregnated with a cupro-metallic salt that is water soluble or insoluble, with or without elemental copper in either a pure elemental powdered form or an alloyed powder form at a weight concentration of 5% through 75%. That cupro-metallic substance, be it a copper salt, elementally pure copper, or cupro-metallic alloy, never leaches into the water.

In contrast, ablative copper paints may employ multiple layers, but the purpose of the multiple layers is for producing on the ship's hull a paint coating of desired thickness with each layer having the same composition as the layer underneath. The purpose of the top layer of copper ablative paint is the same as the underneath layer of copper paint. All of the layers are ablative and discharge their load of copper substance into the water surrounding the ship with (soft ablative paint) or without (hard ablative paint) disruption and discharge of the paint matrix and its resulting breakup products into the water.

Using non-ablative materials, where chemical substances are sequestered in different polymer layers, produces compositionally different polymer layers whose function is different from each other and where the function of the outer polymer layer 98 is executed to protect the inner polymer layer 99 underneath first, and then the function of the inner polymer layer is executed next in a sequential process. The coating and the submerged protective surface are protected by first repelling larval forms and then by inactivating the juvenile forms that managed to settle in spite of the first layer. As soon as larvae penetrate the boundary between the outer polymer layer 98 and inner polymer 99 layer, being as small as 0.1 mm in diameter, they are be inactivated and eliminated once they touch and penetrate the inner layer.

The presence and absorption of the copper salt or other cupro-metallic substance by the juvenile barnacle or mussel at their point of attachment to the surface and the inner polymer layer leads to copper heavy metal disruption of the biofouling animal's cell membrane, enzyme functioning, and disruption of its proteins, DNA, and RNA. This process results in inactivation of the biofouling animal within the coating itself, or on its surface, but not within the water as in the case of the ablative copper paints. Once the biofouling animal is non-functional or deceased, it drops away, leaving a microscopic hole which quickly seals itself with a highly water insoluble copper salt, copper hydroxychloride, made from the interaction of seawater with that infinitesimally small hole and the infinitesimally small amount of cupro-metallic substance that it contains and that remained after the biofouling organism ingested some of the cupro-metallic substance. The sealing ability of the inner polymer layer is made more effective by the natural proclivity of flexible polyurethane and fluorourethane coatings comprising the outer polymer layer that are self-sealing for microscopic defects.

A small amount of cupro-metallic substance is thus absorbed into the biofouling animal organism, and whatever remains exposed is converted into the very poorly soluble copper hydroxychloride, sealing up that tiny hole quickly and preventing any leaching of copper salt or other cupro-metallic substance even from this tiny hole. The flexible membrane of FUR or PUR in the outer polymer layer 98 also helps seal up the miniscule sized hole. Before that happens, the area of exposure to seawater is so small that the tiny amount of cupro-metallic salt in that tiny hole quickly is either exhausted or covered by the relatively insoluble copper salt, (e.g., copper hydroxychloride), which makes up the green patina seen on copper alloys exposed to seawater.

Copper hydroxychloride is also known as dicopper chloride trihydroxide, Copper trihydroxyl chloride, and tribasic copper chloride—($Cu_2(OH)_3Cl$). It is also the major toxic product of copper based antifouling paints that is released into seawater, because of the ongoing chemical reaction of the seawater and its chloride ions with the copper salt co-polymer acrylic matrix cross-linker in the ablative paint. However, this same copper hydroxychloride compound in the present polymer coatings serves as a protective seal in the tiny hole created in the inner polymer layer of this invention (as well as actually being a suitable cupro-metallic salt in the inner polymer layer of this invention). There is no meaningful leaching of the cupro-metallic ions into the aquatic environment.

Furthermore, to eliminate one barnacle larva that attached itself to the ship's coating, with conventional ablative paints, the entire submerged ship's hull must be constantly leaching cupro-metallic ions into the aquatic environment during the lifetime of the boat to eradicate that one barnacle that could attach at any time during the operating lifetime of the boat. On the other hand, a boat coated with the two layer polymer coating described herein leaches only a miniscule, negligible amount of cupro-metallic ions through that one 0.1 mm hole for a few hours, before the coating seals itself up after the juvenile biofouling organism has been inactivated. The rest of the boat hull does not leach any cupro-metallic ions into the water.

As an example, a hole left by an inactivated juvenile barnacle will have a diameter of about 0.1 mm. This hole would leach cuprous oxide at a rate of about 1.0 microgram per $cm^2$ per day in seawater from a hole area of approximately $9 \times 10^{-3}$ sq. mm or $9 \times 10^{-5}$ sq. cm. for approximately 2 hours ($8 \times 10^{-2}$ day) before it is sealed up. In this example, the hole will thus leach approximately ($9 \times 10^{-5}$ sq. cm.)×($8 \times 10^{-2}$ day)×(1.0 microgram/sq. cm./day)=$7.2 \times 10^{-6}$ microgram or approximately $10^{-5}$ microgram of copper for each juvenile barnacle that managed to reach the inner polymer layer interface, a virtually unmeasurable amount. Compared to the leach rate of 1.0 microgram per $cm^2$ continuously per day, day after day from a ship hull that might have a surface area of 100 $m^2$, resulting in a loss of $10^6$ microgram per day for the whole ship's hull, or more than $10^{11}$ (100 billion) times as much as what would leach from a larva's breach of the outer polymer layer 98 described herein. And the loss of approximately $10^{-5}$ microgram per day would occur on only that one day when the juvenile barnacle attached itself until the hole sealed up. Even if a hundred juveniles made it to the inner polymer layer interface each day, which would not in all practicality happen, the amount of copper leached into the water per day from those juvenile barnacles as they are eliminated would amount only to $10^{-3}$ micrograms per day, or still 109 (one billion times) less than with the ablative paint.

Using a more realistic calculation of one juvenile barnacle puncturing the inner polymer layer per day on a reasonably sized ship, with a painted hull area of 100 sq. m., given that the hole will seal itself up in 2 hours, producing a daily loss of approximately $10^{-5}$ microgram as above per juvenile barnacle that made it to the inner layer, and given that a copper ablative paint may release up to 25 micrograms per $cm^2$ per day (6-25 times the minimal effective rate of $4 \times 10^{-6}$ micrograms per $cm^2$ per day known to be effective for eradicating barnacles), an ablative copper paint will release $2.5 \times 10^7$ micrograms per day from the entire ship's hull ($10^2$ sq. m.×104 $cm^2$/sq. m.×25 micrograms/$cm^2$/day=$2.5 \times 10^7$ micrograms per day=25 g=approximately one ounce of copper per day) or approximately $10^{12}$ times (one trillion times) as much copper per day by this ablative copper coating covering this reasonably sized ship hull as compared to the $10^{-5}$ microgram copper release per day by the non-ablative coating comprising this invention.

Furthermore, the inner polymer layer 99 with the cupro-metallic salt, elemental copper, or copper alloy, never touches the surrounding aquatic environment because of the shielding of the outer polymer layer 98 that covers and protects the inner polymer layer 99. Hence, there is no leaching of copper in its elemental or cupro-metallic ionic form into the aquatic environment. As a result, the use of copper salts in an antifouling coating can be safely used, and its effect of being an aquatic environmentally contaminant is for the most part eliminated as the two layer polymer coating performs its primary function to protect the submerged surface structure.

Additionally, the use of copper ablative paint-based elimination of biofouling in freshwater is less efficient than site-specific deterrence in marine salt water, and is ineffective in some cases. That is because freshwater contains no chloride ion to interact with the cupro-metallic salt to produce copper hydroxy-chloride. Instead, the copper salt in fresh water reacts with whatever hydrogen ions might be present in the body of freshwater to produce copper ions. This process is variable, because the pH of freshwater can be acidic or basic to varying degrees. Thus, the eradicating effect on freshwater invasive mussels such as the quagga or zebra mussel can be variable and, in some cases, negligible even though the copper and other additives in ablative paints such as ZPT are still released into the freshwater environment in copious amounts. Thus, ablative copper paint is not reliably an effective protection for freshwater immersion of surface structures.

In contrast, in the case of an outer polymer layer 98 as described herein, when the veliger larvae of the invasive tiger or quagga mussel (the most common biofouling animal organisms in freshwater) try to attach to the surface of the coating, they are repelled by the multiple mechanisms described already in detail that are produced by the active chemical agents in that outer polymer layer, and these multiple mechanisms do not need the chloride ion to operate successfully, and thus the outer polymer layer repels the larval forms of the invasive mussels equally as well in freshwater as in saltwater. Furthermore, in the case of an inner polymer layer 99 as described herein, when that inner layer 99 is reached by the occasional juvenile invasive quagga or zebra mussel that made it through the outer polymer layer 98, the point of attachment, known as the pedicle or foot, directly absorbs the cupro-metallic salt or elemental copper into the mussel's body in a significant dose relative to the small size and weight of the miniscule juvenile mussel's body, where it is converted into cupro-metallic ions, resulting in this cupro-metallic salt acting as an efficient internally acting lethal metabolic disrupter. Thus, in the freshwater environment as well, the juvenile mussel is eliminated in a non-ablative way, just as a juvenile barnacle would be eliminated in seawater, all without the leaching of the cupro-metallic ions into the freshwater environment.

While there is no copper hydroxychloride generated in the hole left behind in freshwater scenarios, the leaching of the cupro-metallic substance in the inner layer is only infinitesimal in amount over a few hours because in that tiny hole, the amount of copper that is exposed to the freshwater is miniscule and quickly exhausted. Again, because of its tiny size, the hole still seals up quickly even without the presence of copper hydroxy-chloride because of the other mechanism used by the coating to seal up the hole, namely by the flexible membrane represented by the fluorourethane or polyurethane polymer layer of the outer polymer layer 98. There is no damage to the coating by this hole.

One benefit of the segregation of different chemically and biologically active substances that first repel from the outer polymer layer 98 and then eradicate any biofouling animal organisms from the inner polymer layer 99, by locating the appropriate chemical substances in the outer polymer layer 98 and inner polymer layer 99 respectively, is that unwanted chemical reactions between these different substances are prevented. In contrast, ablative cupro-metallic paints may employ a cupro-metallic salt, mixed together in the same paint layer as zinc pyrithione (ZPT), another chemical substance that has an anti-proliferative effect on some biofouling animal organisms. In such paints, as soon as the paint matrix in the soft ablative paint decomposes into the water, shedding the cupro-metallic salt and the zinc pyrithione into the water together, there is a chemical reaction between the two agents that results in all of the zinc pyrithione being converted into copper pyrithione, because zinc is more chemically active than copper and thus copper replaces the zinc in the ZPT molecule as the zinc goes into solution as its ionic $Zn^{+2}$ form. As a result, copper ablative paints that produce copper pyrithione are very environmentally problematic, as copper pyrithione is extremely long lived, and toxic to aquatic life, much more so then zinc pyrithione. To a lesser extent this undesirable process happens with the hard ablative copper paint, where the paint matrix remains intact, but only the zinc pyrithione and the cupro-metallic salt is leached into the water. However, for the hard ablative paint to work, and for its contained chemical agents to be leached into the water as intended with this paint coating, water has to diffuse into the porous paint layer where this undesirable ZPT copper chemical interaction will occur within the paint coating itself because the ZPR and the copper salt are in the same layer.

In contrast, in a multi-layer coating as described herein, the zinc pyrithione may be in the outer polymer layer 98, and the cupro-metallic salt may be in the inner polymer layer 99, with both layers being non-ablative, so that this undesirable chemical reaction would never occur as the two chemical substances will never be in close proximity to each other. Note that the ZPT does not react with the copper of the Cu Zn Sn tin brass powder, even though they are both in the outer polymer layer 98. Three factors contribute to this: 1) both the ZPT and the brass powder are locked within the matrix of the polymer, 2) the zinc and tin atoms in the alloy powder locks the position of the copper atoms in the alloy solid solution of Cu, Zn, and Sn atoms, and, 3) the two molecules are not surrounded by water, which would otherwise allow the copper to replace the zinc in the ZPT. This contrasts to the case where an ablative paint would allow the zinc and copper atoms to be in close proximity with each other, surrounded by water, which allows the conversion of those atoms to zinc and copper ions, thereby allowing the reaction to form copper pyrithione via ionic replacement chemical and galvanic reactions.

A two layer coating may be placed on the surface to be protected before that surface is submerged in water. However, if a structure cannot be taken out of the water, like that of a pier, dock, bulwark, bulkhead, or bridge pylon, certain polymers can be applied in the presence of water and can be used in the antifouling coating, such as moisture cured epoxies and polyurethanes. In some cases, these materials can even be applied to surfaces already underwater. Such a water curing epoxy is the preferred embodiment of the current invention.

The coatings described herein may not include ablative materials. The inner polymer layer 99, though it may contain copper in many various forms, can be covered by the outer polymer layer 98 without impeding the functioning of the inner polymer layer 99, as the functioning of the two layers are completely independent of each other. The inner polymer layer's active chemical compounds, including cupro-metallic compounds, salts, and alloys do not function by leaching compounds into the water. The repulsion of the biofouling animal organisms by the active chemical compounds in the outer polymer layer 98 protects the integrity of the outer polymer layer 98, which in turn protects the integrity of the inner polymer layer 99 and the entire coating itself, and in turn protects the coated protected submerged surface structure.

Thus, two layered polymer paint coatings may help to protect both freshwater and seawater submerged surface structures and their protective coatings from disruption, discoloration, corrosion, damage, and deterioration resulting from chemical, ultraviolet, galvanic, and proliferative biological processes initiated in the water. The chemical activity of the compounds in the coatings has a primary function to protect each layer of the protective polymer coating and the protected submerged surface structure underneath from damage, discoloration, and deterioration that would result from uncontrolled bio-proliferative processes attacking the coating, with such damage in turn leading to further damage from chemical, corrosive, and galvanic attack from the surrounding water. The two polymer layers of the coating provide long-term protection from these same processes, insuring that the coating may have at least a ten-year operational life. The polymer used in the outer polymer layer 98 may be, as previously stated, either a polyurethane (PUR) or a fluorourethane (FUR), which provides ultraviolet light protection and mechanical durability and resistance to frictional and abrasive mechanical processes to the coating as well and the flexibility of PUR and FUR polymer coatings allow for a self-sealing property to be conferred to the coating thereby allowing self-repair of small defects in the coating that might be caused by attempted settlement of a juvenile barnacle or small collisions from debris in the water. Note that any of numerous varieties and classes of PUR's and FUR's may be used, based upon application and economic requirements and restrictions. Also, millions of different pigment hues and colors may be added to the outer polymer layer 98 for cosmetic purposes. Any of the polymers described herein, including polyureas, polyaspartates, epoxies, acrylic urethanes, and polyesters including vinyl, phthalic, and unsaturated polyesters, can be used in the same manner as FUR and PUR.

Bio-proliferative processes need not always involve living macro-biofouling animal organisms, such as barnacles, invasive mussels, marine borers (ship worms), tunicates, and tube worms. For instance, one such process deposits slime, that is a complex network matrix of protein laid down on the coating surface, and begins as soon as the surface is submerged in water. This can happen even without any macro-biofouling animal or plant organisms, and can be the result of microscopic biological activity. Scale deposits of calcium or magnesium carbonate can attach themselves if the water is saturated in these materials, or if the original occupiers of old shells leave their skeleton shells behind to precipitate more carbonate deposits into the water, or for that matter, provide new places for settlement of future biofouling animal organisms.

However, the extremely smooth low friction surfaces of PUR and especially FUR as compared to typical ablative paint coatings make it more difficult for these problems associated with scale to accumulate, any slime deposits would be removed even when the boat moved at low velocities, and the chemically active agents in the outer polymer layer would prevent any sizeable accumulation of a scum later from building up. Powdered PTFE (Teflon-®) or various silicone and siloxane additives can be added to the PUR or FUR of the outer polymer layer to facilitate even further the shedding of the bioslime layer from the hull at even the slowest of velocities of the boat through the water. These additives can also be added to acrylic urethanes, polyureas, polyaspartates, epoxies, and polyesters such as vinyl, phthalic, and unsaturated types of polyesters reducing the low surface friction of these polymers.

These additives, by reducing the coefficient of friction as well when the boat is moving at high velocities, greatly improve the performance of the boat in terms of speed for a given consumption of fuel and boat design. The combination of the biochemically active surface property of the outer polymer coating of this invention combined with these means to produce minimal friction on water movement by the outer polymer layer will allow the ship's hull to remain immersed in stagnant water in a harbor for very long periods of time without any more bio-proliferative accumulation on the hull than what would be accumulated if that protected surface structure was moving significantly (greater than 10 mph) with respect to the water. If a ship was to remain in stagnant water and unused for a period of months, gentle wiping of any bioslime layer that might accumulate with a cloth would greatly add to the cosmetic appearance of the boat and make it less likely that any accumulated bioslime would allow algae to take a foot hole on the hull, which might prevent other biofouling organisms from making contact with the chemically active substances on the surface of the outer polymer layer designed to repel them off the surface. Note that if a boat painted with a self-polishing soft ablative copper paint is in stagnant water and not used for a long period of time, the paint will work improperly, because there would be no moving water to wash away the decomposed paint matrix and therefore, the antifouling effect of the paint as it discharged its chemically active substances into the water while remaining stationary would be inconsistent and unreliable; effective use of soft ablative paint coatings would require significant motion of the boat relative to the water.

The inner polymer layer 99 may be impregnated with a water insoluble cupro-metallic salt, such as cuprous oxide, a cupro-metallic alloy, such as copper-zinc-tin at the weight percentage specifications described above, or elemental copper. These materials may function to keep the inner polymer layer 99 intact from disruption, deterioration, corrosion, and damage in the unlikely event that any of the chemical, ultraviolet, galvanic, and proliferative biological processes that are initiated in and from the surrounding water break through the outer polymer paint layer 98 to the inner layer 99. Any cupro-metallic salt may be used for this purpose, including both water-insoluble and water-soluble substances, as well as innumerable other active chemical substances that can slow bio-proliferative processes. Pure copper may be used in the form of >99% purity powder or flakes.

The polymer used in the inner polymer layer 99 may be an epoxy which provides tight adhesion to the protected surface and which is compatible with most cupro-metallic additive substances. The epoxy can be applied underwater to a surface to be protected that is already submerged. The cuprous oxide material helps to ensure that the inner polymer layer 99 will remain completely intact, without corrosion, damage and deterioration from these water initiated bio-proliferative associated processes. This, in turn, keeps the submerged surface underneath the inner polymer layer 99 protected from and completely free of corrosion, damage, disruption, and deterioration from these chemical, ultraviolet, galvanic, and proliferative biological processes that are initiated in the water surrounding the protected surface. This physical protective interaction between the two polymer paint layers, produced by the presence of the different specified ingredients impregnating the two polymer paint layers of the polymer coating, is responsible for protecting the submerged surface covered by that coating. The interlocking protections of the two polymer paint layers maintain help to achieve a long operational life and protection of the underlying submerged surface.

As already explained in this disclosure, the outer polymer layer 98 serves also to protect and shield the aquatic environment from exposure to the cupro-metallic salt, in this preferred case, cuprous oxide, or any other potent chemically active substances in the inner polymer layer 99. There is no leaching of the cuprous oxide salt into the aquatic environment, nor is there any macroscopic chemical reaction with the cuprous oxide salt with the surrounding seawater to produce copper hydroxychloride, which would otherwise be deposited in the aquatic environment. Any of the antifouling agents described herein may be used in the inner polymer layer 99 with the protection of the outer polymer layer 98, and there would be no harmful effects on the environment.

Even the various cupro-metallic alloys may be used in the inner polymer layer 99, although the increased stability of the cupro-metallic alloy makes it preferable to be used in the outer polymer layer 98, where it is well tolerated in the aquatic environment. One can compensate for the increased stability of the cupro-metallic alloys by using them at a much higher percentage by weight composition in the inner polymer layer 99 than in the outer polymer layer 98.

Thus, the only limitation on what biocidally active compounds can be used in the inner polymer layer 99 relate to the chemical and physical compatibility of the compounds with the polymer making up the inner polymer layer 99, as well as the biologically and chemically active chemical substances impregnating that inner polymer layer 99, and the physical and chemical compatibility with the material making up the protected submerged surface structure. Should there be any incompatibility between the active chemical compounds in the inner polymer layer 99 and the material comprising the submerged protected surface structure, an inner polymer primer layer can be placed between the inner polymer layer and the protected surface.

An example of this incompatibility is the inadvisability of applying the inner polymer layer with a cupro-metallic substance directly on an aluminum boat hull, because of the potential for galvanic interaction between the more chemically active aluminum in the boat hull and the more chemically noble, less chemically active copper in the inner polymer layer. The one notable exception is cuprous thiocyanate which can be used on both aluminum and steel hulls and its previously noted intense white color is useful as mentioned when a white color to a ship's hull is desired. In that case, an inner polymer primer layer may be used, formed from any appropriate polymer material, even the same polymer material as in the inner polymer layer such as an epoxy, but without being impregnated with any of the biologically active compounds used in the inner polymer layer. As seen in FIG. 1, the primer layer 104 may be placed upon the protected surface 105 before the inner polymer layer.

Even though the epoxy or any of the other described polymers in the inner polymer layer may be formulated to be compatible with either the fluorourethane or polyurethane outer polymer layer to be coated upon it, nevertheless, it is possible that one of the biochemically active substances in the inner polymer layer might be chemically or physically incompatible with one of the biochemically active substances in the outer polymer layer. This problem can be remedied as seen in FIG. 1, with an additional outer primer layer of the epoxy 103, without any chemically active compounds, placed between the inner polymer layer 99 and the outer polymer layer 98.

While the use of cupro-metallic metal, alloys, and salts in inner layer 99 have been described in detail, other heavy metals salts including zinc oxide, titanium oxide, oxides of iron, silver oxide, and similar such materials, can also be used. It is important to note that, while zinc oxide by itself has only a weak effect on biofouling animal organisms, it has been shown to synergistically enhance the biofouling antiproliferating effect of copper and its alloys and salts by up to 200 times when used in combination with the copper containing-substance. For this reason zinc oxide is especially useful in combination with cuprous oxide.

Zinc oxide forms a similar compound with seawater, zinc hydroxy-chloride ($Zn_2(OH)_3Cl$) that performs the same functions as previously described for copper hydroxy-chloride, namely a juvenile barnacle anti-proliferating effect and a sealing effect within the inner polymer layer 99. Again the outer polymer layer 98 covering the inner polymer layer 98 prevents any leaching out of the Zn ions into the environment, which like copper ions are detrimental, though to a lesser extent than the copper ions. The other heavy metal oxides, such as those listed above, would be expected to behave chemically very similar to the zinc oxide.

Another feature of this invention is that, after several years of the coating having been in use, there may be some degradation of the coating, in particular the outside polymer layer. This degradation may occur because of wear and tear, collisions with debris in the water, or an unexpected large number of barnacles, mussels, and other types of biofouling animal organisms in their juvenile forms that had tried to settle on the coating leaving microscopic defects that all might have changed the functional and cosmetic features of this coating. However, the coating can be easily augmented without removal of the existing coating. The process is simply to lightly sandpaper the existing outer polymer layer 98, clean the surface off with water, let dry, and then apply over the old polymer layer 98 a new outer polymer layer 98 with the same impregnated chemically active agents. If technology has advanced with respect to the means of preventing damage, deterioration, or discoloration caused by bio-proliferative processes to the protected surface and structure, the new outer polymer layer can contain a different selection of chemically active agents used for this purpose. The remnants of the old outer polymer layer remain and still contribute to the protection of the surface structure.

One can also use the replacement outer polymer layer 98 only on limited areas of the protective coating if, for the most part, most of the coating remains in excellent condition. This repair to the coating is a simple task of placing a layer of PUR or FUR on a previously applied layer of PUR or FUR. In comparison, materials such as polyester gelcoats are notoriously difficult to work with, for example when trying to repair a fiberglass hull. An embodiment of this invention making use of this situation will be described later in detail as an application of the present coating invention.

Also, if the outer polymer layer 98 is comprised of PUR, and the protected structural surface is a moving structural surface like a boat, at the owner's discretion to gain additional performance operating specifications, a previously existing outer polymer layer 98 of PUR with chemically active substances can either be replaced by a new polymer layer 98 comprised of FUR with the same or a different new selection of impregnated chemically active substances, or this new layer can be simply painted over the old outer polymer layer with just the simple surface preparation with sandpaper just described. In all of these cases, it is important to note that the inner polymer layer that contains the potentially environmentally harmful chemically active substances would not be touched, would not be required to be disposed of in a landfill or some other location, until the boat itself is retired from operation. Indeed this coating arrangement, if used as a bottom hull boat paint would last the lifetime of the boat, especially given that outer polymer layer 99 replacement would be quite infrequent and only after collision type damage to the boat or some other type of unusual mechanical damage to the coating given that the operating lifetimes of the PUR type of external outer polymer layer, and especially the FUR type of external outer polymer layer, are so dramatically long.

The non-ablative nature of each of the layers, including the two layered coating, provides some additional benefits. First, ablative paint coatings use very high concentrations of the chemically active agent because of the very high leach rate of the chemically active agent into the surrounding water that is required to accomplish its function of eliminating biofouling larval animal organisms in the water. For example, in the case of a copper salt, that weight concentration can be as high as 70% by weight of the coating, which adds considerably to costs.

With non-ablative coatings, however, because there is no significant leaching of the chemically active substance into the surrounding water, the concentration of copper chemically active substances can be around 10%. Also, whereas the copper ablative coating exhausts its supply of chemically active substance quickly, within the space of only one to two seasons, necessitating its removal, its disposal in an environmentally safe manner, and its replacement by a new coating, the coating of this invention will never exhaust its supply of chemically active compounds in the inner polymer layer 99 or the Cu Zn Sn alloy powder in the outer polymer coating 98 and can maintain its high level of antifouling activity for the many years that the coating's lifetime is expected to be operational.

Second, if a boat sits stationary for several weeks in the water without being used, it will develop a bioslime on the outside of the hull. Whether the coating is ablative or not ablative, if the boat does not move often in the water, moving water will not wash off the biofilm, which can accumulate to the point of unsightly cosmetic appearance, and can interfere with the antifouling function of the surface of the coating facing the water because now the coating's surface will have more nutrients to attract antifouling larval lifeforms. The biofilm might further prevent the organisms from touching or contacting the chemically active substance within the coating that would normally inhibit their settlement. Thus, a boat immobile in a harbor for several weeks must have its hull be wiped down, necessitating underwater divers to do this work periodically. If that must be done, some jurisdictions require the boat to be removed from the harbor when cleaned in this manner because a wiping of an ablative coating can remove up to one third of the chemically active substance quickly by the wiping, depositing it into the harbor. This problem does not occur with the non-ablative nature of the coatings described herein. Wiping a hull with the present coatings will not release any of the chemically active substances in outer polymer layer 98 into the surrounding water.

Third, such a wiping of biofilm as described above may simply move live biofilm organisms (bacteria, fungi, single cell algae) from one part of the water to another to be again deposited on the boat, where they will immediately grow again. To prevent that from happening, the boat can be gently wiped down with wipes that contain standard household disinfectants, such as quaternary ammonium disinfectants which will inactivate the organisms comprising the biofilm so that they will not resettle elsewhere on the hull. Disinfectants such as these can even be added to the outside polymer layer of this invention as one of the chemically active substances to inhibit further the development of biofilms. Disinfectants such as these can be problematical with ablative paints, as they can react with the ablative paint matrix or the chemically active substances contained within them or both.

The coatings described herein may have a variety of applications. All of the following application embodiments have all of the surface structure protection features and aquatic environmental safety features described herein.

A first application is a hull boat bottom paint. As a hull boat bottom paint, a boat may be painted once or twice in the lifetime of the operating life of the boat, depending upon whether FUR or PUR respectively is used in the hull bottom paint. If damaged, the outer polymer layer 98 can be replaced in its entirety or in just a portion of the hull surface with a new outer polymer layer 98. Since no soft ablative paint or especially hard ablative paint is involved in this coating, the boat owner does not have to engage in expensive hull painting, stripping of the old ablative paint and coating remnants with replacement of a new ablative paint coating, every one to two years. Avoiding such repainting provides a reduction in the amount of hazardous waste that is generated. Without any accidental collision damage, and with proper light cleaning periodically every several weeks if the boat spends long times in stagnant water, a boat may never need repainting once the hull bottom paint coating described herein is applied. If the outer polymer layer 98 includes polyurethane (PUR), then a coating replacement may be needed every 5 or 8 to 10 years, which would involve only the outer polymer layer 98; if the outer polymer layer includes fluorourethane (FUR), a coating replacement may be needed up to every 25 years. The inner polymer layer 99 with the more potent chemically active substances that can present a problem in terms of environmental disposal would never have to be replaced.

By using a chemically active substance in the inner polymer layer, called cuprous thiocyanate, because of its lack of galvanic activity with aluminum hulls, and because of its intense white color, one can paint aluminum hulls a cosmetically pleasing brilliant white color without additional white pigment being added, even though this material is a copper salt which generally gives a pink color to hull paint to which pigment has not been added.

Another second application is a gelcoat applied to a newly manufactured fiberglass boat. This application may include an embodiment that has a vinyl ester and multiple different embodiments comprising phthalic unsaturated polyester, each of which will be described. In some cases, a boat may be manufactured by the following process: A female mold of the hull is coated with a mold release and a female mold of the cabin is coated with a mold release. A gelcoat of polyester resin polymer is applied next and is the first layer of the hull and is the layer that faces out to and contacts the water. Because the polyester gelcoat is porous to water, a layer of water impermeable epoxy is applied next. Then the hull of the boat (as well as the cabin half) has layers of fiberglass net sheeting and more epoxy applied to build up the thickness of the hull and cabin. When both achieve the proper thickness, the cabin is released from the mold, suspended, and gently brought down upon the hull, where it is attached to the hull and glued into one unit comprising the fiberglass boat. After final curing, the hull is released from the mold, and the newly manufactured boat is buffed up, polished, excess wax from the gelcoat curing process and any residual mold release agent is removed with the hull being checked for any defects which are repaired. The boat is then packaged off to a vendor to sell to the public.

This manufacturing process may be altered to accommodate the processes described herein. A hull gel coating application will now be described. First the problematical polyester gelcoat, problematical because it is so easily damaged and water permeable, is replaced and no longer used. Instead of the vinyl ester or polyester gelcoat, the inner polymer layer 99 of the present invention is used with its impregnated chemically active agents described herein, including all forms of cupro-metallic based substances. The inner polymer layer 99 may be an epoxy polymer that acts as a water barrier to the water permeable gelcoat. It is now used as the first layer applied in the hull mold, the layer that will face and contact the water. It is used with a mold release agent compatible with an epoxy, rather than a vinyl ester or polyester gelcoat, and there are several such releasing agents available. The hull and the cabin rest of the boat may then be assembled with layers of epoxy or some other polymer and fiberglass saturated with the polymer as just described. After the final layer of fiberglass and epoxy has cured, the boat is released from the hull mold, all wax and residual releasing agent are removed, and the surface is buffed with fine sandpaper. As the next step, the outer polymer layer 98, which may include FUR or PUR with its pertinent impregnated chemically active agents, is applied to the inner polymer layer 99 that now forms the outer layer of the boat hull. The FUR or PUR, with its pertinent impregnated chemically active agents, as well as the desired pigment for the required hull color and anti-friction additives such as PTFE, is now the new "gelcoat." The boat hull, now "gelcoated" as described herein, has extremely high pigment and gloss retention that can last from 5 to 8 years for PUR or up to 25 years for FUR.

All of the other problems of vinyl ester or polyester gelcoats, especially repairing damage to polyester gelcoat coatings and putting a new layer of gelcoat over an old layer of gelcoat, are eliminated. The PUR/FUR gelcoat has all of the durability, scratch resistance, and gloss of the old polyester gelcoat. The long operating lifetime of such coatings more than makes up for any increased cost.

As a last step, the coating surface of the boat hull and the rest of the boat may be finely sanded, buffed, and polished. Aside from augmenting the boat's cosmetic appearance, the final buffing and polishing exposes on the surface more of the particles of the chemically active substances impregnated within it, thereby enhancing the protective activity of the new outer polymer layer PUR/FUR 98 gelcoat as soon as it is placed in the water. Essentially, the boat comes off the assembly line with the elements comprising this invention as integral elements of the boat hull itself. The hull is pre-reinforced against damage, deterioration, and discoloration from chemical, radiant, galvanic, and bio-proliferative processes originating in the surrounding water before it is sold to the consumer.

The boat will have the appearance, gloss and any desired color that a newly manufactured car has, with a coating that will last as long as any manufactured car has. Automotive coatings may use polyurethanes to achieve their fantastic results via an inner PUR base coat and outer PUR clear coat of the acrylic PUR kind, while virtually none will use the even more durable fluorourethanes due to cost. In contrast, new boats cannot compete in appearance with the paint job of a newly manufactured car. The boat coating described herein, with the PUR or FUR outer gelcoat polymer layer 98 and inner polymer layer 99, will afford superior appearance to the boat equal to that of a newly manufactured car, and with built in protection of the hull structure against bio-proliferative processes even before the owner ever takes possession of the boat.

The owner will never have to paint the boat for many years, and if a FUR coating is used, perhaps never if there is no collision damage that would occur during the operating lifetime of the boat. The decision to use the superior but more expensive FUR coating over that of PUR coating is determined by both economic factors and the use of the boat in terms of whether it would be a simple leisure boat versus a high performance racing boat.

Some types of gelcoat may be made with a two-component vinyl polyester polymer that also serves as a water barrier to the hull. Unlike previous polyester gelcoats, such two-component vinyl ester polymers can be mechanically more durable than older polyester hull-building polymers. The boat hull assembly process may use such gelcoats to protection of the hull from biofouling organisms.

The outer polymer gelcoat layer may include a two-component phthalic polyester, into which a synthetic capsaicin (nonivamide), metal pyrithione, and copper zinc tin alloy is impregnated. Once that layer, which may be understood as the outer polymer layer of the coating, is partially cured, the vinyl ester resin of a second type that forms the thickness of the hull may be applied. However, the initial layer of this vinyl ester hull building polymer may be impregnated with cuprous oxide or some other cupro-metallic salt with or without a cupro-metallic alloy, forming the inner polymer coating layer. Then the remainder of the hull may be assembled, with alternating repetitive layers of fiberglass matting, saturated with the vinyl ester hull building polymer.

Thus, because the hull may be assembled in the mold from the outside to the inside relative to the ocean, the inner polymer layer is now laid over on top the outer polymer layer during construction. In this manner, both inner and outer polymer layers may be formed as integral parts of the hull and may be placed on the hull during the hull assembly process. This greatly simplifies hull assembly, and an outer coating of polyurethane or fluorourethane need not be applied after the hull is popped from the mold. This saves a manufacturing step and improves the cost effectiveness of this coating. Note with this embodiment of the boat building process, the outside layer of the boat may be a vinyl ester gelcoat impregnated with the biologically active substances of the outer polymer layer, or a phthalic polyester rather than a polyurethane or fluorourethane gelcoat impregnated with these substances, which is more durable.

Note that if the added protection and longer life of the polyurethane or the fluorourethane coating is desired, an additional layer may be added for example with the synthetic capsaicin, copper zinc tin alloy powder, and metal pyrithione biologically active substances. In such embodiments, a thickened outer gelcoat polymer layer may be formed with two layers, including the vinyl ester or phthalic polyester and the polyurethane or fluorourethane layer above it, both with the same biologically active substances. Another option is simply to put the cupro-metallic substance (alloy, salt, or both) into the two component vinyl ester or phthalic polyester gelcoat which is applied first, then to build up the rest of the hull with the fiberglass matting and vinyl or phthalic polyester hull building polymer, and after the hull is popped from the mold, to apply the fluorourethane or polyurethane gelcoat with the biologically active substances comprising metal pyrithione, cupro-metallic salt or alloy, and the synthetic capsaicin onto the vinyl ester or phthalic polyester gelcoat surface of the hull, which includes the cupro-metallic alloy or salt.

Figure 3:
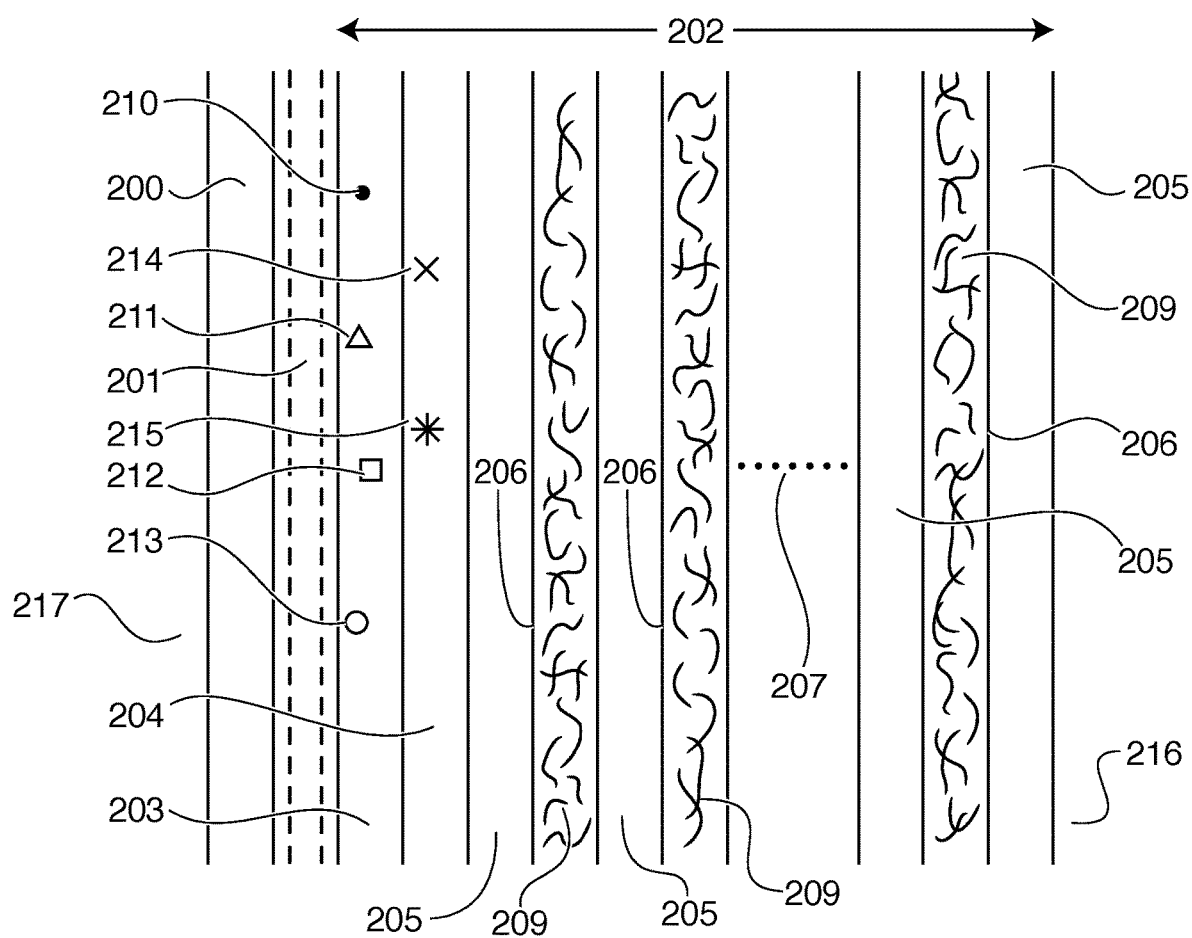
FIG. 3 is a cross-sectional diagram illustrating a series of layers applied in the formation of a boat hull, in accordance with an embodiment of the present invention.

Referring now to FIG. 3, additional detail is provided on process of impregnating these chemically active substances within the hull of a boat as the boat is being assembled. A mold releasing agent 201 is coated onto a mold 200. The mold 200 acts as the template from which the hull 202 will be assembled. For reference, the side of the mold 200 that faces outward toward the seawater is designated 217 and the side of the mold 200 facing inward toward the interior of the boat is designated 216. The releasing agent 201 can be polymer-specific, such as one capable of releasing a vinyl ester, a phthalic polyester, an epoxy, or a polyurethane polymer from the mold 200. The releasing agent 201 may be a general release agent, such as beeswax, or another non-polymer-specific releasing agent.

A layer of polyurethane 203, formed from any polyurethane material that is resistant to seawater exposure, may be laid down on the layer of mold release 201. The polyurethane material may include an aromatic polyurethane, an aliphatic polyurethane, or an acrylic urethane, the latter being frequently used in automotive car paint. The polyurethane layer 203 may include a combination of zinc pyrithione powder 211, with an exemplary by weight composition of 7.5%, nonivamide synthetic capsaicin powder 210 with an exemplary by weight composition of 3%, and a copper alloy powder 212 comprising 90% copper, 9% zinc, and 1% tin with an exemplary by weight composition of the alloy powder of 5%. Other weight compositions of these substances and other biologically active chemical substances as described in this disclosure may also be used. There may also be a colored pigment 213 in the polyurethane layer 203 to produce a desired cosmetic outside appearance to the hull.

A layer of vinyl ester, or phthalic polyester 204 may be applied, which may include a combination of cuprous oxide 214 with an exemplary by weight composition of 10% and zinc oxide powder 215 with an exemplary by weight composition of 0.5%. The vinyl ester or phthalic polyester layer 204 may be applied while the polyurethane layer 203 is partly cured on the underside. Other weights and compositions of these and other different biologically active chemical agents described elsewhere in this disclosure may also be used for this vinyl ester layer 204.

Figure 4:
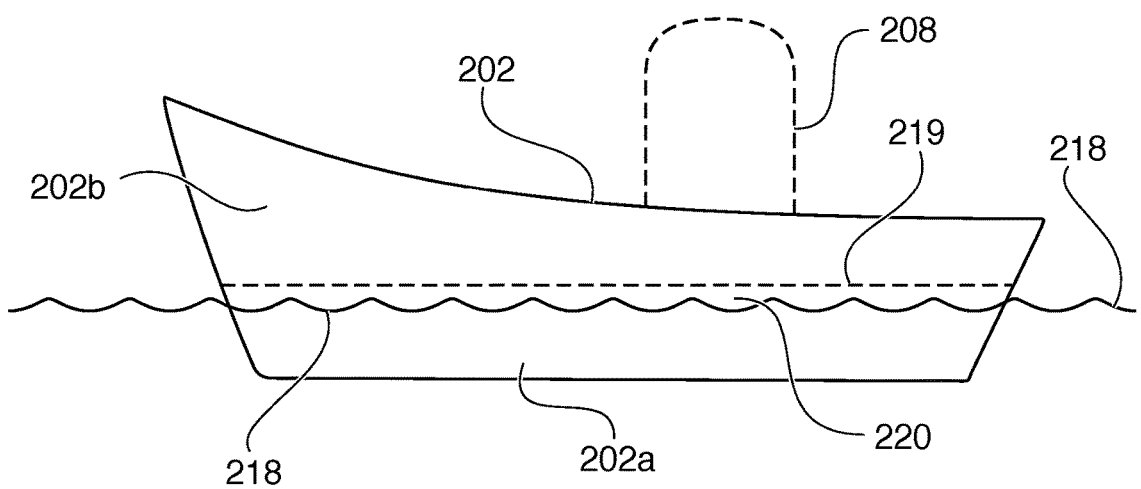
FIG. 4 is a diagram of a boat hull in water, the boat hull having a section that has an anti-biofouling coating and a section without the anti-biofouling coating, in accordance with an embodiment of the present invention.

Referring now to FIG. 4, a diagram of a boat hull is shown in water. Relating to the formation of the hull's coating, in some embodiments only the portion of the hull (area 202A) that is below the waterline 218 and a few inches above it (area 220) may be painted with the layers of polymers with biologically active chemical substances. The boundary line 219 shows the line between the hull area 202A and the hull area 202B, the latter of which is not painted with these two polymer layers.

The upper portion of the hull (area 202B), as well as the rest of the boat 202 including the cabin 208 may be coated with vinyl ester without any biologically active materials in what is known as a "gelcoat." The gelcoat gives the new boat a glossy smooth, ultra-white appearance. Care may be taken so that there are no non-overlapped seams between the treated lower part of the hull 202A and the untreated upper part of the hull 202B.

After the vinyl ester layer or phthalic polyester 204 has been laid down and is partially cured, the next layer 205 of the hull 202 is applied and may include a vinyl ester with mats of fiberglass matting 206, which may also be saturated with this polymer. There may be no biologically active substances within this layer. Other polymers including other polyesters, epoxies, and so forth may be used as well.

Layers of vinyl ester 205 or phthalic polyester may alternate with layers of fiberglass matting 206 saturated with this polymer to gradually thicken the hull, until the hull reaches a desired thickness (area 207) with each new layer being applied upon the partial curing of the previous layer. Upon achieving the final desired thickness, the last layer of vinyl ester is allowed to cure, and the cabin 208 of the boat 200 may be prepared in a separate mold and may be placed on top of the hull, lowered, and glued onto the hull completing the boat's main structure. The hull 202 may be released from the mold 200, and may be inspected for blemishes and uneven points which are sanded smooth. A fine sanding may be given to the entire hull 202 over the area of the hull 202A.

In an embodiment of the hull assembly process, a layer of vinyl ester 204 or phthalic polyester containing the mixture of cuprous oxide 214 and zinc oxide 215 may be used as the first layer of the hull, omitting the polyurethane layer 203. In such an embodiment, after the hull has been released from the mold, blemishes and uneven points are sanded smooth, and an outer polymer layer 204 may be sanded. The polyurethane outer polymer layer 203 with the zinc pyrithione 211, the nonivamide 210, and the Cu Zn Sn alloy powder 212 as well as any desired colored pigment 213 may be applied on the vinyl polyester or phthalic polyester inner polymer layer 204 to complete the assembly of the hull. As in the first embodiment, the polyurethane layer 203 in the treated area of the hull 202A is given a final light sanding to bring the biologically active chemical substances in the polyurethane outer polymer layer of the invention into contact with the surrounding seawater.

The lower portion 202A of the hull may have a cosmetically pleasing colorful colored or white satin or glossy appearance. The impregnated biologically active chemical substances plus the improved polymers used in these two embodiments of this hull paint coating impregnated into the hull itself at the time of manufacture of the hull provide superior antifouling properties over an increased operating life of many years as compared to contemporary hull bottom antifouling paints used today, which may have an operational life of one to two boating seasons. Furthermore the new boat owner does not have to paint the hull of the new boat or have a marina paint the lower part of the new boat with an antifouling paint.

This performance improvement is markedly further increased by the substitution of a fluorourethane such as the FEVE (fluoroethylene vinyl ether)-isocyanate system in place of the polyurethane (urethane-isocyanate system) polymer, with the isocyanate being the part B curing agent and the urethane or fluoropolymer polyol part A resin, such as FEVE being the resin to be cross linked and cured. Such a fluorourethane embodiment can have up to a 25 year operating life expectancy under marine exposure conditions (as opposed to the 8 to 12 years of operational life of the hull coating if a polyurethane is used), comparable to the life of the boat itself. This eliminates periodic expensive repainting and removal of the boat from the water to strip off an old antifouling bottom hull paint coating. The outer polymer coating of the hull, because it is a polyurethane coating, would have much lower friction with moving seawater then would the typical hull bottom coat, which is a rather rough coating with a relatively high coefficient of friction. The improved friction advantage is even much further and greatly enhanced with the use of a fluorourethane outer polymer coating, though at increased cost.

The FEVE may be substituted by any flourourethane system comprising a fluorinated polyol resin B component and an isocyanate component A hardener. Two such examples are PVDF (polyvinylidene fluoride (Kynar-®) and PTFE polytetrafluoroethylene (Teflon-®). However, any member of the class of fluorinated polymers may be used if their mechanical properties allow for them to be formulated as a coating.

Another distinguishing difference in this boat hull assembly process as compared to other prior types of hull assembly processes is that the vinyl ester, phthalic polyester, or epoxy polymer used for the inner polymer layer 204 of this invention may also be impenetrable to water and water vapor, so that it acts as a water sealant and barrier as well as an antifouling retardant. Both properties may be provided by the single layer of vinyl ester, phthalic polyester, or epoxy. This coupling of the antifouling property of the inner polymer layer 204 to the property of water impenetrability has previously not been incorporated in a single polymer layer placed into and incorporated into a hull during the hull assembly process.

Furthermore, the outer polymer layer 204 containing the polyurethane or fluorourethane may also possess an antifouling function, but with different biologically active chemical agents from that of the inner polymer vinyl ester layer, phthalic polyester, or epoxy layer, coupled to the property of water impenetrability as the polyurethane is also impenetrable to water and water vapor. Thus there are two separate and distinct layers of polymer coating that couple the antifouling function with water impenetrability, with each layer providing a far superior protection against mechanical damage from hull blistering. The use of fluorourethane for the polyurethane polymer in the outer polymer can greatly enhance this protection of the urethane component layer 203.

The use of a two-component vinyl ester, or a phthalic polyester, exemplified by the use of a vinyl ester resin A component or a phthalic polyester and an MEKP (methylethylketone peroxide) hardener B component, eliminates water penetration and blistering observed when water penetrating polyester coatings (also known as "gelcoats") without water barrier properties are applied to a boat hull. Simple polyester gelcoat outer coatings allow water vapor to be transported through them to the surface of the underlying hull. The water vapor may condense under the polyester gelcoat, at which point such gelcoats can form bubbles of water. This effect is called blistering and may necessitate total stripping of the paint coating and complete re-painting to repair the damage. The present embodiments eliminate the need for additional sealant. The water and water vapor impenetrability of polyurethane outer polymer layer 203, which may be further improved with the use of the fluoropolymer fluorourethane polyol resin, enhances synergistically the water impenetrability layer of the vinyl ester layer 204 for markedly increased hull protection against blistering.

In some cases, an epoxy water barrier layer may still be used. Such embodiments may impregnate the antifouling coating directly into the hull at the time of manufacture. An epoxy water barrier layer may then serve as the inner polymer layer 204, containing the cuprous oxide and zinc oxide in the same proportions as previously described above functioning as layer 204. The epoxy water barrier may be laid down underneath the polyurethane layer 203 containing the zinc pyrithione 211, nonivamide 210, and Cu Zn Sn 212 alloy powder, with or without coloring pigment 213 already laid down in the mold, and this layer would face away from the direction of the mold 200 toward the direction of the interior of the hull. Next, additional layers of vinyl ester polymer may alternate with fiberglass mats saturated with this polymer until the desired thickness of the hull has been attained.

An embodiment of a boat assembly process may include an epoxy layer 204 that is laid down first in the mold, with the polyurethane layer 203 being applied over the epoxy layer after the hull is released from the mold. In either case, if the epoxy layer is used with the cuprous oxide and zinc oxide, the vinyl ester layer would not be needed, nor would any other polyester "gelcoat" layer be needed either, because the polyurethane layer 203 has the mechanical and chemical properties of the "gelcoat" polyester layer such as mechanical resistance, UV light resistance, scratch resistance, low friction, and high glossiness of the gelcoat. The polyurethane coating 203 with the zinc pyrithione 211, Cu Zn Sn alloy powder 212, and the nonivamide 210 can effectively become the new "gelcoat" along with a chosen colored pigment 213.

For boat hulls which are formed primarily using layers of epoxy polymer and fiberglass mats saturated with the epoxy polymer, the outer water and water vapor permeable polyester gelcoat may be replaced by the polyurethane outer polymer layer 203 containing the nonivamide 211, the zinc pyrithione 210, the Cu Zn Sn powder alloy 212 and a suitable colored pigment 213 as the new "gelcoat," which is water and water vapor resistant. The outermost epoxy polymer layer of the multi-layered epoxy hull that is assigned the function to act as a water barrier for the rest of the hull would then contain the cuprous oxide 214 and zinc oxide 215.

In another embodiment, the polyurethane or fluorourethane outer polymer layer 203 with the nonivamide 211, the zinc pyrithione 210, the Cu Zn Sn alloy 212, and the colored pigment 213, if any, may be coated on top of a hull that is composed of layers of epoxy forming its entire thickness, that has an outermost epoxy layer has the cuprous oxide 214 and zinc oxide 215 in it thereby causing it to function as the inner polymer layer 204. The outer polyurethane or fluorourethane polymer layer 203 with the biologically active chemical additives of nonivamide, zinc pyrithione, and Cu Zn Sn alloy powder may be coated over the inner polymer layer 204 comprising an epoxy polymer containing the cuprous oxide and the zinc oxide. The rest of the hull thickness may be a different polymer other than an epoxy and may include any polymer chosen by the boat manufacturer to constitute the boat and boat hull. All of the additives, 210, 211, 212, 213 in the outer polymer later 203 and 214 and 215 of the inner polymer layer 204 are physically and chemically inert with respect to the polymer chosen by the boat manufacturer.

Any such vinyl ester or unsaturated aromatic or aliphatic polyester polymer may be used. These include unsaturated polyester polymers where the polyol component may be typical polyols such as poly-glycols including ethylene glycol, propylene glycol, and diethylene glycol combined with typical dicarboxylic acids such as typical acids used including phthalic acid, iso-phthalic acid, tere-phthalic acid (ortho-phthalic acid), and maleic anhydride. Thus the great variety of ester and polyester polymers that can be used along with different amounts and types of different antifouling biologically active chemical substances that can be used singly or in combination with each other with the inner and outer polymer layers possessing different combinations of such antifouling substances, all can be used in this application because of the multi-layered structure comprising boat hulls assembled by most types of boat assembly processes.

In the event a boat hull is manufactured or carved out as a single, non-layered block structure, such as from a block of wood, a block of plastic polymer, or metal, the first application of antifouling coating may include coating the inner polymer layer 204 on after the boat hull has been finished being constructed, and then the outer polymer layer 203 is applied on top of the inner polymer layer 203. The inner polymer layer 204 would be applied directly to the hull or, if the hull was metal, to a primer painted on the hull to prevent interaction between the metal of the hull and the biologically active chemical substances of the inner polymer layer. In such an embodiment, the anti-fouling coatings may be applied to the boat at the factory after the new boat has been made, and the purchaser of the boat does not have to add additional antifouling paint.

All of the biologically active chemically substances described herein, and others, can be used singly or in combination in the manner previously described. The nonivamide 210, the zinc pyrithione 211, the Cu Zn Sn alloy powder 212, and colored pigment 213 that are used in the outer polymer layer 203 and the cuprous oxide 214 and zinc oxide 215 used in the inner polymer layer 204 are provided herein for the purpose of illustration and should not be construed as limiting.

Gelcoats may include a two-component phthalic aromatic polyester polymer that also serves as a water barrier to the hull. A boat hull can be built using a different two component phthalic polyester hull building polymer that is mechanically more durable than older polyester hull building polymers. Some embodiments of the boat hull assembly process may use such a gelcoat for fiber glass boats to protect the hull from biofouling organisms.

When these two phthalic polyester polymers are used to build a fiberglass boat hull, the outer polymer gelcoat layer may be a two-component phthalic polyester into which the synthetic capsaicin (nonivamide), metal pyrithione, and the copper zinc tin alloy may be impregnated. Once that layer, which will be the outer polymer layer of the coating, now an integral part of the hull put onto the hull during the hull assembly process, is partially cured, the second phthalic polyester resin that forms the thickness of the hull is applied.

However, the initial layer of this second phthalic polyester hull building polymer may be impregnated with cuprous oxide or some other cupro-metallic salt, with or without a cupro-metallic alloy and a small quantity of zinc oxide powder in a preferred ratio of 20:1 by weight. This enhances the surface protecting effect of the copper containing biologically active agent against the effects of biofouling. The remainder of the hull may be assembled with alternating repetitive layers of fiberglass matting saturated with the second phthalic polyester hull building polymer.

Because the hull is assembled in the mold from the outside to the inside (relative to the ocean), the inner polymer layer may be laid down on top of the outer polymer layer, and both inner and outer polymer layers may be made integral parts of the hull and may be placed on the hull during the hull assembly process.

The outer polymer layer may be a two-component part A resin and part B curing agent hardener polyester polymer that can be a phthalic polyester, a vinyl unsaturated two-component aliphatic ester, or any unsaturated polyester previously listed with the biologically active chemical agents zinc pyrithione, Cu Zn Sn metal alloy powder, and the nonivamide. The outer polymer layer faces the ocean water and it overlies the inner polymer layer, which may also be a preferred phthalic polyester or vinyl two-component aliphatic ester or any unsaturated polyester with the copper containing biologically active chemical agent and the zinc oxide powder.

This greatly simplifies hull assembly, and an outer coating of polyurethane or fluorourethane need not be applied on after the hull is popped from the mold. This saves a manufacturing step and improves the cost effectiveness of this coating.

With this embodiment of the boat building process, the outside layer of the boat may be a phthalic polyester gelcoat impregnated with the biologically active substances of the outer polymer layer, rather than the more durable polyurethane (PUR) or fluorourethane (FUR) gelcoat impregnated with these substances. However, the outer phthalic polyester gelcoat outer polymer layer can have its operating life and cosmetic glossiness extended by up to 10 to 15 years, approaching that of the PUR or FUR gelcoat embodiment if a certain maintenance procedure to be later described is performed.

If the added protection and longer life of the polyurethane or the fluorourethane coating is desired (5 to 10 years for the polyurethane, greater than 10 years for the fluorourethane as compared to about 5 years for the phthalic polyester), an additional outer polymer layer of either polyurethane or fluorourethane with the synthetic capsaicin, copper zinc tin alloy powder, and metal pyrithione biologically active chemical substances may be added. In such an embodiment, a thickened outer gelcoat polymer layer may have two sub-layers, including a phthalic polyester and a polyurethane or fluorourethane layer above it, both with the same biologically active chemical substances. In this embodiment the PUR/FUR layer may be put on top of the outer gelcoat polymer layer vinyl polyester after the hull is released from the mold.

A further embodiment may include the cupro-metallic substance, which may include one or more of the pure copper metal, copper alloy, copper salt, or any combination of one to three of the components of this group, and may further include or omit zinc oxide in the two-component phthalic polyester gelcoat. The gelcoat may be applied first in the hull mold, and then the rest of the hull may be built up with the fiberglass matting and phthalic polyester hull building polymer. After the hull is popped from the mold, the fluorourethane or polyurethane gelcoat may be applied, with the biologically active substances comprising metal pyrithione, cupro-metallic salt or alloy, and the synthetic capsaicin, onto the surface of the hull.

An embodiment includes the layer of polyurethane (PUR) or fluorourethane (FUR) within the hull during the mold assembly process. The process of impregnating these chemically active substances within the hull of the boat being assembled may include 1) Coating a mold releasing agent 201 onto a mold 200 acting as the template from which the hull 202 will be assembled; 2) Laying down a layer of polyurethane (any polyurethane resistant to seawater exposure will be adequate) 203 on the layer of mold release; 3) Applying a layer of two component UltraPlusWhite® iso-phthalic polyester 204; 4) Painting the portion of the hull (area 202A) on FIG. 4 that is below the waterline 218 and a few inches above it (area 220) with the two above layers of polymers with the biologically active chemical substances; 5) Applying the next layer 205 of the hull 202 after the layer of UltraPlusWhite® is partially cured, including a second different iso-phthalic aromatic unsaturated two-component (Part A resin and Part B MEKP curing agent) polyester of a preferred type known as LVM 3200® as well as mats of fiberglass matting 206 which is also saturated with this polymer; other polymers including other polyesters, epoxies, and so forth may be used as well; 6) Applying layers of LVM® 3200 iso-phthalic polyester 205, alternating with layers of fiberglass matting 206 saturated with this polymer, gradually thickening the hull until the hull reaches its desired thickness (area 207) with each new layer being applied upon the partial curing of the previous layer; 7) Preparing the cabin 208 (FIG. 4) of the boat in another mold is placed on top of the hull and, after the final layer of LVM 3200® 205 is allowed to cure, attaching the cabin onto the hull to complete the boat's main structure (202+208); 8) Releasing the hull 202 the mold to inspect and sand blemishes and uneven points; and 9) Sanding the entire hull 202 over the area of the hull 202A to which was applied the outer and inner polymer layers, impregnated with the biologically active chemical substances for biofouling damage prevention, to bring the biologically active chemical agents in the outer polyurethane polymer layer to the surface.

For reference, the outward side of the mold faces outward toward seawater 217 and the inward side of the mold faces inward toward the interior of the boat, designated 216. The releasing agent can be polymer-specific, such as one capable of releasing a phthalic unsaturated polyester, a vinyl ester, an epoxy, or a polyurethane polymer from the mold, or may be a general release agent such as beeswax, or another non-polymer specific releasing agent that can release any polymer coating from the mold. The polyesters may include the phthalic group of unsaturated polyester polymers that include phthalic acid, ortho-phthalic acid, and iso-phthalic acid unsaturated polyesters. A vinyl ester, which is an aliphatic ester, or any other unsaturated polyesters, may be used.

As a representative of the possible phthalic polyesters that may be used, of particular preference is the iso-phthalic polyester gelcoat known as UltraPlusWhite®, which is also an impervious barrier to water and water vapor egressing into the hull from the surrounding ocean and which has an intense white color desirable for cosmetic purposes.

The polyurethane layer may include a combination of zinc pyrithione powder 211 with a preferred by weight composition of 7.5%, nonivamide synthetic capsaicin powder 210 with a preferred by weight composition of 3%, and a copper alloy powder 212 comprising 90% copper, 9% zinc, and 1% tin with a preferred by weight composition of the alloy powder of 5%. Other weight compositions of these substances and other biologically active chemical substances may also be used. Additionally, there may be a colored pigment 213 in this coating to produce a desired cosmetic outside appearance to the hull.

The two-component UltraPlusWhite® iso-phthalic polyester 204 may include a part A polyester resin and a part B curing agent MEKP. A combination of cuprous oxide 214 with a preferred by weight composition of 10% and zinc oxide powder 215 with a preferred by weight composition of 0.5% may be added. The polyester 204 may be applied to the polyurethane coating 203 just previously applied and may be partly cured on the underside surface of that polymer layer 203 that faces away from the mold toward the interior of the hull. Other weights and compositions of these and other different biologically active chemical agents described elsewhere in this disclosure may also be used for this UltraPlusWhite® iso-phthalic polyester layer.

The boundary line between the hull area 202A that is painted with the two layers of polymer with the biologically active chemical agents and the hull area 202B which is not painted with these two polymer layers is designated as boundary line 219. The rest of the hull (area 202B) as well as the rest of the boat including the cabin 208 is coated with the UltraPlusWhite® without any biologically active materials in what is known as a "gelcoat." The gelcoat gives the new boat its glossy smooth ultra-white appearance. Care is taken so that there are no non-overlapped seams between the treated lower part of the hull 202A and the untreated upper part of the hull 202B (FIG. 4) that would allow damaging water ingress into the hull.

The LVM 3200® iso-phthalic polyester polymer may be substituted by any appropriate polymer. Such polymers could include epoxies, polyesters both aromatic and aliphatic, such as unsaturated vinyl ester, or other liquid polymers used in paint coatings including polyureas, polyaspartates, and acrylic urethanes.

In some embodiments, the polyurethane layer may be placed on the hull after its assembly in the mold. It is possible to start with the layer of UltraPlusWhite® 204 containing the mixture of cuprous oxide 214 and zinc oxide 215 as the first layer of the hull (step 2 above), and then repeat steps 3 through 7 above. After the hull has been released from the mold, blemishes and uneven points may be sanded smooth, and the inner polymer layer of the hull with UltraPlusWhite® 204 may be lightly sanded. The polyurethane outer polymer layer 203 with the zinc pyrithione 211, the nonivamide 210, and the Cu Zn Sn alloy powder 212, as well as any desired colored pigment 213, may be placed on the UltraPlusWhite® inner polymer layer 204 containing the cuprous oxide 214 and zinc oxide 215, again completing the assembly of the hull. As in the other embodiments, the polyurethane layer 203 in the treated area of the hull 202A may be given a final light sanding to bring the biologically active chemical substances in the polyurethane outer polymer layer of the invention into contact with the surrounding seawater without any leaching into the seawater of these biologically active chemical substances.

The present embodiments may produce a lower portion of the hull having a cosmetically pleasing colorful colored or white satin or glossy appearance. The new boat owner does not have to paint the hull of a new boat or have a marina expensively paint the lower part of the new boat with an antifouling paint. The resulting hull is durable and low-maintenance.

This performance improvement is markedly further increased by the substitution of a fluorourethane such as the FEVE (fluoroethylene vinyl ether)-isocyanate system in place of the polyurethane (urethane-isocyanate system) polymer with the isocyanate being the part B curing agent and the urethane or fluoropolymer polyol part A resin such as FEVE being the resin to be cross linked and cured. Such a fluorourethane embodiment can have up to a 25 year operating life expectancy under marine exposure conditions (as opposed to the 8 to 12 years of operational life of the hull coating if a polyurethane is used), comparable to the life of the boat itself, thereby eliminating periodic expensive repainting and removal of the boat from the water to strip off an old antifouling bottom hull paint coating.

The outer polymer coating of the hull, because it is a polyurethane coating, may have much lower friction with moving seawater than would a hull bottom coat with a rough coating and a relatively high coefficient of friction. The improved friction may be enhanced with the use of a fluorourethane outer polymer coating, though at increased cost. The FEVE may be substituted by any fluorourethane system including a fluorinated polyol resin B component and an isocyanate component A hardener. Two such examples are PVDF (polyvinylidene fluoride (Kynar®)) and PTFE (polytetrafluoroethylene (Teflon®)). However, any member of the class of fluorinated polymers may be used if their mechanical properties allow for them to be formulated as a coating. PTFE in powdered form may be mixed in with the FEVE or other fluoropolymer resin to further decrease friction with moving water.

Another distinguishing difference is that the UltraPlusWhite® iso-phthalic ester polymer that may be used for the inner polymer layer 204, containing the cuprous oxide 214 and zinc oxide 215 to prevent the damaging biological, chemical, and mechanical effects of biofouling on the hull, is also impenetrable to water and water vapor so it acts as a water sealant and barrier as well as an antifouling retardant, with both properties being provided by the single layer of vinyl ester, a phthalic polyester, or epoxy. This coupling of the antifouling property of the inner polymer layer 204 to the property of water impenetrability has previously not been incorporated in a single polymer layer placed into and incorporated into a hull during the hull assembly process.

Furthermore, the outer polymer layer 204 containing the polyurethane or fluorourethane may also possess an antifouling function with different biologically active chemical agents from that of the inner polymer UltraPlusWhite® polymer layer. Thus there may be two separate and distinct layers of polymer coating that couple the antifouling function with water impenetrability, with each layer providing protection against mechanical damage from hull blistering, which is a mechanical hull damaging phenomenon. The fluorourethane substitution for the polyurethane polymer in the outer polymer layer greatly enhances this protection of the urethane component layer 203 as compared to the polyurethane version of that layer 203.

The use of a two-component vinyl ester, such as an outer polymer layer of UltraPlusWhite® that includes a iso-phthalic polyester resin A component and a MEKP (methylethylketone peroxide) hardener B component, by itself even without enhancement from the outer polymer layer of polyurethane, eliminates the water penetration and blistering problem observed when simple water penetrating polyester coatings (also known as "gelcoats") without water barrier properties are applied to a boat hull. Simple polyester gelcoat outer coatings may allow water vapor to be transported through them to the surface of the underlying hull. When that happens, water may condense under the polyester gelcoat, causing the gelcoat to form bubbles of water. Correcting this blistering may involve total stripping of the paint coating and complete re-painting to repair the damage.

Instead of using a separate extra and expensive layer of epoxy polymer under the polyester layer to act as a water barrier layer, the present embodiments may omit such an epoxy layer. The water and water vapor impenetrability of a polyurethane outer polymer layer 203 (markedly improved with the use of the fluoropolymer fluorourethane polyol resin) enhances synergistically the water impenetrability layer of the UltraPlusWhite® layer 204 for markedly increased hull protection against blistering.

Some boat manufactures would still prefer to use an epoxy water barrier layer because of cost reasons, as an epoxy water barrier layer may be less costly than an iso-phthalic polyester layer. The epoxy water barrier layer may serve as the inner polymer layer 204 containing the cuprous oxide and zinc oxide in the same proportions as previously described above functioning as layer 204, replacing the use of the UltraPlusWhite® 204 phthalic polyester water barrier layer. The epoxy water barrier layer may be laid down underneath the polyurethane layer 203 containing the zinc pyrithione 211, nonivamide 210, and Cu Zn Sn 212 alloy powder with or without coloring pigment 213, and this layer would face away from the direction of the mold 200 toward the direction of the interior of the hull. Additional layers of iso-phthalic polyester polymer LVM3200®, alternating with fiberglass mats saturated with this polymer, may be applied until the desired thickness of the hull has been attained. The hull may also be finished with layers of epoxy polymer alternating with epoxy saturated fiberglass mats as an alternative.

In some embodiments, the epoxy layer 204 may be laid down first in the mold and the polyurethane layer 203 may be applied over the epoxy layer 204 after the hull is popped from the mold. In embodiments where the epoxy layer 204 is used with the cuprous oxide and zinc oxide, the UltraWhite® vinyl polyester layer may not be needed nor would any other polyester "Gelcoat" layer be needed either, because the polyurethane layer 203 has all of the mechanical and chemical properties of the "Gelcoat" polyester layer, such as mechanical resistance, UV light resistance, scratch resistance, low friction, and high glossiness of the gelcoat. The polyurethane coating 203 with the zinc pyrithione 211, Cu Zn Sn alloy powder 212, and the nonivamide 210 may effectively become a new protective layer, along with a chosen colored pigment 213.

Using a polyester outer polymer layer 203 that has the water repellant property, together with a polyester inner polymer layer 204 that has the water repellant property, is a useful combination to this application as well for boat hull assembly situations where the economic factors are favorable for this arrangement of coating layers to be used. The rest of the hull may be assembled from additional layers of epoxy resin and perforated fiberglass mats that would be laid one on top of another until the desired hull thickness is achieved, or any other polymer that is customarily used in the boat assembly process such as polyester, PVC, carbon composite, vinyl ester, and so forth could be used.

Figure 5:
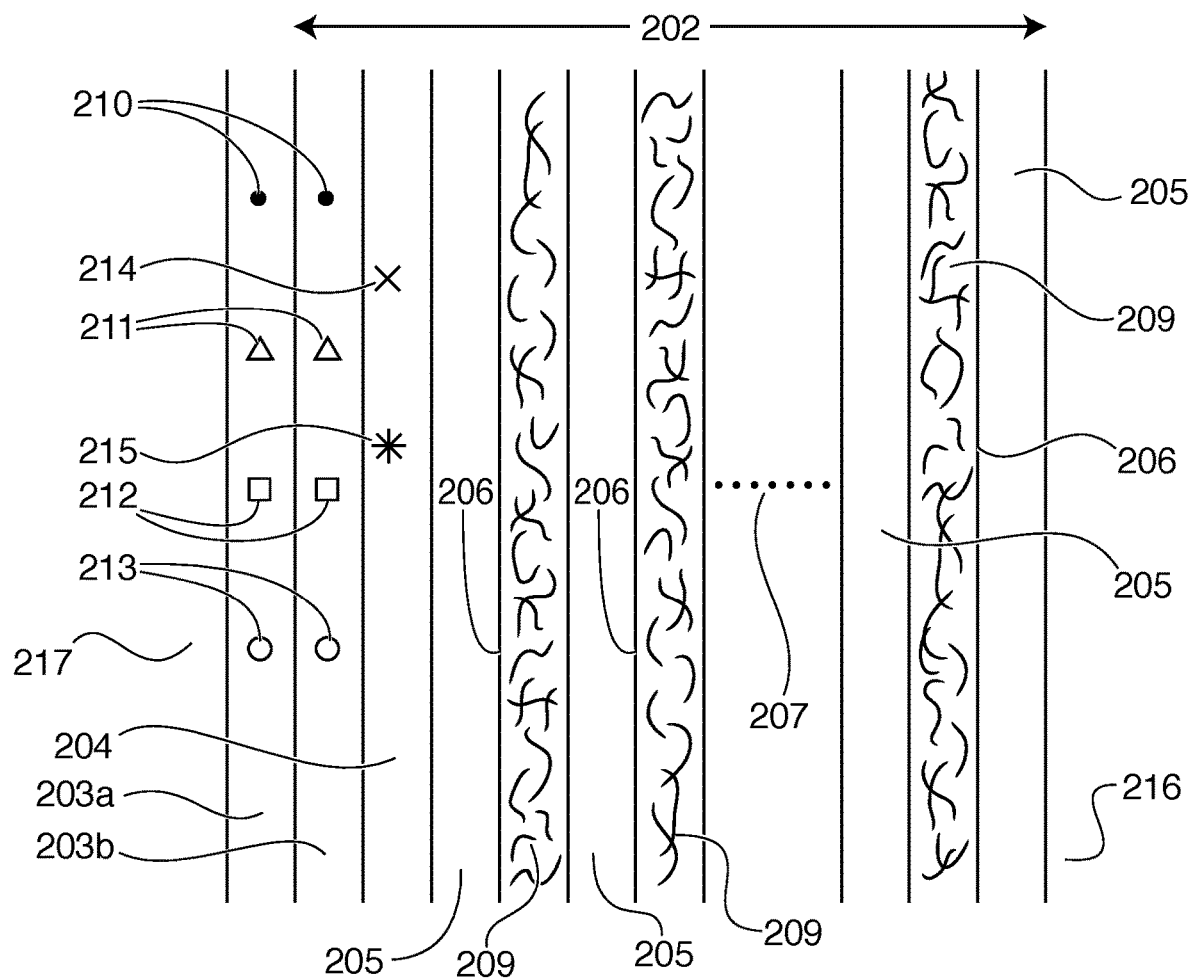
FIG. 5 is a cross-sectional diagram illustrating a series of layers applied in the formation of a boat hull, in accordance with an embodiment of the present invention.

Referring now to FIG. 5, the polyurethane or the fluorourethane polymer layer again comprises the outer polymer layer 203, only now it may be the outer sub-layer 203A of two sub-layers that will comprise the outer polymer layer. The outer polymer layer may also contain an inner sub-layer 203B with an unsaturated polyester polymer. Both the outer and inner sub-layers 203A and 203B may contain the same three biologically active chemical agents—the nonivamide 210, the zinc pyrithione 211, and the Cu Zn Sn metal alloy powder 212 to form the functional antifouling repelling outer polymer layer. Either sub-layer 203A or 203B or both can contain pigment 213 that will provide the necessary cosmetic color to the hull.

The outer sub-layer 203A may be applied onto the inner sub-layer 203B on the hull's outer surface after the hull is removed from the mold. The outer sub-layer 203A may also be put on as the first applied layer to the mold within the hull building process, followed by the inner sub-layer 203B if the outer sub-layer is comprised of PUR but not FUR. The outer sub-layer 203A, if it is comprised of FUR, cannot be applied within the mold because it will adhere poorly to the layer underneath it, the inner sub-layer 203B. A layer of FUR, if used, may be the very last layer applied to the hull, as FUR can be applied to most other polymers, while most polymers cannot be applied to it.

Given that the outer sub-layer 203A may be applied to the hull after it is released from the mold, the inner sub-layer 203B of the outer polymer layer 203 may be the first layer applied to the mold release factor 201 coating the mold 200. The inner sub-layer 203B of the outer polymer layer 203 may include the two-component unsaturated iso-phthalic polyester, UltraWhitePlus®, or any other unsaturated aliphatic or aromatic polyester or vinyl ester of a similar use and nature as previously described impregnated by the biologically active chemical agents nonivamide 210, zinc pyrithione 211, Cu Zn Sn metal alloy powder 212, and possibly a colorizing pigment 213.

The next layer in from the mold and applied to the mold, the inner polymer layer 204, may become a polymer layer comprised of an unsaturated iso-phthalic aromatic polyester which will be the LVM 3200® polyester previously described or any other two component polyester polymer, such as a vinyl aliphatic ester, or aromatic unsaturated polyester impregnated with the cuprous oxide and zinc oxide. It is also the second layer of the multi-layer structure of the hull 202 beneath the inner sub-layer 203B of the outer polymer layer 203 that is being assembled and comprised of layers of LVM 3200® 205 and perforated fiberglass mats 206.

If the outer PUR (but not FUR) sub-layer 203A is the first layer of the hull applied to the mold while the hull is still within the mold, rather than that layer being applied after the hull is released from the mold, then this two layer arrangement comprising the inner and outer polymer layers of the protective surface coating may be assembled completely within the mold assembly process representing. The LVM 3200® may be substituted with any aromatic, aliphatic, or unsaturated two component polyester polymer or vinyl ester or it may be substituted by any suitable epoxy described in previous embodiments if the hull is to be made of epoxy resin rather than polyester resin.

For enhanced performance, which includes longer operating life, reduced water friction, UV resistance and all the other advantages previously cited for the polyurethane and especially the fluorourethane outer polymer layer, an outer sub-layer 203A of polyurethane and, for even more enhanced performance, of fluorourethane may be impregnated with these three biologically active chemical agents applied to and deposited on to the UltraPlusWhite® polyester outer gelcoat sub-layer 203B with these three same biologically active chemical agents. This may be done after the assembly of the entire boat has been completed. This allows for an enhanced outer polymer layer that comprises two sub-layers both containing these same three biologically active chemical agents with the outer sub-layer of the outer polymer layer comprising a polyurethane or fluorourethane polymer and the inner sub-layer comprising the UltraPlusWhite® polyester polymer.

The chemical properties, chemistry, and physical properties of the three biologically active chemical agents used in this surface protection layer—the zinc pyrithione, the Cu Zn Sn metal alloy powder, and the nonivamide (or any other member of the group of capsaicin and capsaicin related compounds and mixtures including pure capsaicin itself) of the outer polymer layer, as well as the cuprous oxide and zinc oxide of the inner polymer layer, are completely compatible with the physical and chemical properties and chemistry of the polyurethane, fluorourethane, epoxy and polyester polymers as well as the other polymers mentioned in this disclosure. Thus, there are no mechanical or chemical barriers to moving the location of any of these biologically active chemical agents to anywhere within any of the polymer layers used in this surface protection coating comprising this invention that are comprised of any of these polymers.

There are many variations of assembling a hull as part of the boat assembly process across the industry. Some manufacturers do not manufacture a hull in one piece in a mold. Rather the hull may be assembled from sub sections that are themselves fabricated in a mold building process, and then the hull subsections may be attached together with various means of strong bonding. This coating arrangement works with pieces of a hull as well as with the entire hull of the a boat. There are also many types of boats that differ in terms of structure, shape, material, and size. Some boat manufactures only use layers of epoxy polymer with fiberglass mats saturated with the epoxy polymer as the only component of the hull other than an outer gelcoat of a single-component water and water vapor permeable polyester with a water barrier epoxy layer underneath, and rely on the outer most layer of the epoxy polymer of the hull itself to act as the water barrier. In this case, the outer water and water vapor permeable polyester gelcoat may be replaced by the polyurethane outer polymer layer 203 containing the nonivamide 211, the zinc pyrithione 210, the Cu Zn Sn powder alloy 212 and a suitable colored pigment 213 as the new "gelcoat" which is water- and water vapor-resistant unlike the original polyester gelcoat. Or the polyester "gelcoat" could be retained, impregnated with cuprous and zinc oxides to convert it into the inner polymer layer, and then the PUR/FUR with its Cu Zn Sn alloy powder, zinc pyrithione, and nonivamide may be applied over it as the outer polymer layer after the hull was assembled. The outermost epoxy polymer layer of the multi-layered epoxy hull that is assigned the function to act as a water barrier for the rest of the hull may contain the cuprous oxide 214 and zinc oxide 215 if the polyester "gelcoat" is eliminated. The rest of the hull thickness, however, may be a different polymer other than an epoxy and may include any polymer chosen by the boat manufacturer to constitute the boat and boat hull.

All of the biochemically active chemical additives, 210, 211, 212, 213 in the outer polymer later 203 and 214 and 215 of the inner polymer layer 204 are physically and chemically inert with respect to, and so can be used with, any polymer chosen by the boat manufacturer to constitute the boat hull and boat from among the group of such polymers known for such use in boat hull manufacture.

A great variety of polymers can be used along with different amounts and types of different antifouling biologically active chemical substances. These substances can be used singly or in combination with each other, with the inner and outer polymer layers possessing different combinations of such antifouling substances. All can be used in this application because of the multi-layered structure comprising boat hulls assembled by most types of boat assembly processes.

For non-fiberglass hulls, a primer may be first applied to the hull, if the hull was made of a metal. In such embodiments, the inner polymer layer 204 may be coated on after the boat hull has been finished being constructed and a primer has been applied, and then the outer polymer layer 203 would be applied on top of the inner polymer layer 203. This coating would then be applied directly to the hull if it were composed of a non-metallic substance or if the hull was metal, to a primer painted on the hull to prevent interaction between the metal of the hull and the biologically active metallic chemical substances of the inner polymer layer. In this case, the coating may be applied to the boat at the factory after the new boat has been made, prior to its sale. The purchaser of the boat would not have to add their own antifouling paint.

While a good gelcoat would last in such marine immersion service for 10 to 15 years if biofouling was not an issue, such a gelcoat will only last that long if it is protected mechanically from biofouling processes and damage, and protected chemically from the pitting, chalking, and clouding from seawater exposure that cosmetically and mechanically destroys the glossiness and mechanical integrity of the gelcoat. This can be done by waxing the gelcoat manually with a gelcoat wax every three to 12 months to restore the gelcoat coating. When boat owners of boats omit this procedure, gelcoat will generally last only about 5 years, even if the biofouling damage is prevented.

To protect the cosmetic and mechanical integrity of the gelcoat outer polymer layer, even if the biofouling is prevented by the impregnated biologically active chemical agents in that layer, the gelcoat surface may be waxed with a wax that contains gelcoat polishing wax that is sprayed on or buffed on at least once per year and preferably every 3 months. This gelcoat restoring wax may include the same three biologically active chemical substances in the same concentrations found in the outer polymer gelcoat layer, but at higher concentrations.

In such a gelcoat polishing wax, the zinc pyrithione may be present in concentrations up to 15% by weight, the Cu Zn Sn up to 10% by weight, and the nonivamide up to 15% by weight. Such a buffing wax maintains the cosmetic and mechanical integrity of the gelcoat, keeping it in the smooth, glossy, mirror-like state that existed at the time of the boat's manufacture, and also restores the concentrations of the three fouling prevention agents in the gelcoat as these biologically active chemically active substances are rubbed back into the surface of the outer gelcoat polymer layer. The wax would be applicable to an outer polymer layer that contains any polymer mentioned in this disclosure, including the outer PUR or FUR polymer layer, epoxy outer polymer layers, or outer polymer layers comprised of vinyl ester or phthalic unsaturated polyesters.

Even though the leaching out into the seawater of the three biologically active chemical substances that prevent biofouling attachment and damage to the submerged boat hull has been designed to be exceedingly minimal, even after many years, the buffing wax may buff in additional quantities of the biologically active chemical agents into the gelcoat, restoring their levels in the outer gelcoat polymer layer back to high levels, thus maintaining the high antifouling damage prevention that was present when the gelcoat outer polymer layer was placed on the at the start of the mold hull assembly process when the boat was manufactured.

The buffing process brings more molecules of the biologically active chemical agents to the surface of the gelcoat outer polymer layer from just below the surface to enhance the prevention of biofouling attachment and preventing damage to the hull over longer periods of time. Furthermore, buffing wax into a polymer coating is simpler, more cost effective, labor saving, and more environmentally friendly than stripping away old paint coatings off boat hulls with toxic paint residues that have to be disposed of in an environmentally safe manner on a yearly or bi-yearly basis, as is the case with ablative antifouling paints.

Suitable waxes for the polymers described herein can be impregnated with the three biologically active chemical agents and may be buffed into the surface of the outer polymer layer. Though PUR and especially FUR maintain their cosmetic glossiness and color much better and much longer than polyester gelcoat, their cosmetic appearance will nevertheless be enhanced by such buffing. Replenishment of depleted biologically active chemical agents at the surface of even these outer polymer coatings will have the same prolongation of the antifouling prevention effect as described for the gelcoat outer polymer coating.

Buffing in the wax is much more effective than spraying on the wax, and environmentally there is less of an issue to collect the sprayed wax with the biologically active chemical agents. The commercial gelcoat wax, of which there are many commercially available varieties, would be impregnated with the same biologically active chemical substances as in the outer polymer layer. Thus, the commercial gelcoat wax formulation may vary and match the particular set of biologically active chemical substances in the outer polymer layer.

All of the biologically active chemically substances mentioned in this disclosure can be used singly or in combination in the manner previously described within this disclosure and the nonivamide 210, the zinc pyrithione 211, the Cu Zn Sn alloy powder 212, and colored pigment 213 that are used in the outer polymer layer 203 and the cuprous oxide 214 and zinc oxide 215 used in the inner polymer layer 204 are just the represented preferred substances to be used in this application of this invention and described in detail here for the purposes of exemplary explanation.

A third application is a coating to be applied to a boat propeller, which can be applied at the time of manufacture or by the user subsequent to its installation on a ship or boat. Ship and boat propellers may be made from either metal, such as stainless steel, aluminum, brass, bronze, titanium, copper aluminum alloys or other types of metal alloys, or they may be made of ceramics. In protecting propellers and their surfaces from all of the processes that the current invention are effective against, especially bio-proliferative processes, the coating has to withstand tremendous centrifugal and frictional forces and cavitation air bubbles, especially at the propeller edges. Thus, the coating should have as high an adhesion to the propeller surface as possible. Some available coatings last only one season.

Propeller coatings sometimes include a zinc chromate yellow primer, which is extremely carcinogenic, quite dangerous to the applicator (often a lay consumer), and is in the process of being banned or highly limited in use in various jurisdictions. The zinc chromate layer is covered by a silicone polymer that reduces friction between the water and the propeller blade. It relies on low friction conditions to prevent the bio-proliferation via attachment and growth of biofouling animal organisms.

However, that outer layer has no chemically active substances for preventing bio-proliferative processes, and the galvanic and chemical processes that result in consequence. The outer silicone layer may rely solely on the low friction of the moving water against the outside coating layer of the propeller blade to prevent the establishment of bio-proliferative processes damaging to the propeller blades, so that when the ship and propeller stay still in stagnant water for any significant length of time, biofouling animal organisms can easily go through the outer low friction polymer layer and grow into the inner zinc chromate layer where they can be eradicated by the zinc chromate. However, this coating will leach dangerous chromate ions into the aquatic environment, especially at the end of the first or second season when progressive damage to the outer low friction layer begins to expose significant amounts of the propeller and its dangerous zinc chromate coating to the aquatic environment with rapidly increasing amounts of chromate contamination occurring until the coating is removed and replaced with a newer coating. Over the life expectancy of the propeller coating, and especially toward the end of its operational life, the damage to the propeller, its shaft, and the associated boat's running gear can be considerable, requiring labor intensive and costly work to repair that damage. Also, before the new coating with the zinc chromate primer and the silicone topcoat can be applied, all traces of the old coating are removed by either chemical means or by sand blasting.

Such coatings are furthermore exceptionally expensive, costing thousands of dollars a gallon. To apply them, one has to first white sandblast the propeller and its old paint down to the bare white metal, which in of itself produces unfavorable environmental contamination if the residues and aerosols produced by this process are not properly handled and disposed of as well as medical dangers of cancer, chromate injury, and lung injury to people who often do not take the proper precautions. The zinc chromate acts as a primer, allowing good attachment of the outer low friction silicone layer to the propeller surface; its function is not to eradicate bio-proliferative processes, but it does eradicate some biofouling animal organisms because of the severe toxicity of zinc chromate to all animal life. Note that unlike the outer polymer layer 98 of the current invention shielding the inner polymer layer 99 with potent chemically active substances from the surrounding water, the outer low friction layer in the zinc chromate current art system does little to no shielding of the toxic zinc chromate from the surrounding toxic environment, because it soon begins to wear off and shows signs of disintegration from successful attachment of biofouling animal organisms such as barnacles and invasive mussels.

Note that with the current invention, a zinc chromate coating, like TBT (tri-butyl-tin), which would make for an excellent antifouling coating if it were not for its serious environmental toxicity and damage, could be placed within the inner polymer layer as a biologically active chemical antifouling substance with no environmental toxicity or toxic leaching into the surrounding aquatic environment because of the total shielding provided by the outer polymer layer 98 that would prevent any contact with the zinc chromate inner polymer layer with the surrounding water.

Some boat owners enjoy the cosmetic appearance of having the barnacles falling off the propeller, not realizing that when they fall off, they leave a damaged area of the coating on the propeller, and that the barnacles are falling off because of the zinc chromate which is now being directly exposed to the aquatic environment, even as the coating is eradicating some of the barnacles. The coating eventually fails, because not all the mature barnacles fall off, some continue to grow and are slowly poisoned by the zinc chromate while they attain adulthood and large size. Then they either fall off, leaving a hole in the coating which exposes the bare propeller blade directly to the seawater and allows for biochemical fouling, corrosion and damage to the propeller or their dead shells become the nidus for new barnacles to easily attach as well as greatly and harmfully increasing friction on the propeller blade. Even one mature barnacle on a propeller blade will increase fuel consumption, increase vibration and cavitation, and shorten the life of the propeller via corrosion and increase mechanical water turbulence, possibly even damaging the engine through excessive vibration.

Other representatives of the current art include coatings consisting of zinc spray in a polymer and hull ablative paints which are ineffective in preventing larval forms and juvenile forms of the biofouling animal organism from progressing into adult biofouling organisms—barnacles and mussels, which then subsequently at its worst, damage the propeller blades and shaft, or at its best, requires a difficult removal of the barnacles and mussels, as well as the old damaged paint and repair to the areas of chemical and biological corrosion that occurred because of the bio-proliferation. Such bio-proliferation is responsible for greatly increased friction of the propeller with the water, greatly increasing fuel consumption and cost, as well as creating disturbances and vibrations in what should be smooth flow and rotation of the blades leading to possible engine damage.

Propellers may be coated with a process that eliminates all of the above problems. Besides being cheaper by an order of magnitude, the coatings described herein are not carcinogenic unless grossly misused or mishandled. The process of using such a coating is as follows: The propeller is simply sanded by hand or with an electric sander to the point that all loose paint, rust, grease, and debris are removed, the blades are cleaned with a solvent, and no sandblasting is required. It is not necessary to remove all traces of rust, old paint, or oxide as long as all loose amounts of these substances are removed by sanding.

A first primer layer of the coating may then be applied to the propeller blades and shaft, such as an extremely adhesive epoxy (2,500 PSI) without any chemically active substances. This highly adherent epoxy primer layer 104 of FIG. 1, may be selected to provide strong adhesion of the coating onto the metal or ceramic surface of the propeller and can cure in the presence of water. Zinc or aluminum powder may be added to the epoxy primer if desired to produce a zinc rich or aluminum rich primer for steel propellers that is particularly effective for preventing chemical and biochemical corrosion.

The zinc or aluminum acts as a sacrificial substance that deflects corrosion away from the protected surface substrate. Additionally, any epoxy primer or even a polyurethane primer commercially available that is highly adherent to a metal substrate would be suitable for this application. The epoxy primer may be slightly flexible to cope with the fact that propeller blades under rotation may show some flexing and bending; polyurethane primers are naturally flexible. The epoxy primer can be cured below the water line or can be cured conventionally while above the water line before submersion of the propeller surface. A polyurethane primer may be cured above the water line before immersion of the propeller surface, and may be of either the standard two component variety (isocyanate part A hardener and part B polyol resin) or the one component moisture cured polyurethane primer coating.

Next, inner polymer layer 99 with a cupro-metallic substance or substances is applied as the second mid-coat layer on top of the inner primer layer 104, with or without a transitional metal oxide such as zinc oxide. A biologically active chemical substance that may be used in the inner polymer layer 99 may be a mixture of cuprous oxide and zinc oxide. The cuprous oxide would be with a weight composition between 5% and 70% with an exemplary value of 10% and the zinc oxide would be with a weight composition between 0.25% and 3.6% with an exemplary value of 0.5%. Furthermore, ratio of the weight composition of the zinc oxide as compared to the weight composition of the cuprous oxide may be in an exemplary ratio of 1:20.

Finally, outer polymer layer 98 of a FUR polymer impregnated with PTFE powder, any desired pigment such as titanium dioxide to give a brilliant white, non-pigmented color, and a combination of nonivamide, Cu Zn Sn alloy powder, zinc pyrithione, and with or without medetomidine may be coated as a topcoat over the mid-coat inner polymer layer 99. The weight concentrations of these biologically active chemical agents may be as described above, with an exemplary mixture for propeller antifouling being a composition by weight of about 3% nonivamide, 5% Cu—Zn—Sn alloy powder, 5% PTFE powder, and 10% zinc pyrithione.

The outer polymer layer 98 may include a fluorourethane (FUR) for maximum durability, wear, abrasion, low friction, water and chemical imperviousness to withstand the severe water rotational forces and cavitary bubble disturbances around the whirling propeller blades. This three-layer process may have at least a 5 year operational lifespan, as opposed to the one or two seasons with the zinc chromate system. The fluorourethane polymer protects a propeller apparatus from not only bio-proliferative processes because of the presence of the mixture of biochemically active chemical agents, but also UV radiant, chemical, galvanic, and mechanical abrasive processes originating in the surrounding water as well, because of the extremely tough and highly hydrophobic fluorine chemical bonds. These carbon-fluorine bonds give the outer polymer layer an extremely low surface tension and high hydrophobicity characteristic which further reduces the chance of attachment to the coating of biofilm, algae, and animal biofouling larvae, which are washed off by the movement of the propeller blades, and greatly reduces the coefficient of friction of the coating to minimize friction between the water and the rapidly spinning propeller blades. As a result, turbulence and cavitation are reduced, thereby improving the efficiency of the propeller for propulsion and improving the durability of the antifouling coating.

However, the huge radial velocity of a spinning propeller (but not the boat's running gear) places both intense radial centrifugal and tangential shearing forces on the outer polymer layer as that outer polymer layer moves through the water at high radial velocity, which can with time separate the outer polymer layer from the inner polymer layer, thereby reducing the operational life of the coating. Additionally, the biologically active agents in the inner polymer layer may galvanically react with the material of the propeller, such as aluminum or steel. While a primer layer will prevent this chemical interaction, the high radial velocity of the propeller blades may force the inner polymer layer to separate from the primer on the surface of the boat again, shortening the operational life of the coating and decreasing the mean time before coating failure.

With respect to the adhesion problem between the different layers of the antifouling propeller coating, the adhesion is greatest at the boundary between a primer and the surface substrate to be protected if a primer is used. The adhesion is somewhat less with respect to the boundary layer between the inner polymer layer and the surface to be protected if no primer is used, or between the inner polymer layer and the primer layer. Still less is the adhesion between the inner polymer coating and the outer polymer layer. The radial component of centrifugal forces generated by the spinning propeller blades will tend to pull the outer polymer layer off the inner polymer layer, and may similarly cause damage to deeper layers as well. Furthermore, the linear shearing forces will tend to shear the outer polymer layer off the inner polymer layer first, though the deeper layers of the inner polymer layer and the protected surface substrate may also shear and separate later on. Likewise, the radial component of the centrifugal forces will tend to pull the inner polymer layer off the surface being protected or off the primer layer, if a primer layer is used, and the linear shearing force component will tend to shear the inner polymer layer off the surface being protected or off the primer layer, if a primer layer is used. The tangential shearing forces and radial forces tending to corrupt and damage the coating are a greater problem when a primer layer is used, making for three separate layers for the antifouling coating with three coating interfaces versus a two layer coating with two coating interfaces when no primer layer is used.

To solve the problem of the radial pulling and shearing slippage of the layers of the coating caused by the rapid speed of the propeller blades, which is most serious at the propeller's edges, the adhesion and friction between the layers adjacent to the inner polymer layer that are located above it (the outer polymer layer) and below it (either the primer layer or the protected submerged surface itself) may be increased. The more layers and interfaces between the layers and the substrate protected surface, the more intense this coating disruption problem becomes. This increase in adhesion and interlayer frictional resistance is accomplished by introducing and impregnating the inner polymer layer with particles of material of high hardness, roughness, and jaggedness, such as poly-crystalline or disrupted mono-crystalline synthetic diamond powder, which may be produced by a crushing or a detonation process to create extremely jagged particles between 325 mesh and 400 mesh (38 microns and 43 microns). If the particles are larger than this for an epoxy polymer, such as comprising the inner polymer layer impregnated with these particles, the adhesiveness actually goes down from a maximum.

When these particles are impregnated into the inner polymer layer at a very low concentration, for example a concentration by weight of less than or equal to about 0.1% (though a higher concentration may be used), the adhesion of the inner polymer layer to both the adjacent outer polymer layer, and the adjacent protected surface, or the adjacent primer layer if a primer is used, is greatly improved. The effect is very similar to a car wheel or person sliding on ice, where a small amount of sand between the ice and the tire or the person's shoe improves traction supplies greater friction to prevent slipping and sliding. Since there is a radial component to the centrifugal force stress as well as a tangential shearing component of the centrifugal force tending to disrupt the coating long the direction of the propeller's rotation, adding these particles will lessen the effect of this tangential component of the centrifugal forces as well. Other finely powdered abrasive particles, like metal carbides, silicon carbide, cubic boron nitride, aluminum oxide (alumina), and the like are quite suitable, but synthetic diamond powder is preferred because of its extreme hardness (Mohs scale 10) and its extreme abrasiveness and roughness when its crystalline structure is fractured into jagged pieces.

The introduction and impregnation of such abrasive diamond particles into the epoxy polymer matrix is of particular utility when it is used for the propeller. These materials do not hinder the operation of a coating for the boat's running gear (shafts, intake vents, etc.) and so may be used when coating the running gear for the sake of convenience.

The greater the number of layers in the polymer antifouling coating, the greater chance of centrifugal radial and tangential shearing force disruption to the coating after a prolonged period of time. Accordingly, the number of coatings may be reduced from that of three layers (outer polymer layer, inner polymer layer, and primer layer) to two layers by eliminating the primer layer. The composition may be altered in such an embodiment to prevent the active metal materials that can make up the composition of the propeller from chemically interacting through galvanic and chemical action with the metallic copper alloy or copper salt substances of the inner polymer layer.

As noted previously, cuprous thiocyanate may be used instead of other copper metal, alloys, or salts, as this form of copper will not react galvanically or chemically with a metal boat hull made commonly out of aluminum, steel, or iron. Similarly, cuprous thiocyanate will not react with the metals found in propeller blades. While being about as effective in preventing biofouling from damaging the submerged surface more commonly used copper additives, such as cuprous oxide, cuprous thiocyanate nevertheless does not chemically or galvanically interact with an aluminum, steel, or iron hull or any of the metals that would be used in a metal propeller. A boat hull or propeller blade made of any metal less noble than copper in the electromotive series table will not react with cuprous thiocyanate. Furthermore the brilliant white color associated with cuprous thiocyanate is cosmetically very appealing compared to the pinkish hue that is associated with most copper-containing substances.

The primer layer on a chemically active metal hull thereby can be eliminated with such a metal boat, and the three-layer antifouling coating may be reduced to a two-layer antifouling coating with less expense and less labor involved in the painting process. Furthermore, the resulting reduction in the number of polymer interfaces, from three to two, provides greater adhesion of the coating between the layers of the coating and the protected surface substrate as previously described, increasing the durability of the coating. This choice of cuprous thiocyanate can be done in the same manner with a propeller made of a chemically active metal relative to copper such as aluminum or steel in exactly the same manner for a boat hull.

Thus the final antifouling propeller coating may be reduced from three layers to two layers with a diminution of the destabilizing effects of the sum of the radial centrifugal and the tangential shearing component of the centrifugal forces caused by the rapidly spinning propeller. The use of cuprous thiocyanate to protect against galvanic and chemical corrosion between copper and other metals can also be applied to the antifouling coatings for marinas, docks, bulkheads, and piers. If they too are made of metal rather than wood, a primer may be used to prevent negative interactions. But this third primer layer can be eliminated when using cuprous thiocyanate, which will result in economic savings both in material and labor costs and the beneficial increase in coating adhesion through reduction in the number of polymer interfaces from three to two again occurs.

Like in the case of the hull boat bottom antifouling paint application, coating disruption due to centrifugal and shearing forces from rapidly spinning propeller blades through water is not an issue with stationary submerged marina structures. The use of copper thiocyanate for metal bulkheads will be described later. Note that when copper thiocyanate will be used, the zinc oxide additive previously described may be used in addition to the copper thiocyanate in the inner polymer layer in the same weight proportion as was the case when any other cupro-metallic substance would be used as already described.

Thus, the use of both cuprous thiosulfate and minute particles of fractured synthetic diamond powder in the inner polymer layer synergistically reinforces the entire coating structure. The diamond powder increases the adhesion of the coating's two polymer layers and the adhesion of the inner polymer coating to the protected surface substrate. The diamond powder further protects against the sum of the radial centrifugal force component due to the rapidly spinning propeller blades and the tangential shearing component of the centrifugal force caused by the rapidly flowing water adjacent to the blades. Both of these force components would be acting together to disrupt the coating by pulling apart the interfaces of the outer polymer—inner polymer, the inner polymer—primer, and the inner polymer—protected substrate surface layers from each other. The cuprous thiocyanate, by allowing the elimination of the primer layer and thereby reducing the number of polymer interfaces from three to two in the antifouling coating, causes the effects of both the radial component of the centrifugal forces and the tangential shearing component of the centrifugal forces on the coating to be lessened in magnitude, because these forces are now being applied to fewer polymer layer interfaces, thereby lessening the disruptive shearing and centrifugal forces throughout the coating structure.

Note that the force that disrupts the integrity of the antifouling coating, by pulling apart the two polymer layers as well by pulling the inner polymer layer off from the propeller blades, includes the sum of the radial centrifugal force component and the tangential shearing component of the centrifugal force. The radial component of the centrifugal forces tends to pull apart the coating in a direction perpendicular to the surface of the coating and propeller blades. The tangential shearing force component of the centrifugal forces results from the tangential component of the centrifugal force that produces friction and frictional forces of the propeller blades against the surrounding turbulent water and the resistive water viscosity that tends pull apart the layers of the coating and pull it off the propeller blades in a direction parallel to the outer surface of the coating and the surface of the propeller blades. The final synergistic result of the combination of the synthetic diamond powder and copper thiosulfate impregnation of the inner polymer layer is an antifouling coating that is more resistant to coating disruption over time leading to an enhanced and prolonged operational life.

While the embodiment of the third application may use an inner polymer layer of an epoxy polymer, other polymers could be used in this layer with the cuprous thiocyanate as well, such as polyurethane, fluorourethane, polyester, vinyl ester, polyurea, and any other polymer having a molecular structure such that there would be no significant chemical reaction between the resin, the hardener, or any other component of the polymer with the cuprous thiocyanate. The synthetic diamond particles may be used with any known polymer that can be used in the inner polymer layer, as they are chemically inert. The zinc oxide powder is used with the cuprous thiocyanate as previously described because of its enhancing and synergistic effect in eliminating juvenile barnacles that managed to settle and begin growing on the coating in spite of the presence of the outer biofouling repelling polymer layer.

A fourth important application includes a coating to be applied to structures of a marina. There are three principal structural components to a marina that services boats and ships. First, steel bulkheads often line the perimeter of the marina. Second, pylons made out of wood or concrete to which docks and piers are at attached, if the docks and piers are not floating. Third, floating piers and docks, which rise and fall with the tide, that rest on floats largely made of ultrahigh molecular weight polyethylene plastic (UHMWPE). All three components are subject to bioproliferative biofouling processes as well as chemical processes and, in the case of metal objects, galvanic processes, and they all need to be protected in some manner to prevent expensive damage requiring eventual replacement.

With respect to steel bulkheads, they are subject to severe corrosion via chemical and galvanic interaction with water, especially seawater. Because the iron in the steel bulkhead is moderately toxic to biofouling animal organisms that try to settle there, the biological proliferations are not usually as severe as on other submerged surfaces, but do remain a factor. The iron in the steel plates is attacked by both the chlorine ion and oxygen in saltwater, and hydrogen and oxygen in freshwater. Even when measures are taken to inhibit these processes, steel bulkheads often have to be replaced every several years, at a significant cost. At least parts of the bulkheads are constantly wet, which limits the coating options that can be used. Normally the bulkhead steel plates come coated with an iron oxide primer as their only protection, which shortly corrodes. The coatings described herein may be used to preserve these structures.

Three layers of polymer may be used to coat steel bulkheads. The first inner layer may be a high adhesion epoxy polymer system used as an inner primer layer 104 that is capable of curing in the presence of water. This epoxy system may be free of any copper or other chemically active substances to avoid galvanic action between the steel bulkhead and cupro-metallic substances. Zinc or aluminum powder may be added to the inner primer layer 104 to further hinder any chemical corrosion of the bulkhead, as these highly electrochemically reactive elements, which with zinc going to $Zn^{+2}$ and aluminum going to $Al^{+3}$ ions respectively, will prevent the iron in the bulkheads from going to ferrous $Fe^{+2}$ and ferric$^{+3}$ ions, which would otherwise lead to rust formation and corrosion damage. The primer layer may be eliminated if the cupro-metallic substance is cuprous thiocyanate, which does not react chemically with the iron in steel structures like bulkheads.

This mechanism of cuprous thiocyanate protection against galvanic and chemical corrosion between copper and other metals can be applied to this antifouling coating embodiment for metal structures that are part of marinas, docks, bulkheads, and piers. If they too are made of metal rather than wood, a primer may be needed in some cases to prevent galvanic and chemical corrosion. But the third primer layer can be eliminated with the use of cuprous thiocyanate, which will result in economic savings both in material and labor costs and will provide a beneficial increase in coating adhesion through reduction in the number of polymer interfaces from three to two, though like in the case of the hull bottom boat paint application, coating disruption due to centrifugal and shearing forces from rapidly spinning propeller blades through water is not an issue for stationary or slow-moving structures.

Next a mid-coat of inner polymer layer 99 with a cupro-metallic chemically active substance impregnating a layer of the same moisture-tolerant epoxy polymer system may be laid down. Zinc oxide may be used in a ratio by weight composition of 1:20 as compared to the cupro-metallic substance, with other ranges and other transitional metal and heavy metal oxides being used as described in the other applications described herein. The inclusion of the small amount of non-copper metal oxide synergistically enhances the antifouling effect on juvenile barnacles that have established themselves on the surface after resisting being repulsed by the outer polymer layer and its biologically active chemical agents.

Third, a top coat comprising outer polyurethane (PUR) outer polymer layer 98 may be laid down, in which a tin-brass alloy powder, nonivamide powder, and zinc pyrithione (ZPT) are impregnated, thus completing the coating under dry conditions. Because PUR cannot cure properly in the presence of water, and structures by the water and in the water are usually moist even at low tide, a moisture curing single component PUR resin may be used with the coating applied at low tide, or as an alternative, a third layer of moisture tolerant-epoxy with the nonivamide, Cu Zn Sn alloy powder, and zinc pyrithione may be used. These biologically active chemical agents may be used in the manner and amounts previously described several times in this disclosure. If an epoxy polymer is used as the outer coating, ultraviolet light blockers may be used, and the more resistant but more expensive aliphatic epoxy coating (epoxy resin plus aliphatic amide hardener), because of its relative resistance to UV light as compared to the cheaper aromatic epoxy polymers (epoxy resin plus aromatic amide hardener), should be used. This triple coating will prevent damage, deterioration, and discoloration, for example in the form of rust disintegration caused by chemical, galvanic, radiant, and bio-proliferative processes emanating from the water.

This coating may be used instead of an iron oxide coating primer placed on the bulkhead plates at the time of manufacture, or this coating can be placed on top of such a primer to make a four layer coating. Fluorourethane, because of its cost, may be omitted in favor of PUR and the PTFE and pigment which can be used in the outer polymer layer 98 can be omitted. The PUR and the FUR shields the UV sensitive epoxy polymer from UV damage. UV stabilizers and the use of an aliphatic epoxy hardener instead of an aromatic epoxy hardener can also be used to prevent "chalking" UV damage to the outer layer of epoxy polymer.

The wood components of the marina, including docks, piers and so forth, may be treated with an inner polymer layer 99 of the epoxy system, impregnated with a chemically active substance such as a cupro-metallic substance or a transitional or heavy metal oxide, such as zinc oxide, in the manner described herein. The epoxy may be prepared above the surface of the water and applied to underwater portions of these structures, and may be allowed to cure underwater, preferably best done at lowest tide. Both wood and concrete pylons anchoring docks and piers in the marina can be treated in the same way. On top of the inner polymer 99, a polyurethane coat outer polymer layer 98, if the painted structure is dry, containing the same chemically active substances as described under the bulkhead coating may be used making the same adjustments for UV light and moisture sensitivity considerations as described for metal bulkheads above. The epoxy primer can also be used as a wood sealant on wooden marina structures because of its extreme resistance to water penetration.

The chemicals normally put into marina wood structures to act as preservatives, such as arsenical compounds (copper chromium arsenate—now no longer put into wood as of 2004) or copper chromium compounds, which are toxic to many aquatic life forms and which normally would constantly leak into the water of the marina, can be eliminated. Such treated wood (also known as pressure treated wood) would be replaced by the coating of this embodiment. The coating may be put on at the time of manufacture. Optionally a wood sealant could be used prior to the application of the coating of this embodiment. Concrete structures like pylons may be coated in the same manner as wooden marina structures. The epoxy primer can also be used as a concrete sealant on concrete marina structures because of its extreme resistance to water penetration.

The coating would be capable of eradicating marine shipworms (e.g., marine ship borers) which cause millions of dollars of damage to wooden marina structures annually. In freshwater, the coating would be able to halt proliferation and attachment of bio-proliferating invasive mussels (quagga and zebra types), which are a major source of damage to all marina structures, especially wood structures in freshwater. In warm and tropical areas, the damage done to marina structures by barnacles in marine environments is enormous and this problem can be greatly ameliorated by using such a coating. Note that concrete structures and surfaces are equally subject to severe bio-proliferating damage from barnacles and invasive mussels.

The bio-proliferation of biofouling animal organisms and plant organisms on floating plastic UHMWPE float structures in marinas is a further challenge. These include structures like dock and pier floats, bumper guards for boats, buoys, and so forth. The application of the antifouling coating can also prevent damage to structures made out of high density types of polyethylene (PE) including HDPE (High Density PE), HMWPE (High Molecular Weight PE), UHMWPE (Ultra High Molecular Weight PE, with HMWPE and UHMWPE being types of HDPE) as well as LMPE (Low Density PE) and LLMPE (Linear Low Density PE) and other types of PE. These hard to paint plastics also are used in buoys and bumpers, as well. One particular problem manifested by these structures is that, while they are not subject to galvanic and chemical processes, they will be harmed by radiant UV processes that produce caulking and cracking, and bio-proliferating processes of biofouling animal and plant organisms that have the remarkable ability to stick to the low friction surface of UHMWPE plastic and invade even that material.

To complicate matters further, it is virtually impossible to paint or coat UHMWPE plastic surfaces because of its low surface tension. However, with the recent availability of adhesion promoters that are effective with this plastic, coatings may be applied on these plastic structures preferentially at the time of manufacture, or when they are installed in the field. The structure may include a marina float, bumper, buoy, or any other structure that includes this class of polymers.

Applying an antifouling coating prevents UV, chemical, and biological damage to the surface structure. In some embodiments, suitable for painting all types of HDPE including UHMWPE that would accomplish the protection from water from chemical, radiant, and bio-proliferative damage (galvanic processes do not apply here), the surface of the float to be submerged may be cleaned with water and solvents to remove all dirt, grease, and oil. Next the UHMWPE float surface is sprayed, brush painted, or rolled on with a proper adhesion promoter primer (e.g., 104 in FIG. 1), followed by an epoxy system inner polymer layer 99 containing cupro-metallic or other chemically active substances. If a cupro-metallic biologically active chemical substance is used, then a small amount of a transitional or heavy metal oxide and in particular zinc oxide may be used with it. A cupro-metallic metal, alloy, or copper salt may be used with zinc oxide with a ratio of 20 to 1 by weight composition with a range of useful ratios as described herein. The inner polymer layer may be followed by an outer polymer layer 98 containing nonivamide, CuZnSn tin brass powder, and ZPT.

Much importance has to be placed on the proper performance of the adhesion promoter primer to be used with this antifouling coating process for HDPE. An exemplary primer that will accomplish the intended purpose of bonding the two-layered antifouling coating to HDPE, including UHMWPE and other forms of PE as well, is Paintflex® and is available in versions for UHMWPE and variants of HDPE and LDPE, stainless steel, wood, fiberglass, water base acrylic, metals, EPP (Expanded Polypropylene), EPE (Expanded Polyethylene), and PVC (Polyvinyl Chloride). The use of the Paintflex® adhesion promoter primer (PAPP) on all of these product surfaces provides another method of bonding the two layer antifouling coating and all of its variants to these types of materials and objects composed of these materials, many of which are plastics that are difficult to paint. An antifouling coating employing the PAPP may be applied at the point of manufacture.

Another embodiment of this UHMWPE and HDPE antifouling coating arrangement may include the inner polymer layer being formed by mixing the granules of preformed UHMWPE and HDPE with a cupro-metallic metal, alloy, or salt, with or without a transitional or heavy metal oxide which as previously described may be zinc oxide with a weight composition of the cupro-metallic substance to the zinc oxide powder of 20 to 1 and with preferred ranges as previously described in the prior described applications of this antifouling coating. The mixture of the cupro-metallic substance, zinc or other non-cupro-metallic oxide, and the granules of preformed UHMWPE or HDPE may be poured into a heated injection molding apparatus and the mixture may be fused together under significant heat and pressure into the desired shape of the desired marina structure much in the same way a standard UHMWPE or HDPE marina float, bumper, or buoy or any other such marina or water submerged or floating object would be fabricated.

Thus the object itself may form the inner polymer layer 99 impregnated with the cupro-metallic substance with or without the zinc or other non-cupro-metal oxide capable of eliminating juvenile barnacles that had managed not to be repelled by the outer polymer layer. These tiny microscopic barnacles would be eliminated as soon as they touched and tried to grow on the UHMWPE or HDPE marina structure. Next, the PAPP would be sprayed on, brushed on, or rolled on to promote adhesion of the outer polymer layer to the plastic structure. The PAPP layer would be represented by layer 103 on FIG. 1. and it would be equivalent to the primer layer 104 on FIG. 1.

The outer polymer layer may be painted on, sprayed on, brushed on, or rolled on to the PAPP layer that would provide adhesion of the outer polymer layer to the plastic object. The application of the antifouling coating may be done at the point of manufacture. The cupro-metallic substance can be substituted with one or more of any biologically active chemical substances that is compatible with the heat and pressure of the injection molding process used in the fabrication of the UHMWPE or HDPE marina object or structure. Likewise, the outer polymer layer can have one or more of any biologically active chemical agents that have been described in this disclosure and that would be compatible with the PAPP layer. Furthermore, any chemical incompatibility between the inner polymer layer (the object itself) and the PAPP layer or the outer polymer layer and the PAPP layer can be eliminated by an extra epoxy or polyurethane primer or any of their variants between the PAPP layer and either or both of the inner and outer polymer layer. The adhesion promoted by the PAPP layer would allow these additional chemical isolating primers to be placed on the plastic object.

A third embodiment of this UHMWPE and HDPE antifouling coating application would be to impregnate the PAPP itself with the cupro-metallic substance with or without the non-cupro-metallic oxide, but preferably with zinc oxide in the ratio of 20:1 by weight composition of the percentage weight of the cupro-metallic substance comprising a metal, an alloy, or a cupro-metallic salt to the percentage weight of the transitional or heavy metal oxide, of which the zinc oxide is an exemplary metal oxide. The cupro-metallic substance can be substituted by one or more of any biologically active chemical substances that is compatible with the PAPP.

The PAPP when impregnated with the biologically active chemical substances just described may be painted onto, sprayed onto, brushed onto, or rolled onto the UHMWPE or HDPE object. The Paintflex® Adhesion Promoter Primer (PAPP), a polymer substance in itself, therefore simultaneously provides adhesion promotion to allow the antifouling coating to bond with the plastic surface, and also provides the functions of the inner polymer layer 98 to eliminate any growth of juvenile barnacles or other biofouling animal organisms from damaging the coating and underlying protected substrate surface. Next the outer polymer layer 99 with the nonivamide, Cu Zn Sn alloy powder, and the zinc pyrithione may be applied to the PAPP layer, now functioning as inner polymer layer 99. Again, any combination of any of the biologically active chemical substances described in this disclosure that is compatible both with the polymer of the outer polymer layer and the PAPP inner polymer layer can be used. Conventional primers (such as 103 on FIG. 1) as previously described may also be used to separate the PAPP inner polymer layer from the polyurethane or other polymer outer polymer layer if required.

A new class of leisure boats made from UHMWPE, HMWPE, other forms of HDPE, and even MDPE (Medium Density PE) and LDPE, LLDPE, and PVC have been developed, manufactured, and commercially been made available. Also modern instrumented buoys, often as large as ships, are used to monitor ocean and atmospheric conditions and are now made often out of UHMWPE and HDPE. While ships and buoys made out of these hard-to-paint plastics are not marina structures, nevertheless, the same three embodiments of the antifouling two-layer coating structure that is described in this disclosure when used with the Paintflex® Adhesion Promoter Primer (PAPP) polymer coating component layer can allow this antifouling coating to adhere to the HDPE plastic substrate surface. This strong adhesive bonding between the antifouling coating and the ship or buoy substrate surface, mediated by the PAPP layer, now makes possible what had been nearly impossible coatings of these HDPE ships and buoys with antifouling protective coatings.

These antifouling coatings can now be made to be just as effective as the antifouling coatings that are applied using these three embodiments to the plastic structures made of HDPE that are found in the marina environment, and just as effective and durable as the antifouling coatings described herein that are applied to conventional fiberglass boats. Furthermore, as in the case of the gelcoat application of this antifouling coating system, the HDPE antifouling coating system can be applied to and incorporated into the hull of the ship or the body of the buoy at the time of manufacturing so that the manufactured boats and buoys are sold with antifouling protection inherent in their structures ending the need for applying antifouling coatings to the boat or buoy after purchase by the customer.

PAPP may also be used on any other material likely to be found in the composition of structural components of a marina including wood, concrete, steel, aluminum, iron, other types of plastics. Also, while the embodiment calls for the Paintflex® Adhesion Promoter Primer, other adhesion promoter substances may be used in place of the Paintflex®. Virtually any type of plastic polymer that is chemically compatible with the Paintflex® may be used with the antifouling coating system of this disclosure, but those plastic polymers that are naturally easily paintable would not require this embodiment of the adhesion promoter and the two layer antifouling coating; one can simply paint with the two layer antifouling coating without the need of the adhesion promoter. Any adhesion promoter that is chemically compatible with the polymer inner layer and its impregnated biologically active chemical agents, the outer polymer layer and its impregnated biologically active chemical agents, with the use of additional primer layers if necessary to deal with any chemical incompatibilities between the two layers, is suitable for use for use as described herein.

The cupro-metallic substance can be substituted with one or more of any biologically active chemical substances that are compatible with both the polymer comprising the inner polymer layer and the PAPP layer. Likewise, the outer polymer layer can have one or more of any biologically active chemical agents that have been described herein that is also compatible with the PAPP layer. Furthermore, any chemical incompatibility between the inner polymer layer and the PAPP layer can be eliminated by a layer of epoxy or polyurethane primer or any of their variants between the PAPP layer 104 and the inner polymer layer 99 on FIG. 1. This extra layer of epoxy primer may be needed to isolate the inner polymer layer's biologically active substances from the PAPP layer. The adhesion promoted by the PAPP layer 104 would allow these additional chemical isolating primers to be placed on the plastic object on either side of or both sides of the PAPP layer.

Bumper, flotation, and pier protection structures at marinas may be coated with these specified coatings. Because their function is to absorb the energy of boat impacts, which, unlike piers, pylons, and bulkheads that are coated with these specified coatings and are stationary and do not have to deal with frequent boat collisions and impacts, bumper, flotation, piers protection structures, and similar structures are much more sensitive to direct impact damage and lateral abrasion damage because they have to absorb the energy of numerous boat impacts. Though these collisions are not mostly head on and the energy of the impact is dissipated along the surface of the boat and the bumper or pier, these coatings can still be easily damaged via abrasion in these applications from impact forces that are mostly tangential and lie in the direction parallel to the coating's surface as opposed to the radial forces that are perpendicular to the coating's surface. This results in considerable cumulative abrasion damage to the coatings of bumper, pier, and flotation structures of a marina.

The abrasion damage component to these specified coatings can be greatly mitigated from the impact of boats if the coefficient of friction of the coating is markedly reduced. In addition to, or instead of, using fluoropolymer resins in the coating, one can further reduce the coefficient of friction by adding any of the available coating silicon polymers comprising the silanes or silicones such as the siloxanes to any of the polymers comprising the outer polymer layer 98, especially those that are comprised of fluoropolymer resins and polyurethane resins. These silicon based polymer additives can be added to the base polymer comprising the outer polymer layer 98 to be useful to the composition of the outer polymer layer 98 to greatly reduce the coefficient of friction and thus the abrasion impact damage of these coatings on such bumper, flotation, and pier structures. Any of the silicon based polymers may be added in up to a preferred 10% concentration by weight of the mixture of the silicon based polymer and the base polymer of outer polymer layer 98, such as the fluoropolymer or polyurethane polymers.

As one increases the weight concentration of the silicon based polymer in the polymer mixture of outer polymer layer 98, the pliability of that coating is beneficially enhanced and the coating becomes less brittle, thus allowing flexing under direct, head-on impact lessening the damage from boat impacts. Thus, the addition of these silicon polymers to the base polymer of the outer polymer layer 98 mitigates low-impact boat-induced damage from radial forces from a head-on collision, as well as the abrasion tangential forces parallel to the coating's surface produced by a glancing sliding collision.

The addition of a silicon based polymer coating component can be similarly added to any of the other applications for these coating embodiments including hull bottom boat paint, hull gelcoat coating, and propeller coating, as well as a coating application for wave energy converters. The reduced surface friction with the surrounding water provided by the addition of the silicon polymers provides for enhanced performance of other coating applications as well.

A fifth application is a coating to be applied structures known as wave energy converters, which may be used to harvest wave energy and transform it to electrical energy. There are several different types of wave energy converter (WEC) systems that all have some moving parts to their mechanical systems. They all have three problems in common—1) If barnacles or mussels proliferate on the moving parts, they will be destroyed; 2) If biofouling animal organisms proliferate in large quantities, especially true also of Sea Grapes, the increased weight of these organisms will sink these structures, again destroying it; and 3) Barnacles in marine environments and invasive mussels in freshwater environments will attach, and if the WEC is not destroyed by them, the greatly increased friction produced by these biofouling animal organisms will interfere with WEC generator motion, slow it down, and decrease the electric power that is generated, reducing the efficiency of the entire system.

Taking one specific wave energy converter (WEC) system as an example, a device known as an omnidirectional wave energy point absorber, this is a device that moves a set of magnets in a vertical direction through a set of coils as a passing wave moves a float in a vertical sinusoidal manner in response to the wave motion and this vertical wave motion is transferred to the magnets in the WEC by a vertically moving coil attached to the magnets. As the magnets move relative to the stationary coils, the mechanical energy of the waves is converted into electrical energy, which is then used or stored. This system has parts made of several types of materials. The materials of moving and external parts of the device may include carbon fiber plastic, polycarbonate plastic, and stainless steel alloys of various types. These surfaces of different materials are vulnerable to bio-proliferating life forms that will destroy the WEC device or, at the least, interfere with its operation. The polycarbonate also needs to be provided with UV protection as well.

To protect such a WEC, the plastic and carbon fiber outward-facing parts that touch the surrounding water and moving parts may be coated in two layers. An outer polymer coating 98 may include nonivamide, CuZnSn tin brass powder, and zinc pyrithione impregnated into a layer of fluorourethane. This coating may be applied to an inner polymer layer 99 of an epoxy polymer with high adhesion characteristics and moisture tolerance, that has cupro-metallic substances impregnated into it. Other chemically active substances as may also be used. Stainless steel and any other metal moving part or externally facing part in contact with the surrounding water may be coated in the same manner as the plastic and carbon fiber components of the WEC, for example using the same outer polymer layer 98 with the same impregnated chemically active substances, and the same inner polymer layer 99 with the same chemically active substances.

In addition to these two layers, the inner polymer layer 99 may be coated onto an inner primer layer 104 of the same extremely adherent epoxy polymer that contains no chemically active substances to cover any metallic structures of the WEC so has to prevent galvanic corrosion from the cupro-metallic substance in the inner polymer layer 99. Because the WEC is operating under such severe conditions, the coating should be extremely durable and tough and provide heavy UV protection to the exposed parts of the device. For that reason, FUR may be used in the outer polymer layer 98 on any exposed surface, especially because of its exceptionally high UV resistance and absorption. The triple layered coat, because it is so adherent and tough, may be used on all exposed or moving parts of a critical or moving nature. The use of this coating eliminates the need for the toxic zinc chromate primer, which is the standard current coating for WEC structures.

In addition, because of the close presence of intense magnetic and electric fields generated from the powerful magnets interacting with copper coils within the WEC, the coating should be completely non-magnetic and non-conductive electrically. The impregnated chemically active substances into the two upper layers of the coating, inner polymer layer 99 and outer polymer layer 98, are suitable for this. In particular, the concentration of tin-brass alloy powder may not exceed 10% to avoid the outer polymer layer 98 from becoming electrically conductive. If pure metal copper or cupro-metallic alloys are used in the inner polymer layer 99, the concentration should not exceed 10% to avoid that layer from having electrically conductive properties. Cupro-metallic salts are not conductive, so conductivity will not be of concern if cupro-metallic salts are used only in the inner polymer layer 99. If either layer were magnetic or electrically conductive, undesirable magnetic fields and electrical currents could arise within the coating layers that would interfere with the operation of the generator, reduce the power output, and could reduce the operating life of the coating through unwanted heating and corrosion effects.

In addition to WEC buoys that to produce power from waves, the properties of the coating of the current invention can protect the external surfaces of buoys used for other purposes. These additional uses include buoys that carry weather, ocean, or atmosphere measuring instrumentation as well as those buoys that are used for navigational purposes. If these buoys and other floating structures are not protected from bio-proliferative processes, both living and non-living, the growing biomass can become so massive that the floating structure sinks because of its excessive weight and may be destroyed. Furthermore, sensors can be inactivated and destroyed, and optical lens structures could be blocked and obliterated.

Any of the embodiments described herein, which may include a two layer polymer coating system, as well as any other embodiments derived from them, be used for the protection of the following non-all-inclusive list of submerged structures: boat hulls, boat propellers, gelcoats for newly manufactured boats, marina piers and docks, water and electric power intake and outflow pipes, bulkheads and bulwarks, navigational lock structures, boat ballast tank and system structures, bridge pylons, off-shore drilling rigs, water-submerged concrete structures of any kind, naval and commercial boat hulls and their internal plumbing systems (excluding those systems used for water transport for drinking and bathing), seawater- or freshwater-cooled boat engine cooling systems including heat exchangers, piping and engine blocks, ocean wave energy converters, undersea electrical cables, undersea piping systems, navigational and instrument buoys, floating fishing platforms, canal locks, and submarines. Transparent versions of the coatings can coat glass plates in front of optical structures to protect them against biological proliferation which can destroy these optical structures.

Some boat owners demand a boat with a white hull and no colored or hued paint of any shade other than pure white. Some formulations of the two layer coating can be used to provide such a white coating. First, the inner polymer layer, instead of containing only cuprous oxide which would otherwise give the inner polymer layer a pinkish hue, the cuprous oxide can be either partly or fully substituted with the copper salt, cuprous thiocyanate, which functions in the same manner as described for the cuprous oxide, but that has a pure bright white color. It can either replace the cuprous oxide completely, or allow the cuprous oxide to be used in a smaller concentration by weight, thereby eliminating the pinkish hue that the cuprous oxide gives the inner polymer layer.

Second, in the outer polymer layer, the Cu Zn Sn powder may also give the coating a pinkish hue. Three things, however, can be done to give that layer an opaque pure white color: 1) Titanium dioxide ($TiO_2$), a pure white substance often used as a white pigment in paints, can be added to the outer layer in high concentrations, between 10 and 40% by weight of the coating, to offset the pinkish hue from the copper alloy powder; 2) Because the $TiO_2$ is unstable with exposure to UV light and this could corrupt the durability of the coating via oxygen radical formation, it must be shielded from the UV; for this reason, the outer polymer layer may be a flourourethane, which will not let UV photons pass through to the $TiO_2$ in the outer polymer layer or UV light absorbers can be added to the outer polymer layer; 3) The particles of Cu Zn Sn alloy may be made much smaller than the 44 microns described above, with a desirable range in the 75 to 150 nm range, so that the average particle size is much less than the half wave length of red light (620-750 nm), thereby making the particles of the alloy tin brass powder transparent to red light and eliminating the source of the pink hue in the outer polymer layer; and 4) The UltraPlusWhite® iso-phthalic unsaturated aromatic polyester polymer may be used in the outer polymer layer 98 as it contains up to 40% by weight of $TiO_2$, creating a brilliant white hue and at the same time it solves the $TiO_2$ UV light stabilization problem just described because the iso-phthalic polyester blocks UV light from entering the coating. These modifications would produce the brilliant pure white color demanded by some boat owners because the pinkish hue would be eliminated from both polymer layers of the coating.

As described above, oxides of the transitional elements, of which titanium is an example, are biologically active chemical substances that can retard the damage to the coating and underlying protected structure because of their inhibitory effect on barnacle, invasive mussel, and other animal biofouling organisms. The UltraPlusWhite® iso-phthalic unsaturated aromatic polyester polymer may include up to 40% $TiO_2$ and may therefore add its anti-bio-proliferative effect to the cuprous oxide and the zinc oxide if used as the polymer in the inner polymer layer inner polymer layer 99, or adds to the anti-bio-proliferative effect to the Cu Zn Sn alloy powder, zinc pyrithione, and nonivamide if it is used as the polymer in the outer polymer layer 98. Exemplary PUR outer polymer layers 98 may have between about 15% about 40% by weight so that the PUR outer polymer layer affording the coating a brilliant white color that has the same UV light blocking ability from the PUR as the phthalic acid polyester polymer in the UltraPlusWhite® and the same added anti-bio-proliferating effect of the $TiO_2$ as in the case of the UltraPlusWhite®.

In all of these applications, the specified ingredients impregnated into the two layered coating system, at their designated respective locations within the two polymer layers of the coating, protect this paint coating from corrosion, damage, deterioration, and discoloration from chemical, ultraviolet, proliferative biological, and galvanic processes originating from and within the surrounding water. In providing this protection to the integrity of the coating, these specified materials, impregnated within different layers of the two layer paint polymer coating system, shield and protect metal and non-metal submerged surface structures from these same galvanic, chemical, ultraviolet, and biological processes initiating in and from the surrounding water. These sequential protective processes of, first, protecting the polymer paint coating by having the outer polymer layer protect the inner polymer layer, and, second, the resulting two layer coating complex consequently protecting the submerged surface structure, results in a prolonged operational life and integrity of both the polymer paint coating system and the protected submerged surface structure upon which it is coated.

Any chemical substance that is insoluble in water, or if somewhat water soluble, is at least held tightly bound to the outer polymer matrix, that has activity against chemical and biological proliferative processes originating in the surrounding water, that has both physical and chemical compatibility with the polymer comprising the outer polymer layer 98 and its other impregnated chemical substances, that will protect the inner polymer layer from damage, deterioration, and corrosion from such chemical and proliferative biological processes and is also compatible with the polymer and impregnated chemical substance of the inner polymer layer, and is also not harmful to the surrounding aquatic environment, is appropriate for use in the outer polymer layer. While the list of possible chemical substances that was mentioned in this disclosure is very extensive, the list should not be interpreted as being exclusive of other potential substances. Any substance is suitable for use in the outer polymer layer of this invention may be so used. Any chemical substance that has both physical and chemical compatibility with the polymer comprising the inner polymer layer, and any of the biologically and chemically active substances impregnated into it and the material comprising the protected submerged surface structure underneath the inner polymer layer, and that is capable of protecting the underlying submerged surface structure, is appropriate for use in the inner polymer layer to prevent damage, deterioration, discoloration, and corrosion of the protected surface structure underneath. While the list of possible chemical substances that was mentioned in this disclosure as appropriate for use in the inner polymer layer is very extensive, the list should not be interpreted as being exclusive of other potential substances. Any substance that is suitable for use in the inner polymer layer can be so used.

With respect to the inner polymer layer 99, the range of possible impregnated substances that would have the ability to eradicate any juvenile biofouling animal organisms is much broader. The only limitations on this class of chemically active substances would be any such substance that is not physically or chemically compatible with either the inner layer polymer or other impregnated chemically active substances within that inner polymer layer. This broad restriction, which includes chemically active substances which might be undesirable for the surrounding aquatic environment, is allowable because of the shielding effect of the outer polymer layer 98 over the inner polymer layer 99, which keeps any and all impregnated chemically active substances in the inner polymer layer 99 totally segregated and isolated from the surrounding aquatic environment, with no leakage or leaching of such substances into the surrounding water. Therefore, not only can environmentally safe chemically active substances be impregnated into the inner polymer layer 99, but those chemically active substances that would normally not be safe for exposure to the environment and surrounding water can also be impregnated in that layer with complete safety and freedom from aquatic environmental leakage.

These substances can include cupro-metallic substances of any form described herein, and currently available commercially available ship antifouling materials such as Tralopyril, Dichlorooctylisothiazolinone, DCOIT, 4/5-dichloro-2-noctly-4isothiazolin-3-one, Cybutryne, and so forth. Even tri-butyl-tin (TBT) can be used safely because it too will never touch the aquatic environment. While the most effective antifouling agent ever developed, TBT has been permanently banned in 2003 by the International Maritime Organization, and for political reasons, will never again be allowed to be used even as the multi-layer coatings described herein do make this chemical agent safe for the environment.

Many human and animal drugs that demonstrate an ability to eradicate bio-proliferative processes from biofouling animal organisms, such as the Ivermectin class of drugs, Lufenuron, tricyclic anti-depressants, Spinosad, and so forth, can be used in inner polymer layer 99. The broad spectrum of chemically active agents that can halt bio-proliferative processes caused by any undesirable plant, animal, bacterial, and fungal organisms may be used, as long as they are physically and chemically compatible with the polymer of the inner polymer layer and the other chemically active substances impregnated there.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the principles of the present invention and that those skilled in the art may implement various modifications without departing from the scope and spirit of the invention. Those skilled in the art could implement various other feature combinations without departing from the scope and spirit of the invention.

The invention claimed is:

1. A method of protecting a submerged surface, comprising:
    applying an adhesion-promoting coating layer onto a surface;
    applying an inner polymer layer onto the adhesion-promoting layer, the inner polymer layer being impregnated with a biologically active chemical substance that inhibits biofouling-induced chemical, biological, and bio-proliferative damage; and
    applying an outer polymer layer onto the inner polymer layer, the outer polymer layer being impregnated with a biologically active chemical substance that inhibits biofouling-induced chemical, biological, and bio-proliferative damage and that repels biofouling organisms to prevent invasion of the inner polymer layer, wherein the biologically-active chemical substance of the outer polymer layer includes a copper-zinc-tin alloy with zinc having a weight percentage between 8% and 12%, with tin having a weight percentage between 1% and 5%, and with copper having a weight percent of least 85%.

2. The method of claim 1, wherein the surface is formed from a polyethylene material.

3. The method of claim 1, wherein the outer polymer layer includes a material selected from the group consisting of silanes, silicones, and siloxanes to reduce friction.

4. The method of claim 1, wherein the surface is formed from a material selected from the group consisting of metal, fiberglass, stainless steel, iron, aluminum, polyvinyl chloride (PVC), wood, concrete, and polyurea and polyester polymers.

5. The method of claim 1, wherein the surface is a dock, float, bumper guard, or buoy.

6. The method of claim 1, wherein the copper-zinc-tin alloy is in the form of a powder having a particle size of 44 micron or smaller.

7. The method of claim 1, wherein the biologically active chemical substance of the outer polymer layer further includes zinc pyrithione or copper pyrithione.

8. A method of protecting a submerged surface, comprising:
    forming an object from a polymer material that is impregnated with a biologically active chemical substance that inhibits biofouling-induced chemical, biological, and bio-proliferative damage;
    applying an adhesion-promoting coating layer onto a surface of the object; and
    applying an outer polymer layer onto the adhesion-promoting layer, the outer polymer layer being impregnated with a biologically active chemical substance that inhibits biofouling-induced chemical, biological, and bio-proliferative damage and that repels biofouling organisms to prevent invasion of the adhesion-promoting layer, wherein the biologically active chemical substance of the outer polymer layer includes a copper-zinc-tin alloy with zinc having a weight percentage between 8% and 12%, with tin having a weight percentage between 1% and 5%, and with copper having a weight percent of least 85%.

9. The method of claim 8, wherein the polymer material is a polyethylene material.

10. The method of claim 8, wherein the outer polymer layer includes a material selected from the group consisting of silanes, silicones, and siloxanes to reduce friction.

11. The method of claim 8, wherein the object is a dock, float, bumper guard, or buoy.

12. A method of protecting a submerged surface, comprising:
    applying an adhesion-promoting coating layer onto a surface, the adhesion-promoting layer being impregnated with a biologically active chemical substance that inhibits biofouling-induced chemical, biological, and bio-proliferative damage; and
    applying an outer polymer layer onto the adhesion-promoting layer, the outer polymer layer being impregnated with a biologically active chemical substance that inhibits biofouling-induced chemical, biological, and bio-proliferative damage and that repels biofouling organisms to prevent invasion of the adhesion-promoting layer, wherein the biologically active chemical substance of the outer polymer layer includes a copper-zinc-tin alloy with zinc having a weight percentage between 8% and 12%, with tin having a weight percentage between 1% and 5%, and with copper having a weight percent of least 85%.

13. The method of claim 12, wherein the surface is formed from a polyethylene material.

14. The method of claim 12, wherein the outer polymer layer includes a material selected from the group consisting of silanes, silicones, and siloxanes to reduce friction.

15. The method of claim 12, wherein the surface is formed from a material selected from the group consisting of metal, fiberglass, stainless steel, iron, aluminum, polyvinyl chloride (PVC), wood, concrete, and polyurea and polyester polymers.

* * * * *